United States Patent
Evans et al.

(10) Patent No.: US 8,983,858 B2
(45) Date of Patent: Mar. 17, 2015

(54) LIFESTYLE APPLICATION FOR CONSUMERS

(71) Applicant: Verizon Patent and Licensing Inc., Basking Ridge, NJ (US)

(72) Inventors: Ashley Evans, Stonington, CT (US); Nicola S. Morris, Westfield, NJ (US); Keith Fusaro, Stonington, CT (US); John E. O'Brien, Buford, GA (US); Peter M. Graham, Vail, AZ (US); Paul A. Donfried, Richmond, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 203 days.

(21) Appl. No.: 13/724,375

(22) Filed: Dec. 21, 2012

(65) Prior Publication Data

US 2013/0173336 A1    Jul. 4, 2013

Related U.S. Application Data

(60) Provisional application No. 61/581,916, filed on Dec. 30, 2011.

(51) Int. Cl.
*G06Q 30/00* (2012.01)
*G06Q 30/02* (2012.01)

(52) U.S. Cl.
CPC .......... *G06Q 30/02* (2013.01); *G06Q 30/0201* (2013.01); *G06Q 30/0269* (2013.01); *Y10S 707/99939* (2013.01)
USPC .................. 705/14.53; 705/26.5; 705/14.39; 707/999.009

(58) Field of Classification Search
CPC ..................................................... G06Q 30/02
See application file for complete search history.

(56) References Cited

U.S. PATENT DOCUMENTS

| | | | |
|---|---|---|---|
| 7,630,986 B1 * | 12/2009 | Herz et al. ............................ | 1/1 |
| 7,921,042 B2 * | 4/2011 | Jacobi et al. ................. | 705/26.7 |
| 2002/0069119 A1 * | 6/2002 | Rogatinsky ..................... | 705/26 |
| 2007/0067297 A1 * | 3/2007 | Kublickis .......................... | 707/9 |
| 2008/0033821 A1 * | 2/2008 | Jacobi et al. .................... | 705/14 |
| 2009/0254971 A1 * | 10/2009 | Herz et al. ........................ | 726/1 |
| 2011/0179081 A1 * | 7/2011 | Ovsjanikov et al. .......... | 707/780 |
| 2012/0016678 A1 * | 1/2012 | Gruber et al. ................. | 704/275 |

(Continued)

OTHER PUBLICATIONS

Hristova, Nataliya, and Gregory MP O'Hare. "Ad-me: wireless advertising adapted to the user location, device and emotions." System Sciences, 2004. Proceedings of the 37th Annual Hawaii International Conference on. IEEE, 2004.*

(Continued)

*Primary Examiner* — Gurkanwaljit Singh

(57) ABSTRACT

A user device receives consumer information from a consumer, where the consumer information includes preference information, demographic information, identity information, relationship information, and location information associated with the consumer. The user device provides the consumer information to a lifestyle application platform, and receives, from the lifestyle application platform, a consumer profile for the consumer based on the consumer information. The user device receives, from the lifestyle application platform, notifications, reports, and offers, associated with an enterprise and relevant to the consumer, based on the consumer profile, and provides the notifications, reports, and offers for display to the consumer.

20 Claims, 77 Drawing Sheets

(56) References Cited

U.S. PATENT DOCUMENTS

2012/0069131 A1* 3/2012 Abelow ............... 348/14.01
2012/0330745 A1* 12/2012 Bennett et al. ............ 705/14.39

OTHER PUBLICATIONS

Dickinger, Astrid, et al. "An investigation and conceptual model of SMS marketing." System Sciences, 2004. Proceedings of the 37th Annual Hawaii International Conference on. IEEE, 2004.*

Pons, Alexander P. "Biometric marketing: targeting the online consumer." Communications of the ACM 49.8 (2006): 60-66.*

Shankar, Venkatesh, and Sridhar Balasubramanian. "Mobile marketing: a synthesis and prognosis." Journal of Interactive Marketing 23.2 (2009): 118-129.*

Kurkovsky, Stan, and Karthik Harihar. "Using ubiquitous computing in interactive mobile marketing." Personal and Ubiquitous Computing 10.4 (2006): 227-240.*

Saari, Timo, et al. "Psychologically targeted persuasive advertising and product information in e-commerce." Proceedings of the 6th international conference on Electronic commerce. ACM, 2004.*

De Reuver, Mark, and Timber Haaker. "Designing viable business models for context-aware mobile services." Telematics and Informatics 26.3 (2009): 240-248.*

* cited by examiner

FIG. 6
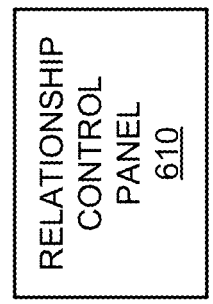

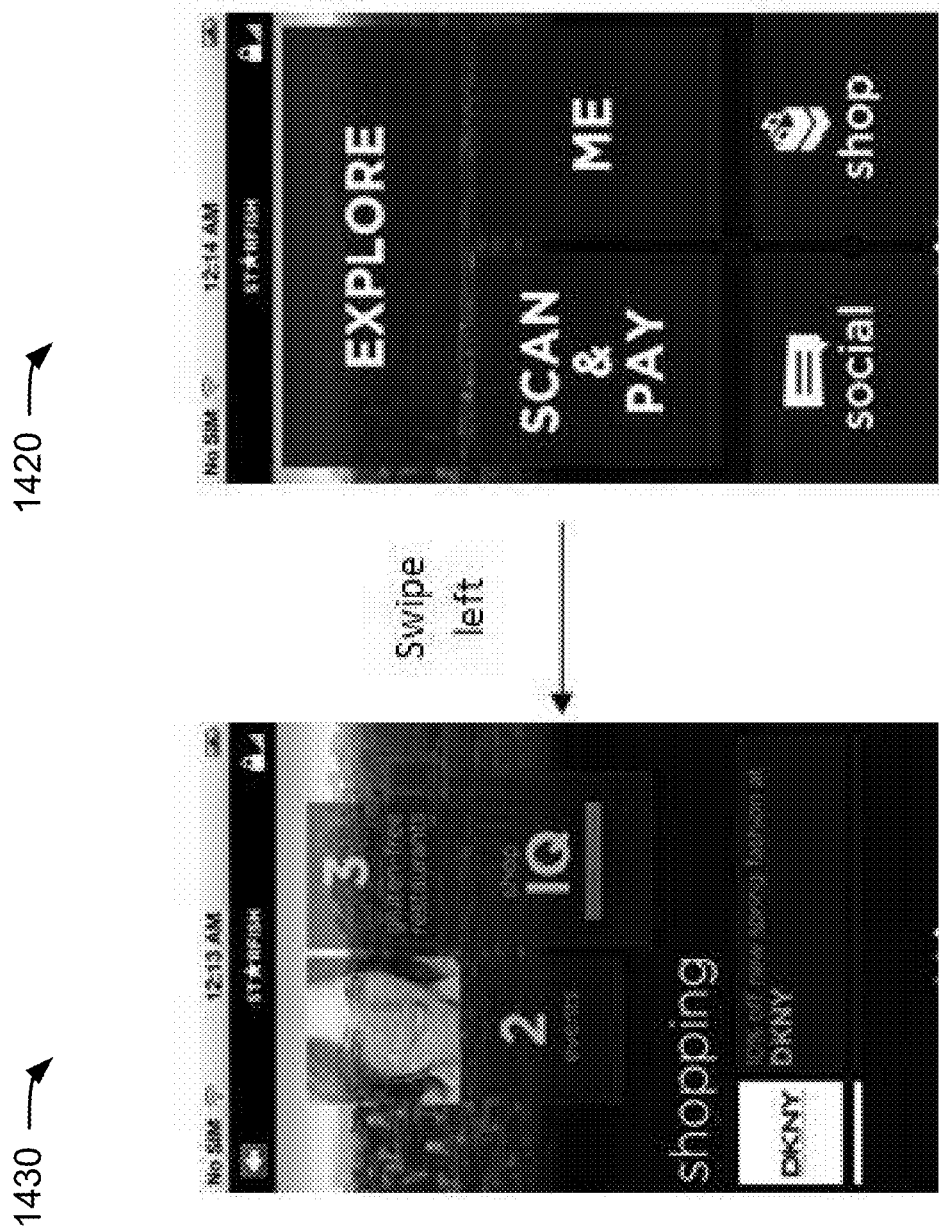

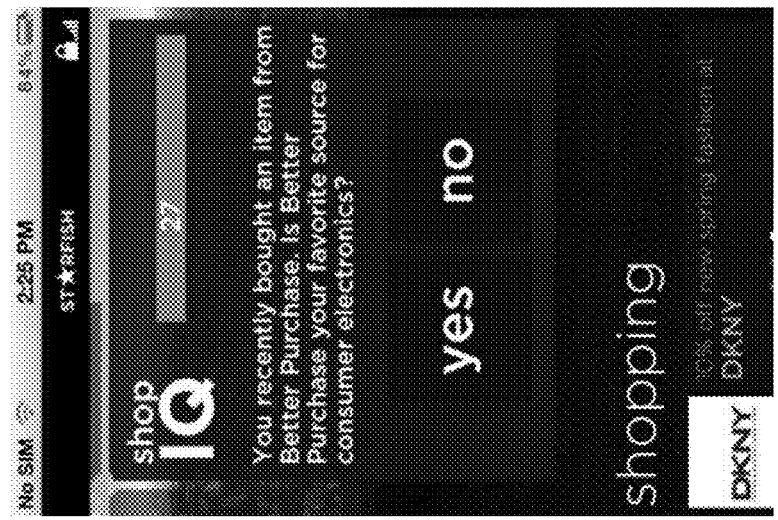
FIG. 15C
FIG. 15B
FIG. 15A

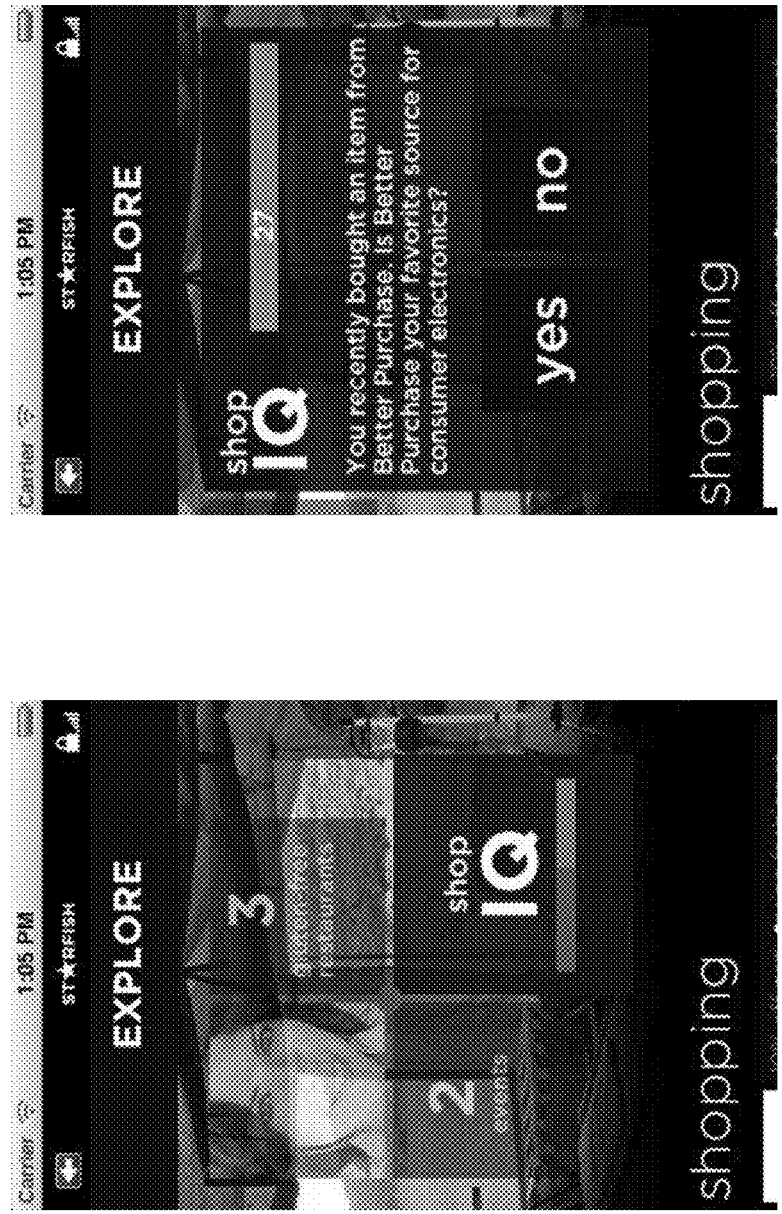

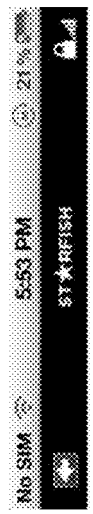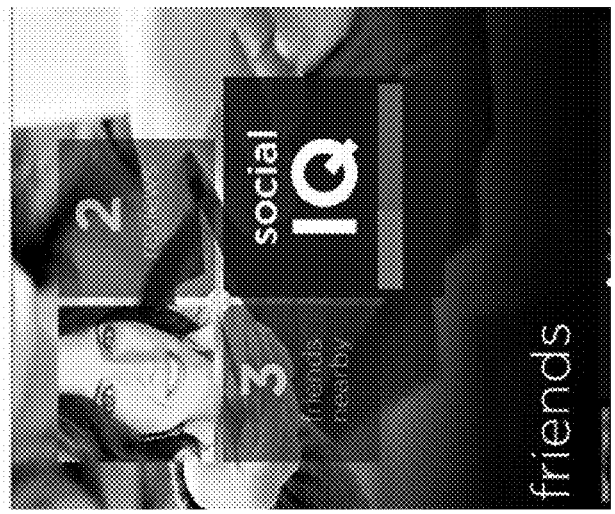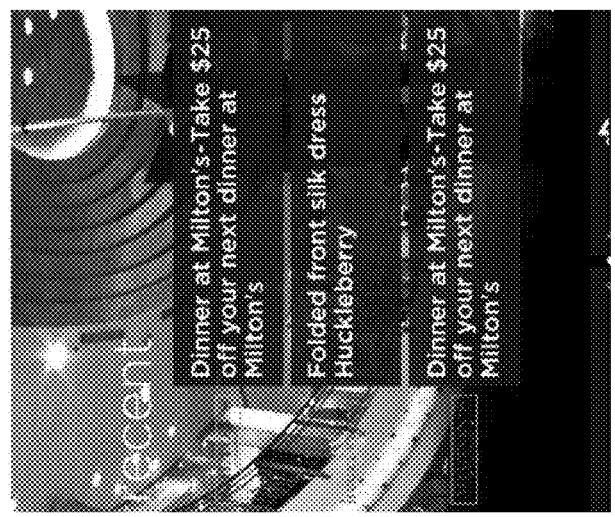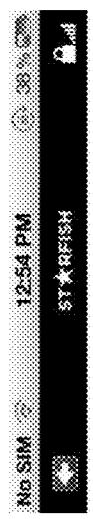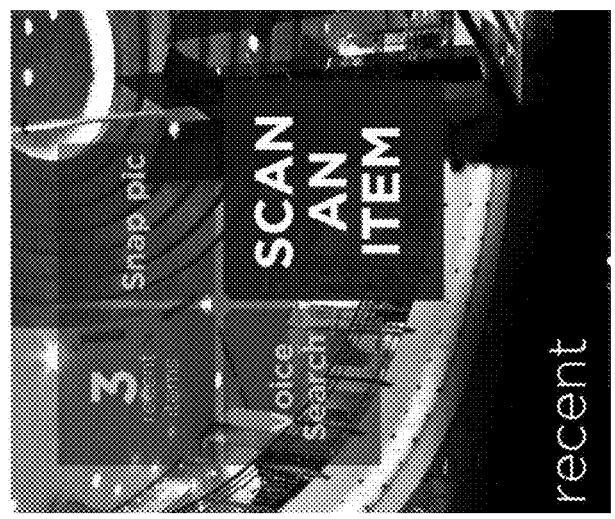
FIG. 17A   FIG. 17B   FIG. 17C

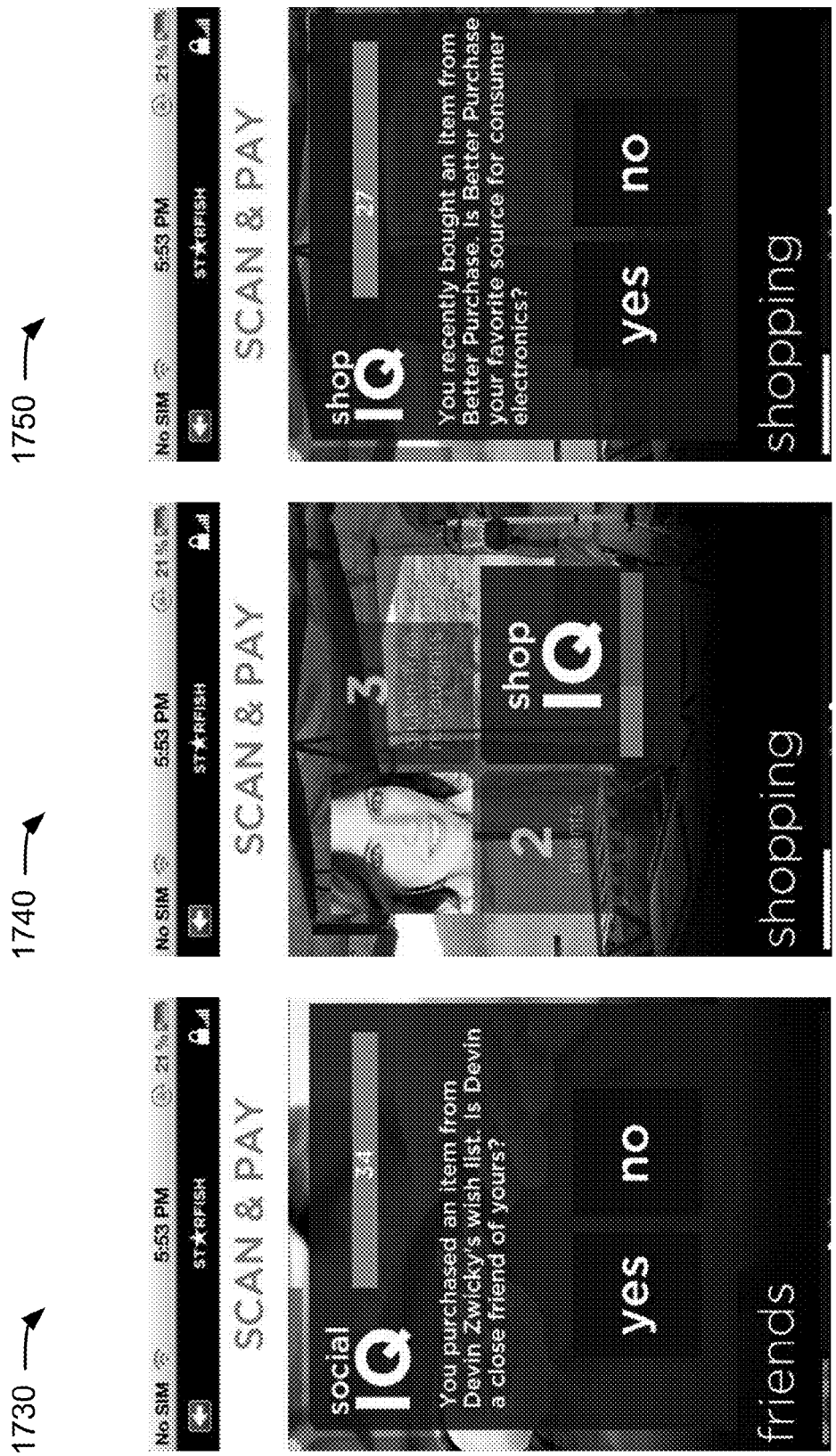

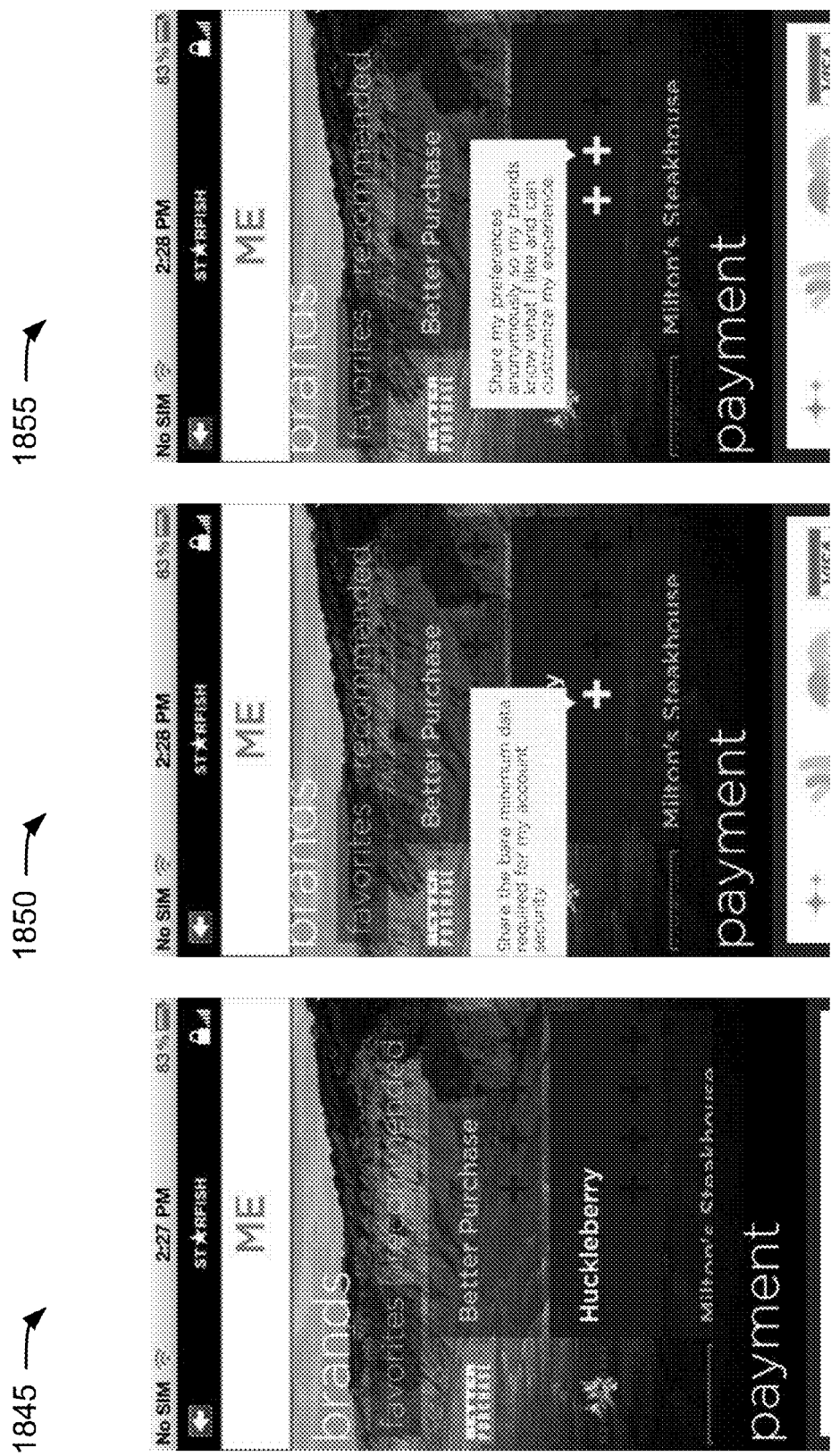

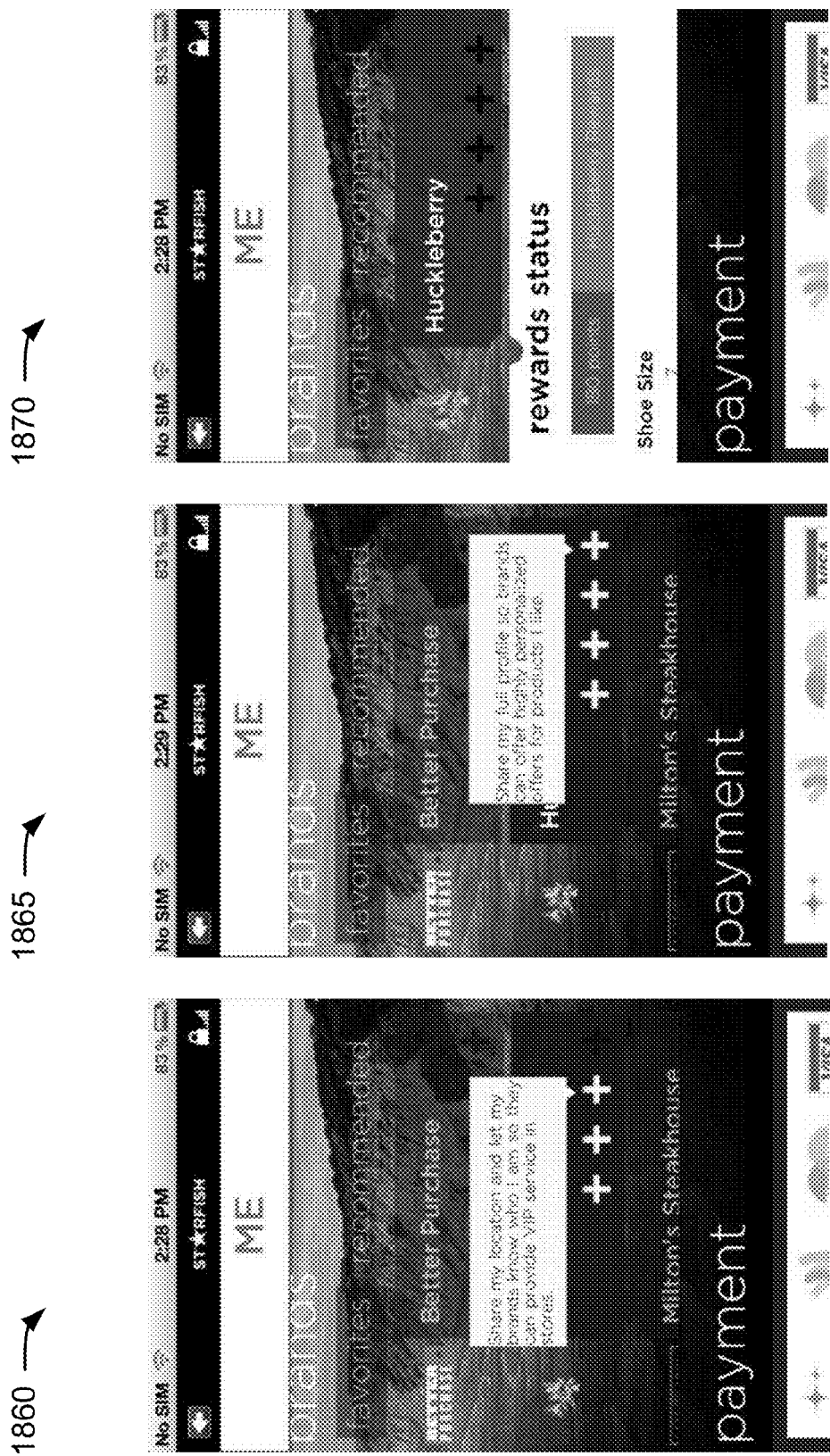

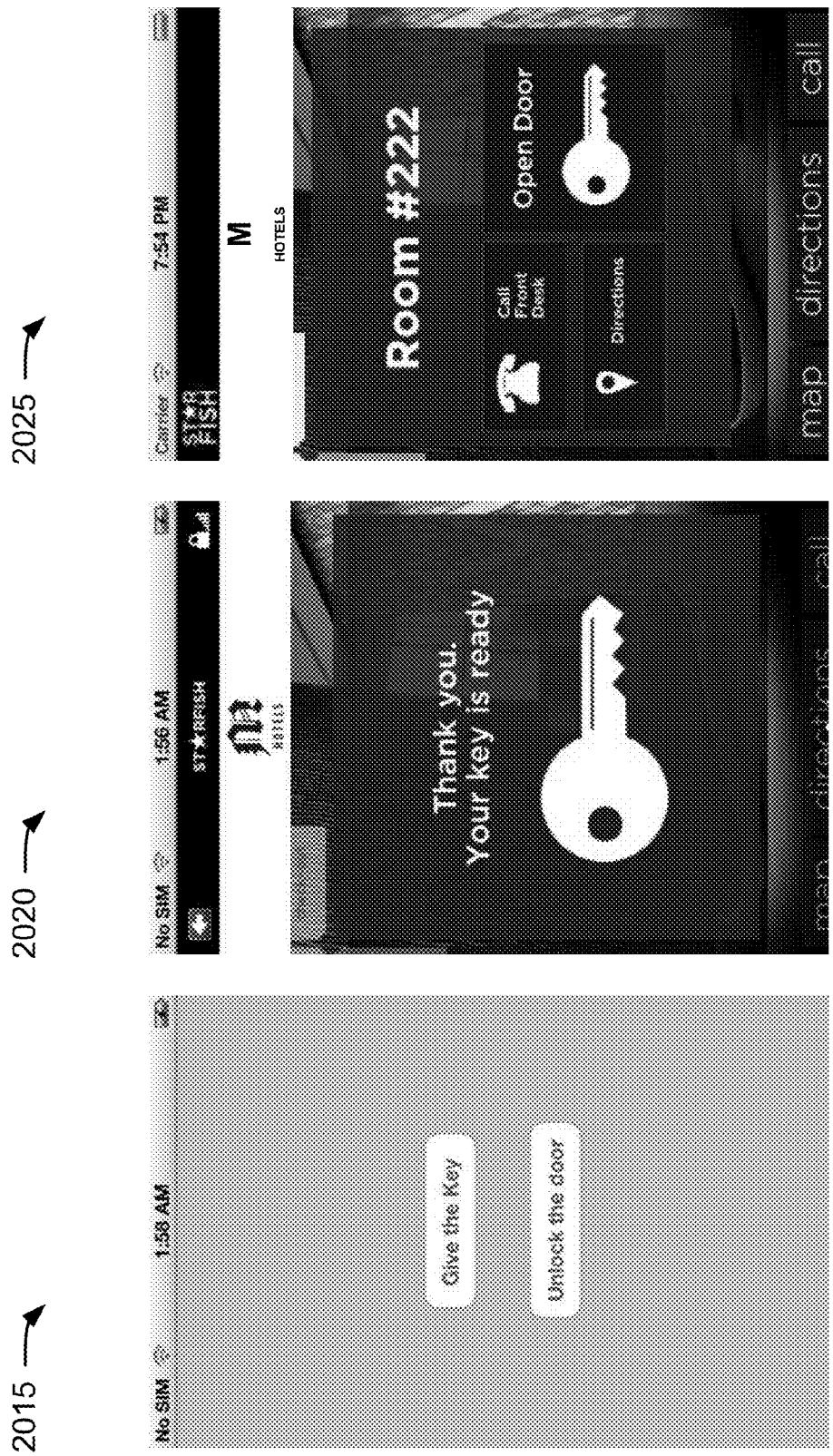

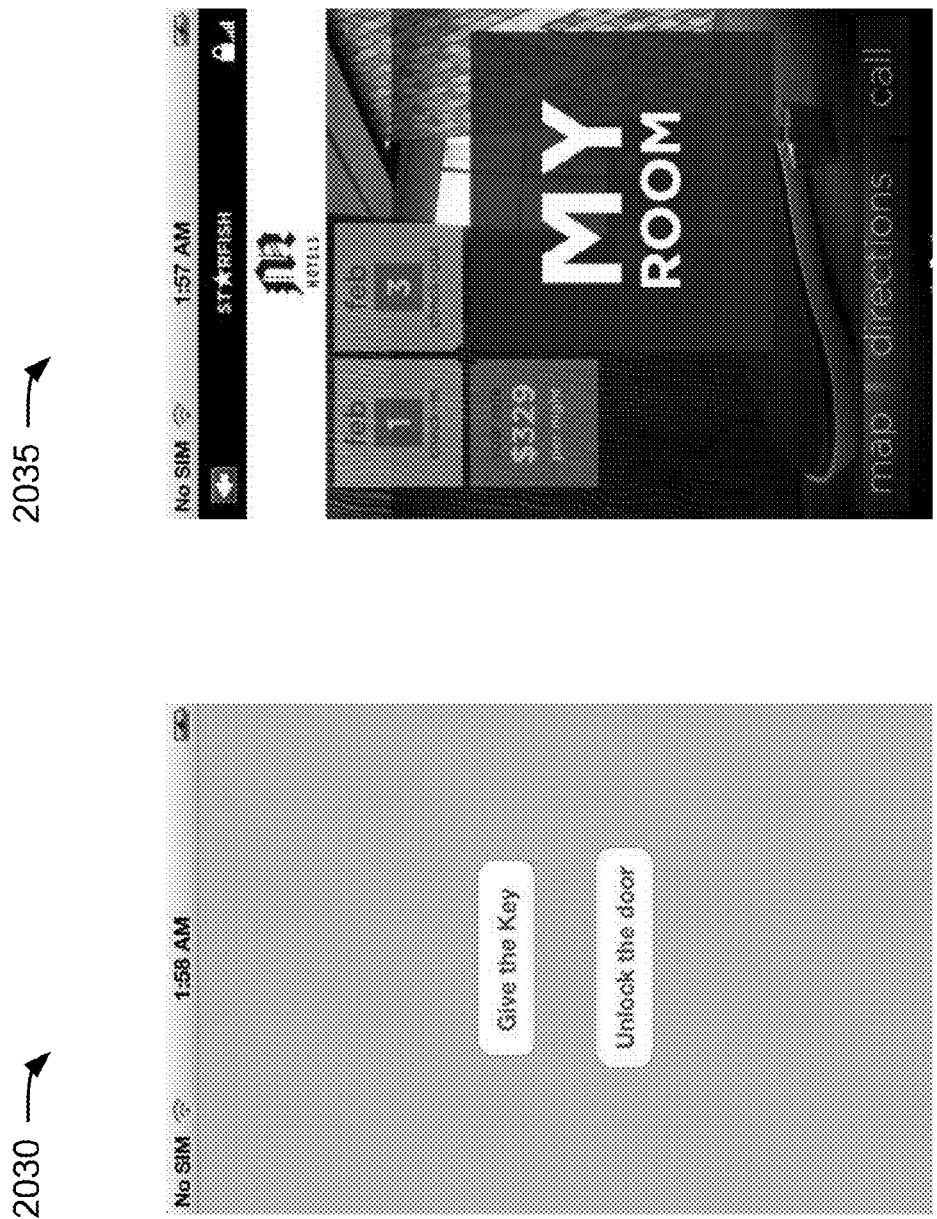

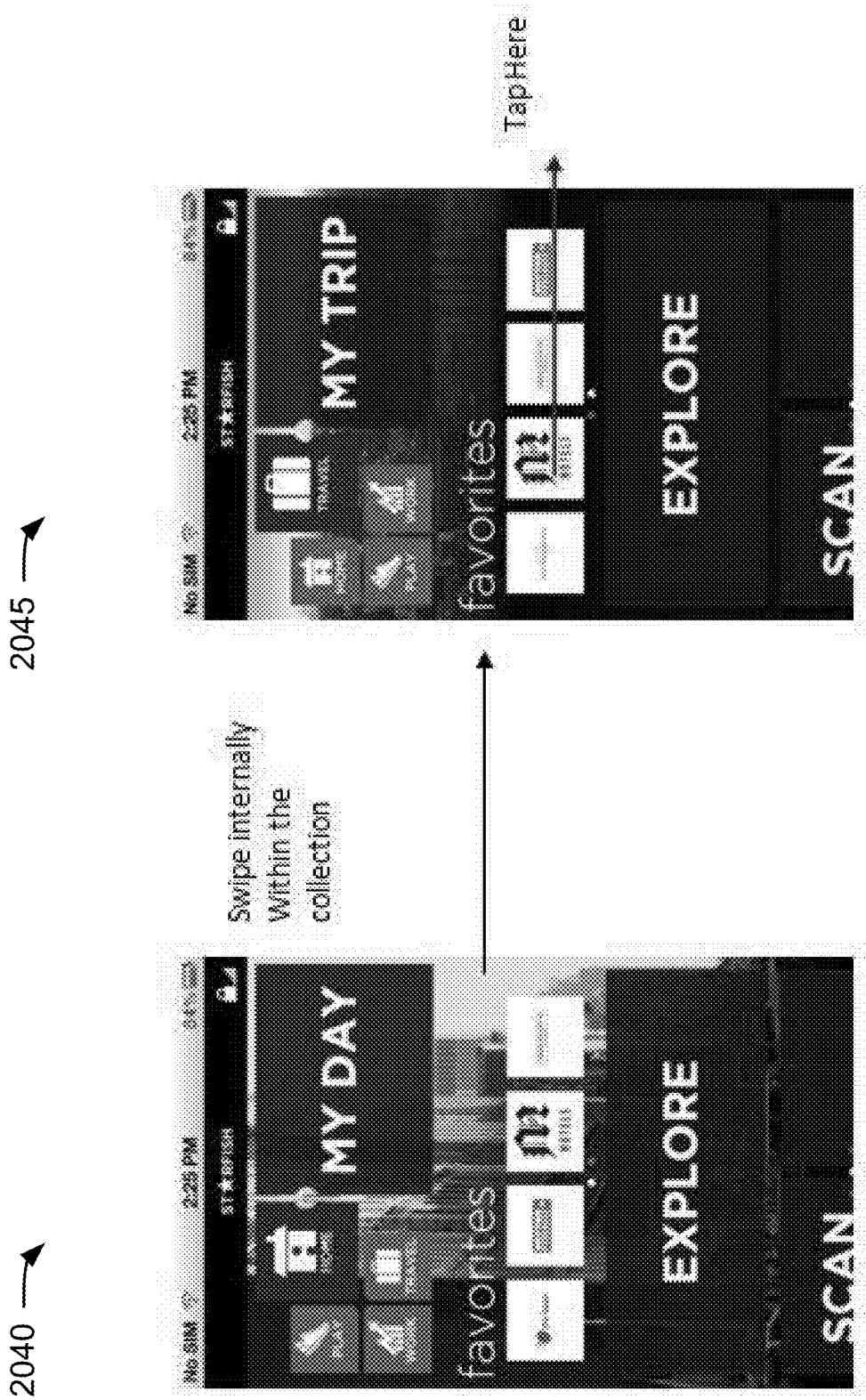

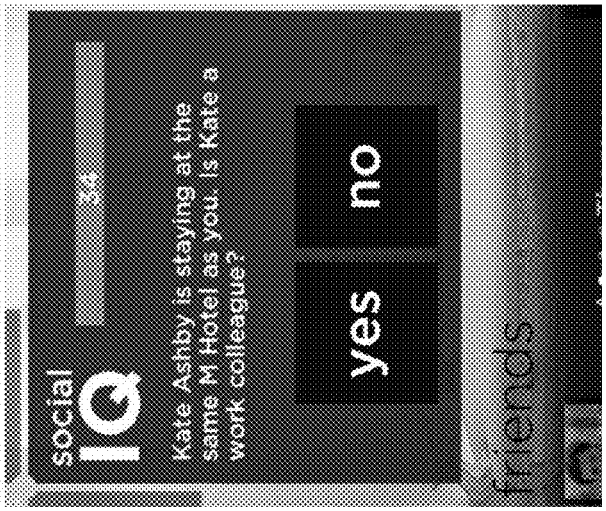
FIG. 20K
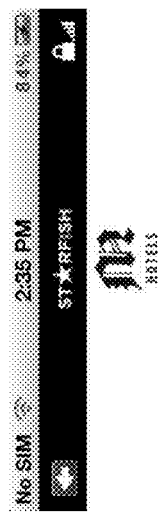
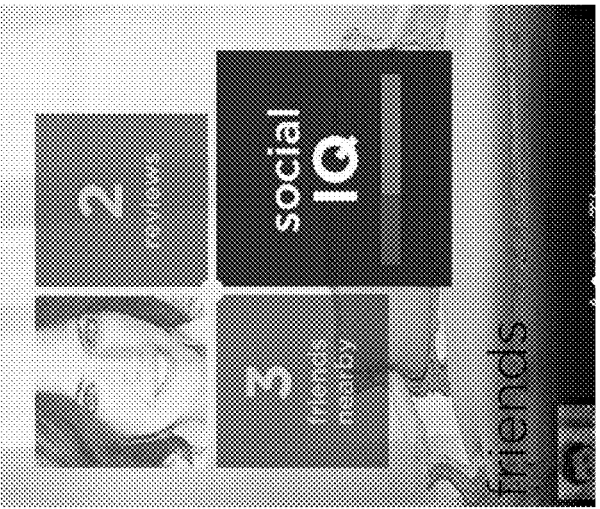
FIG. 20L

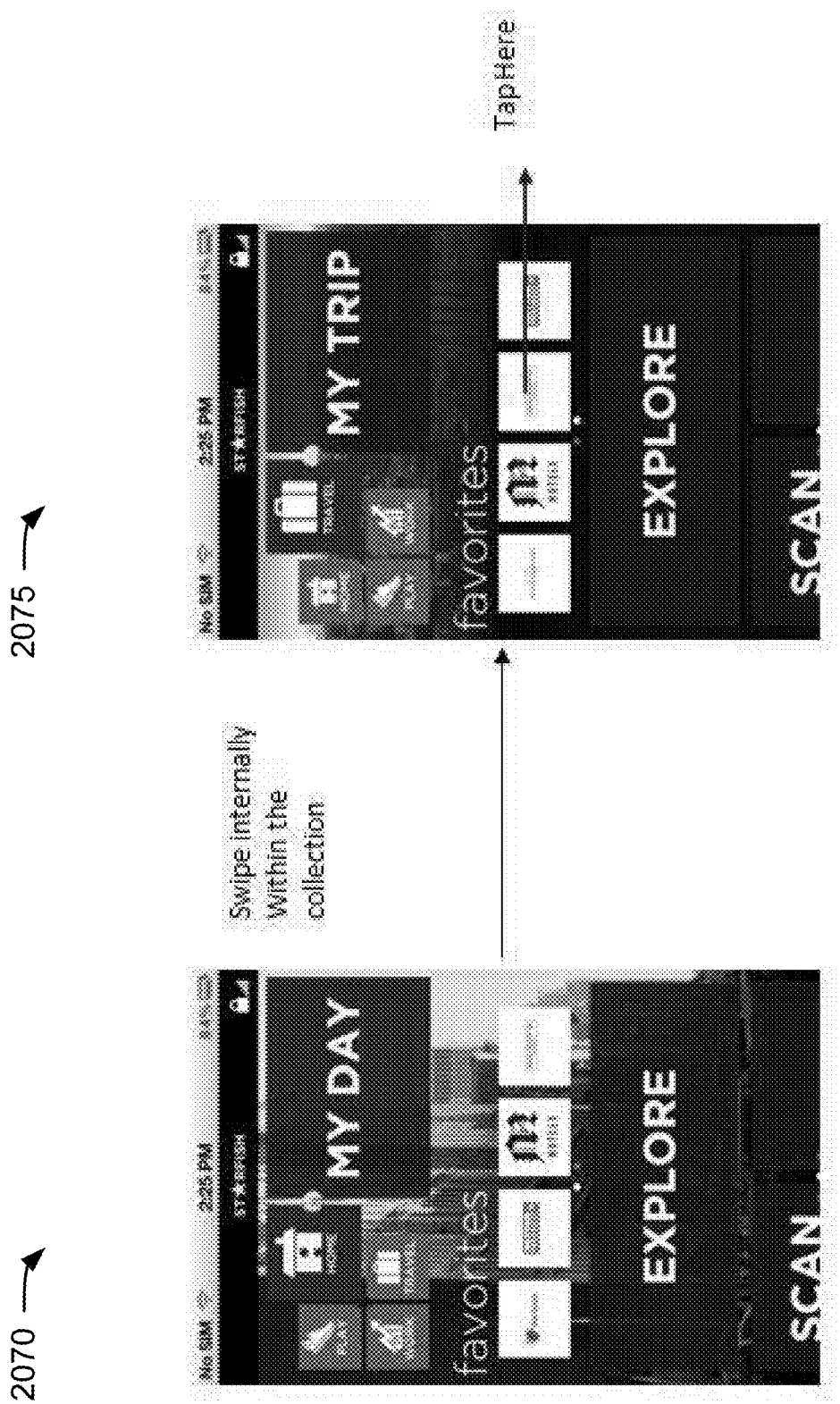

FIG. 21A
FIG. 21B

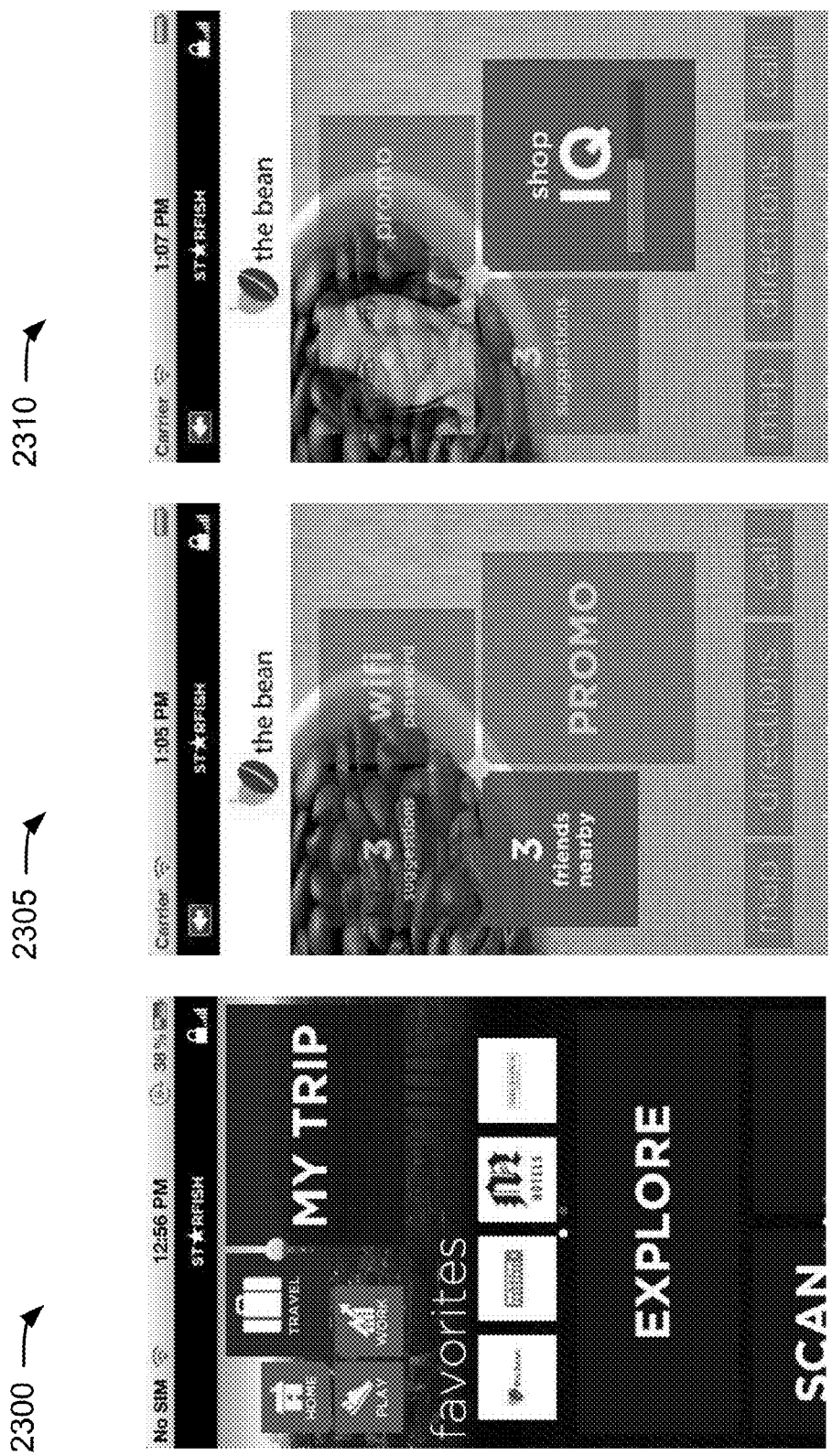

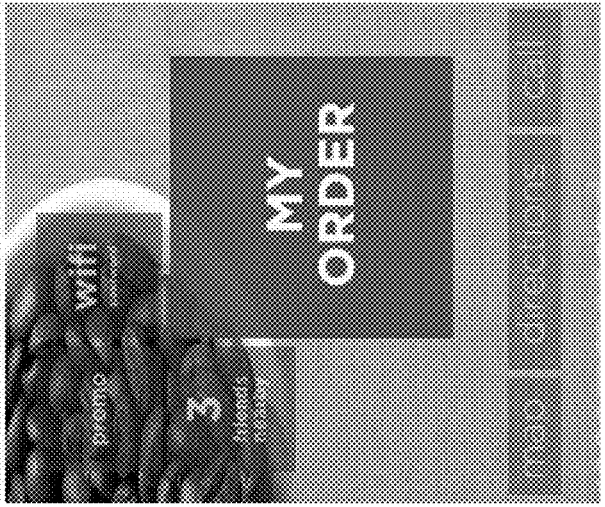
FIG. 23J
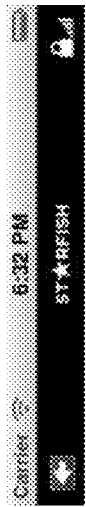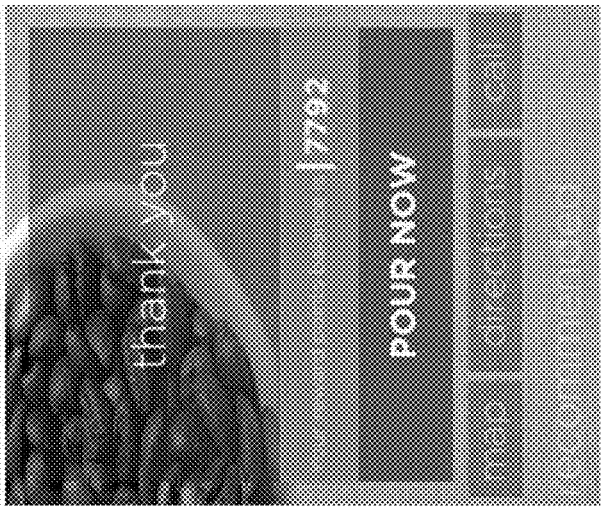
FIG. 23K
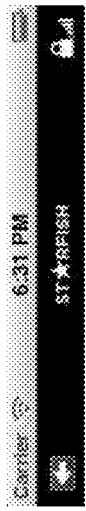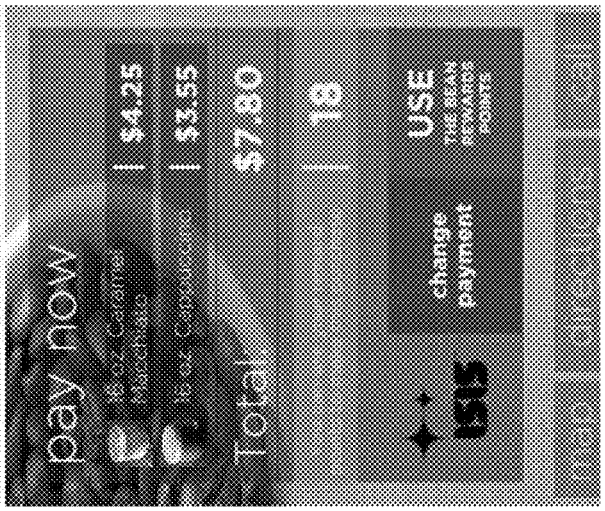
FIG. 23L

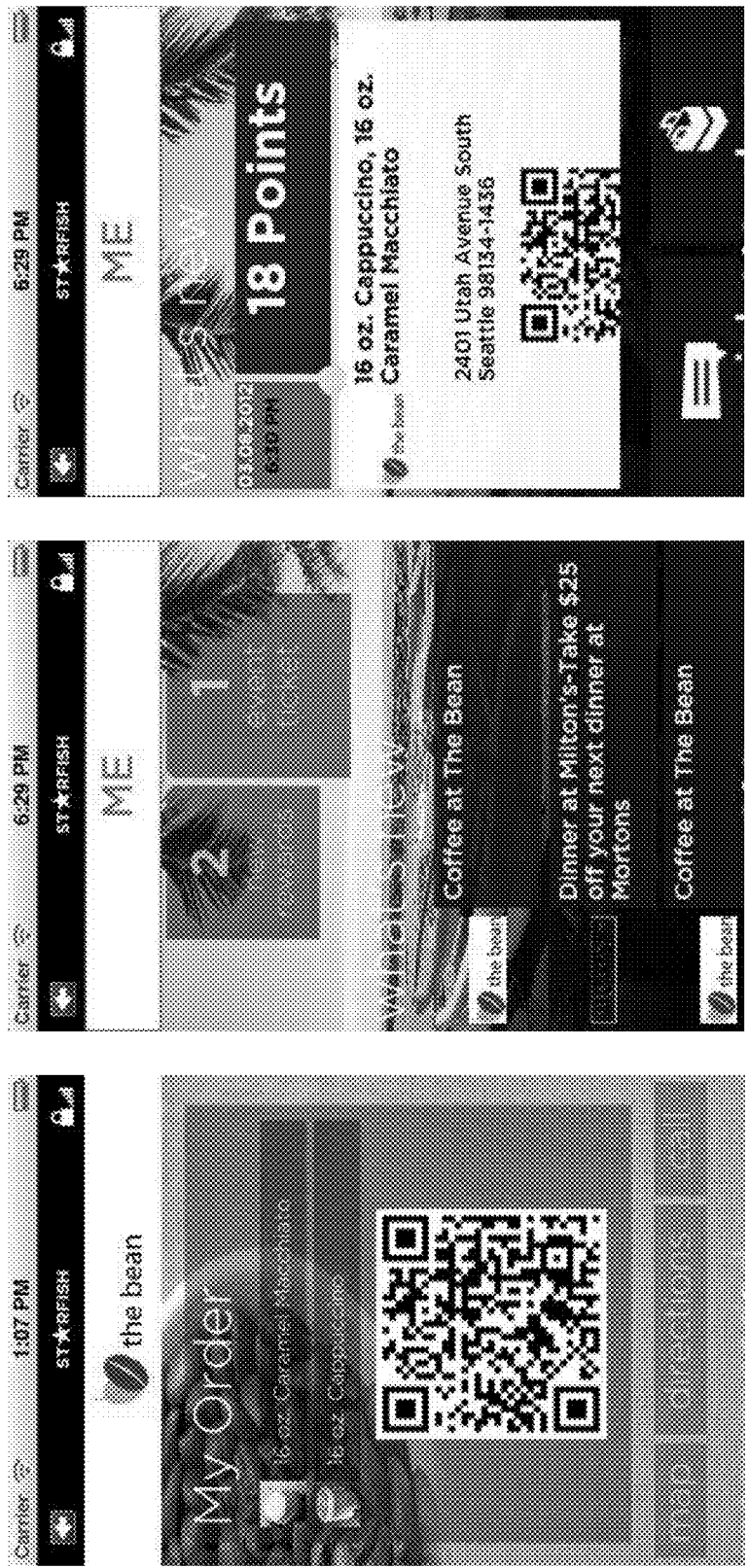

2425

2430

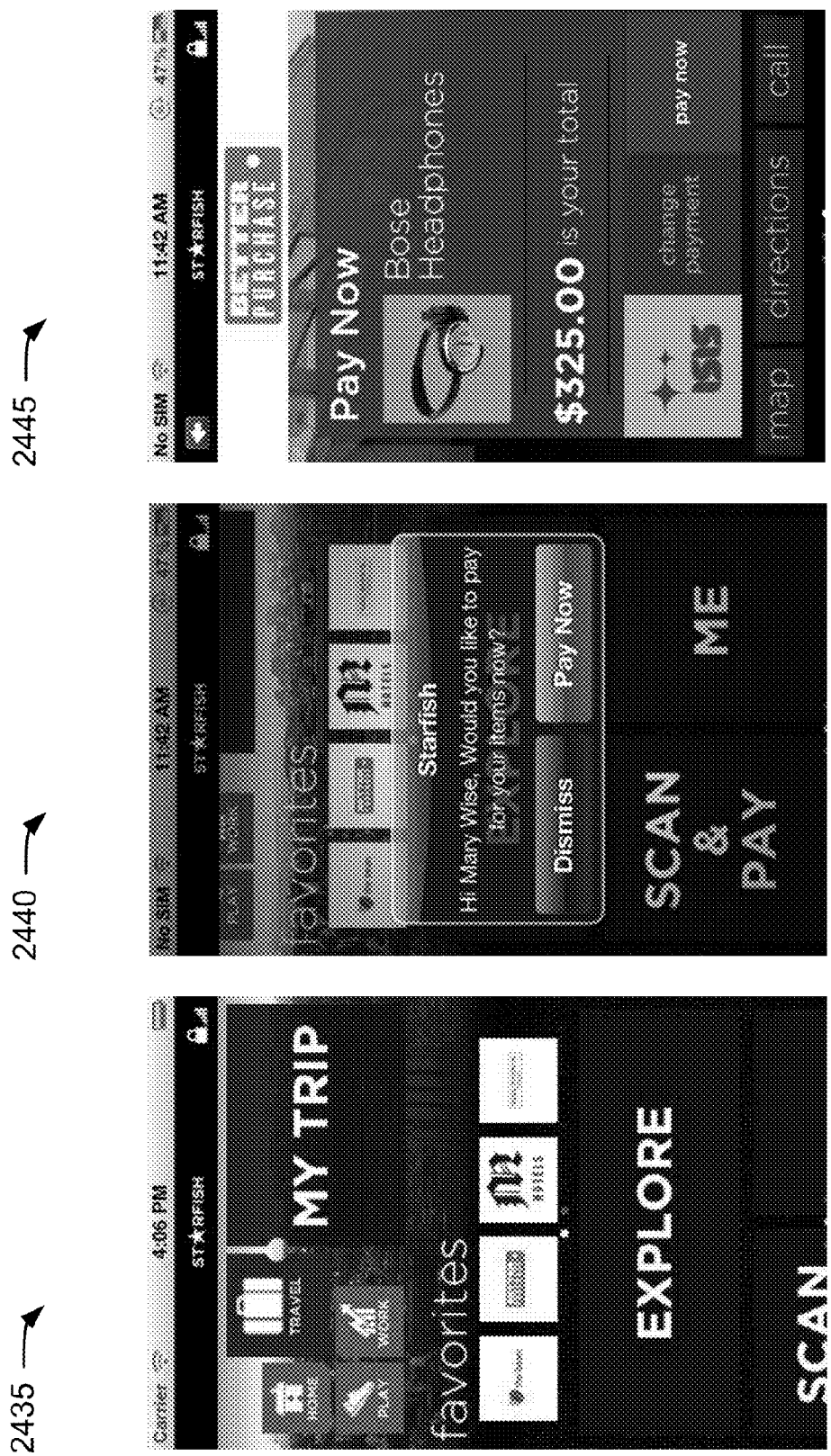

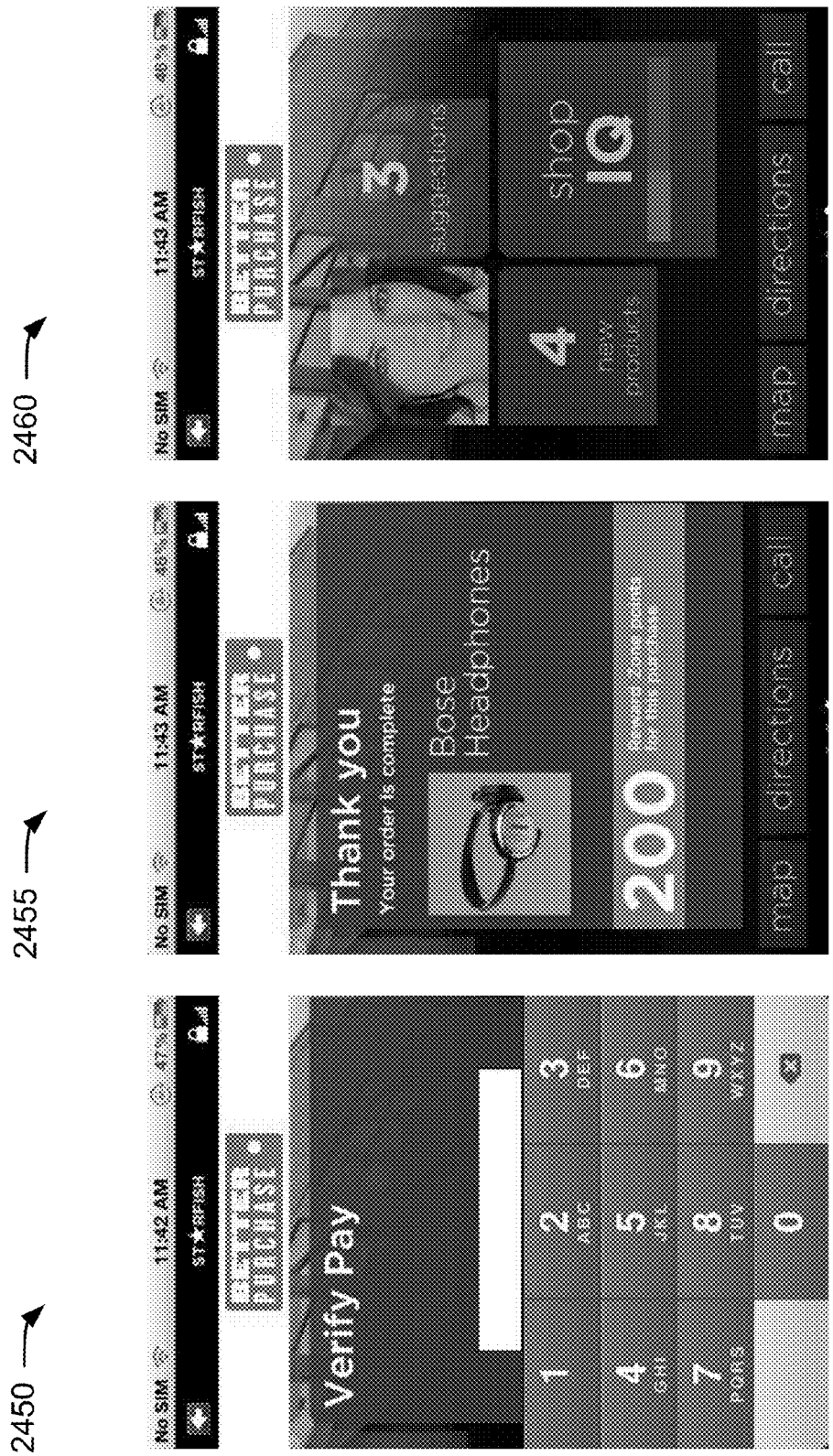

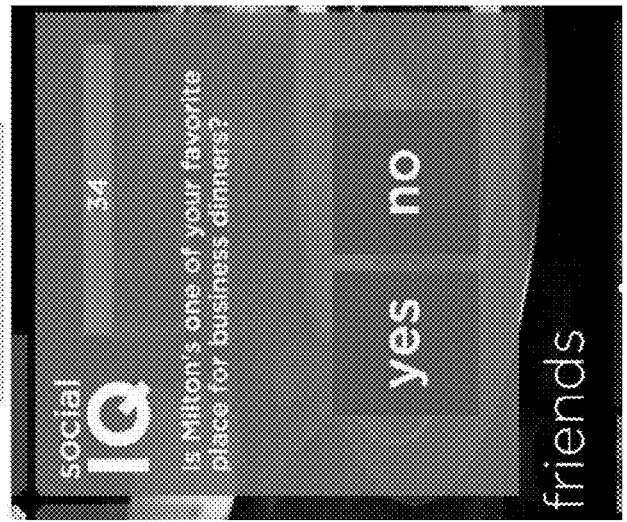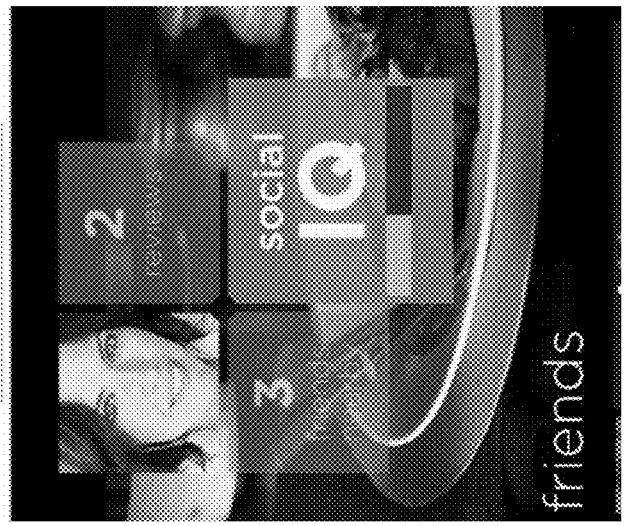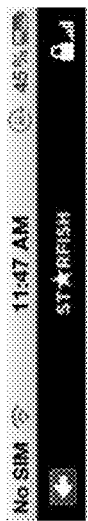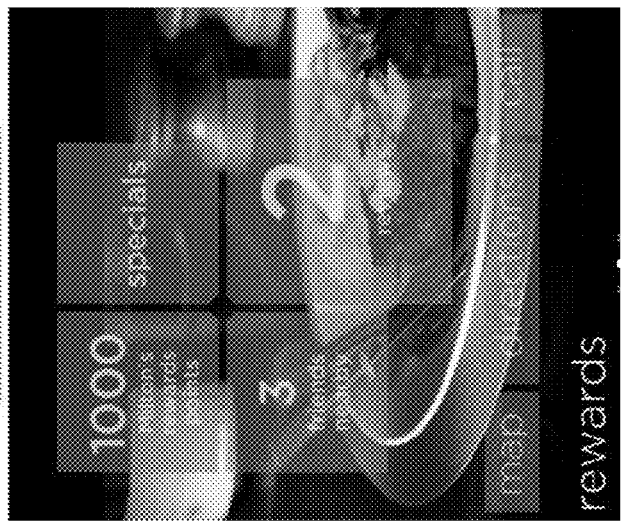
FIG. 26G  FIG. 26H  FIG. 26I

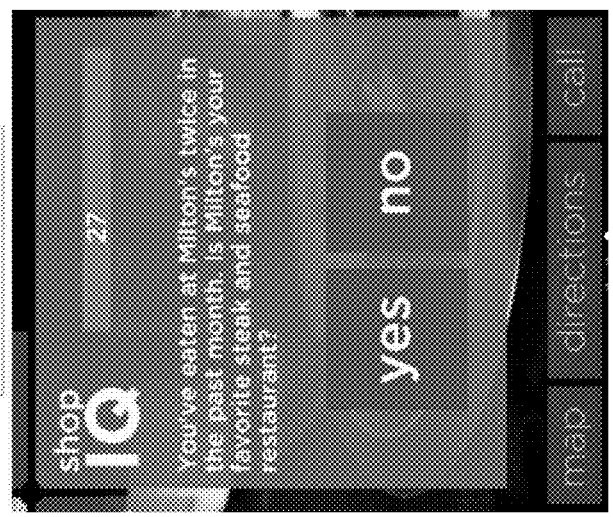
FIG. 26J  FIG. 26K
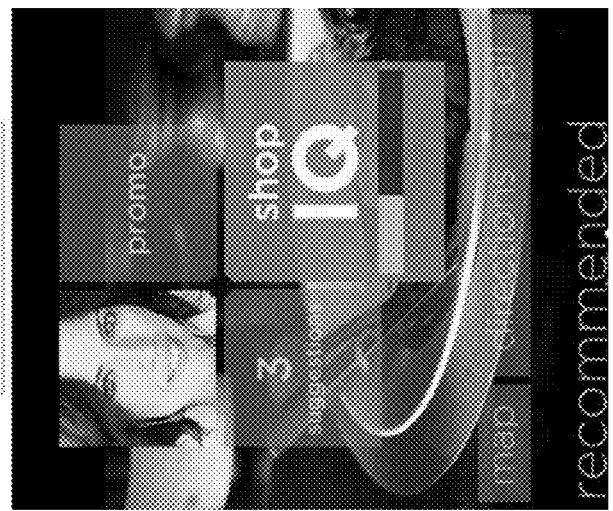
FIG. 26L

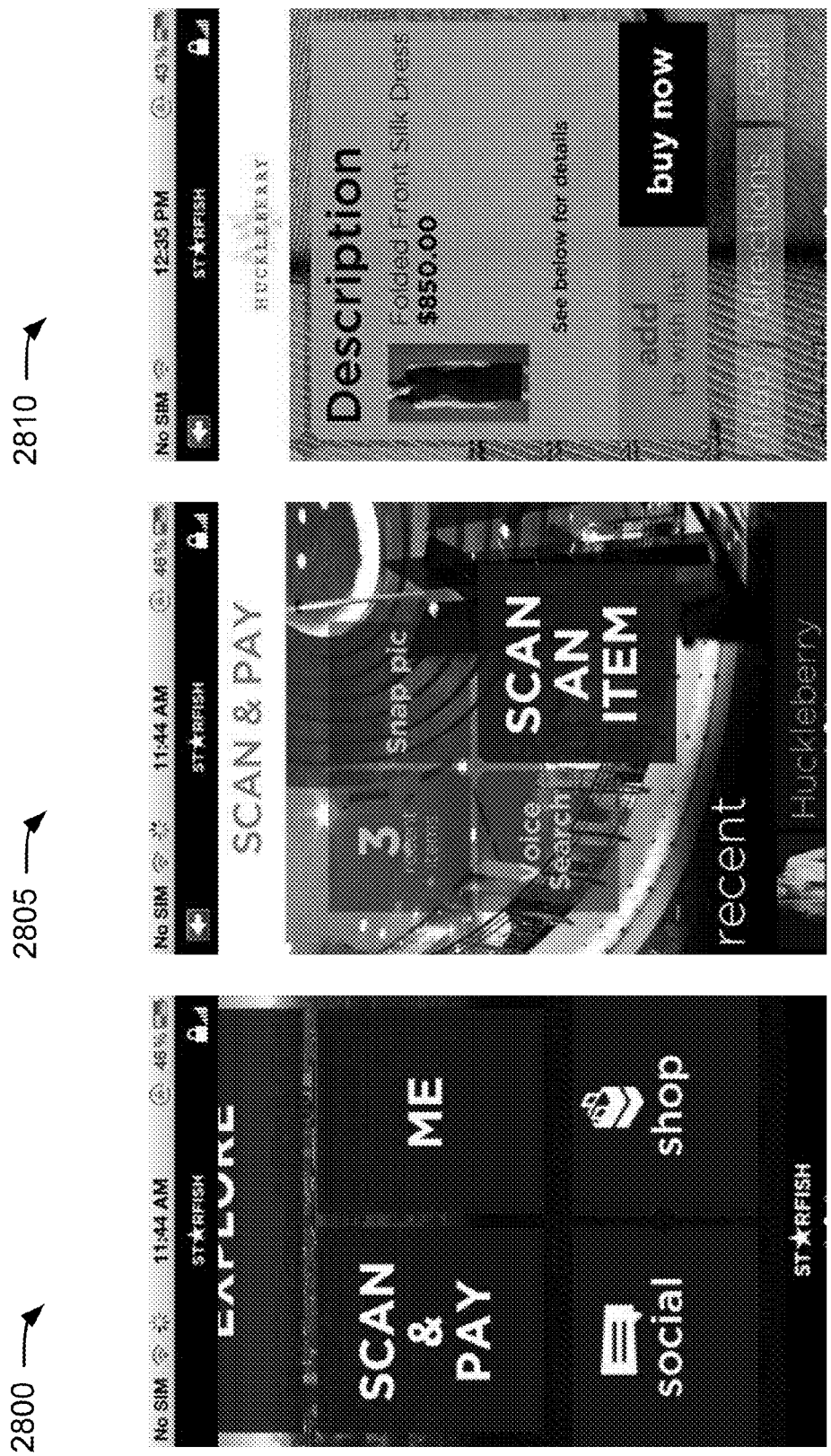

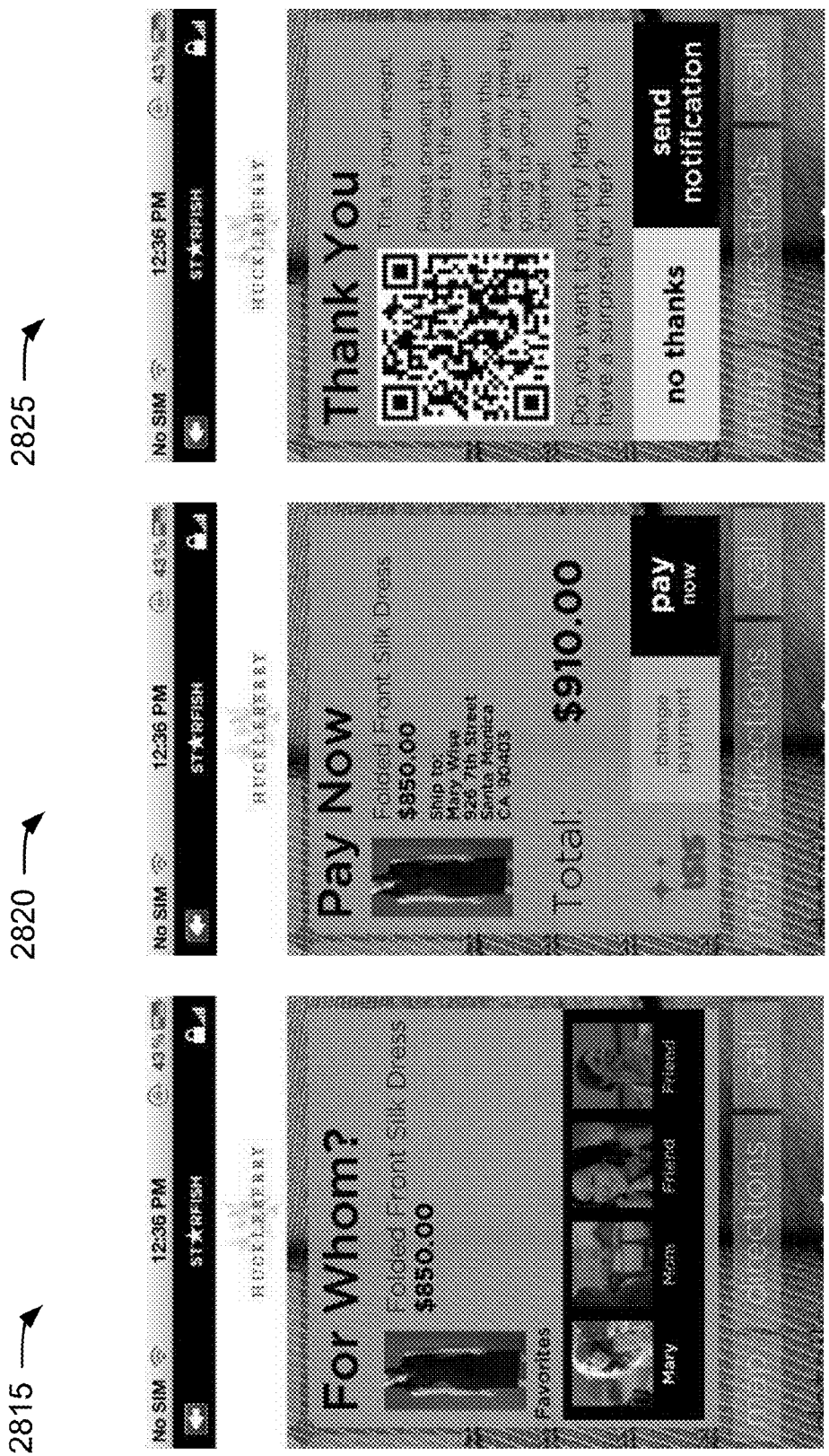

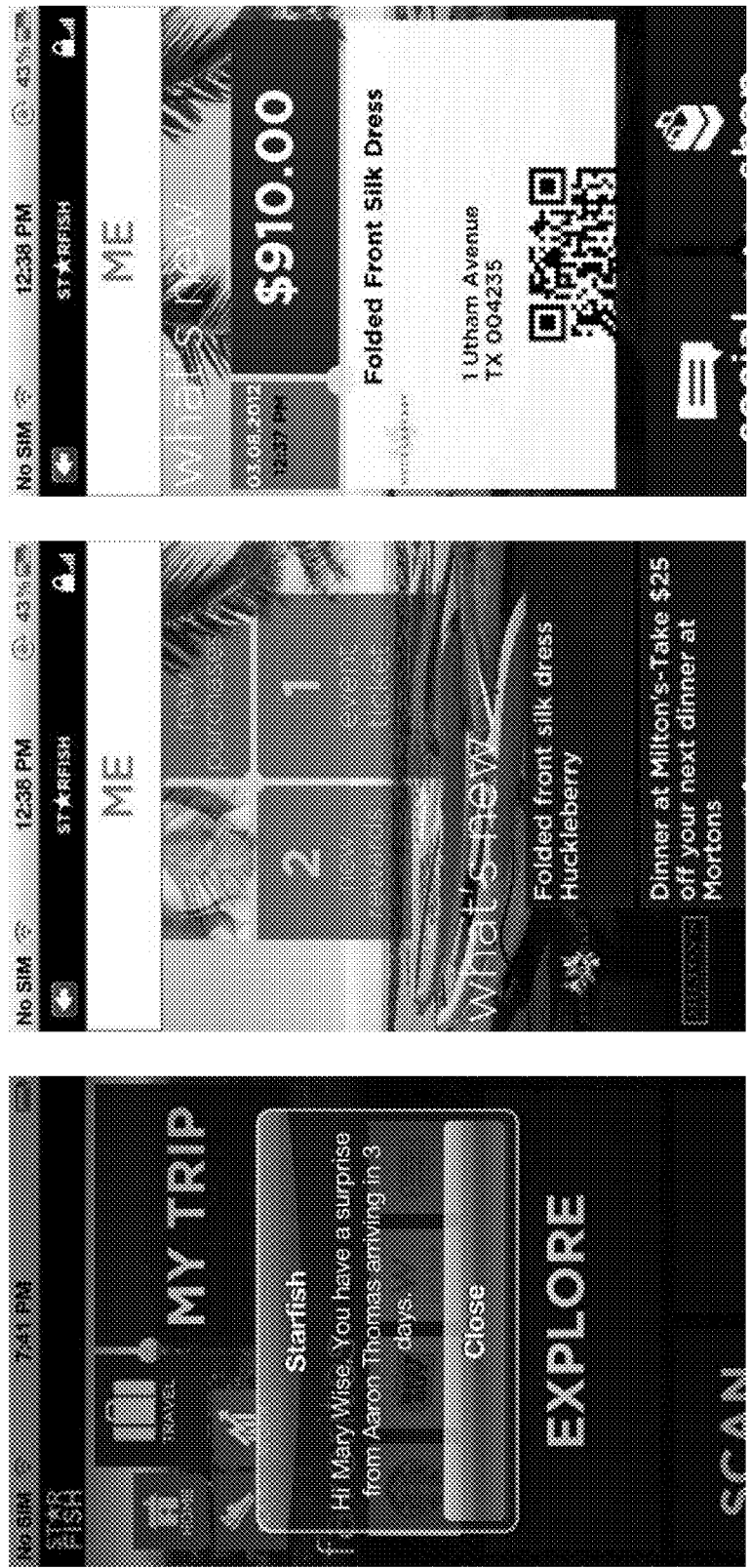

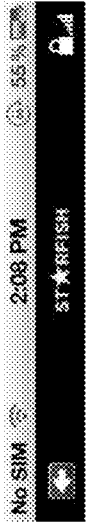
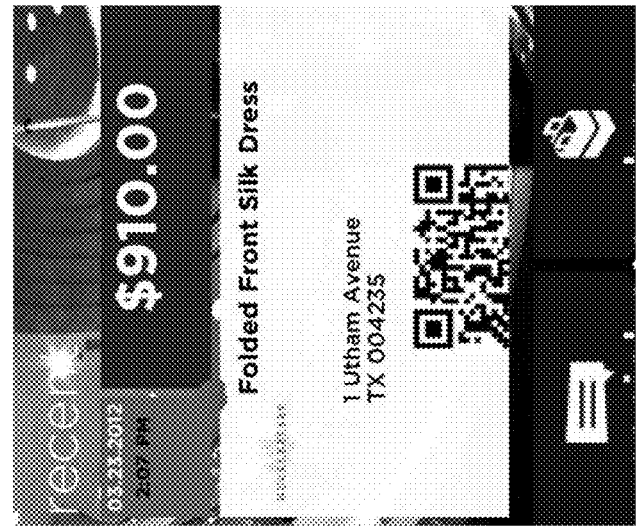
FIG. 28K
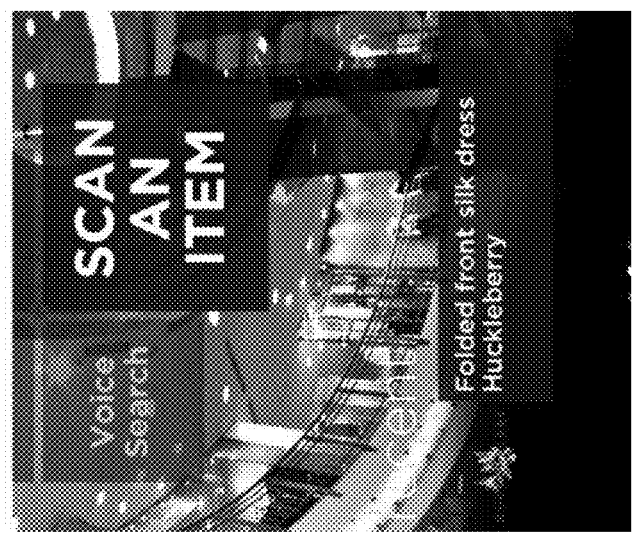
FIG. 28J

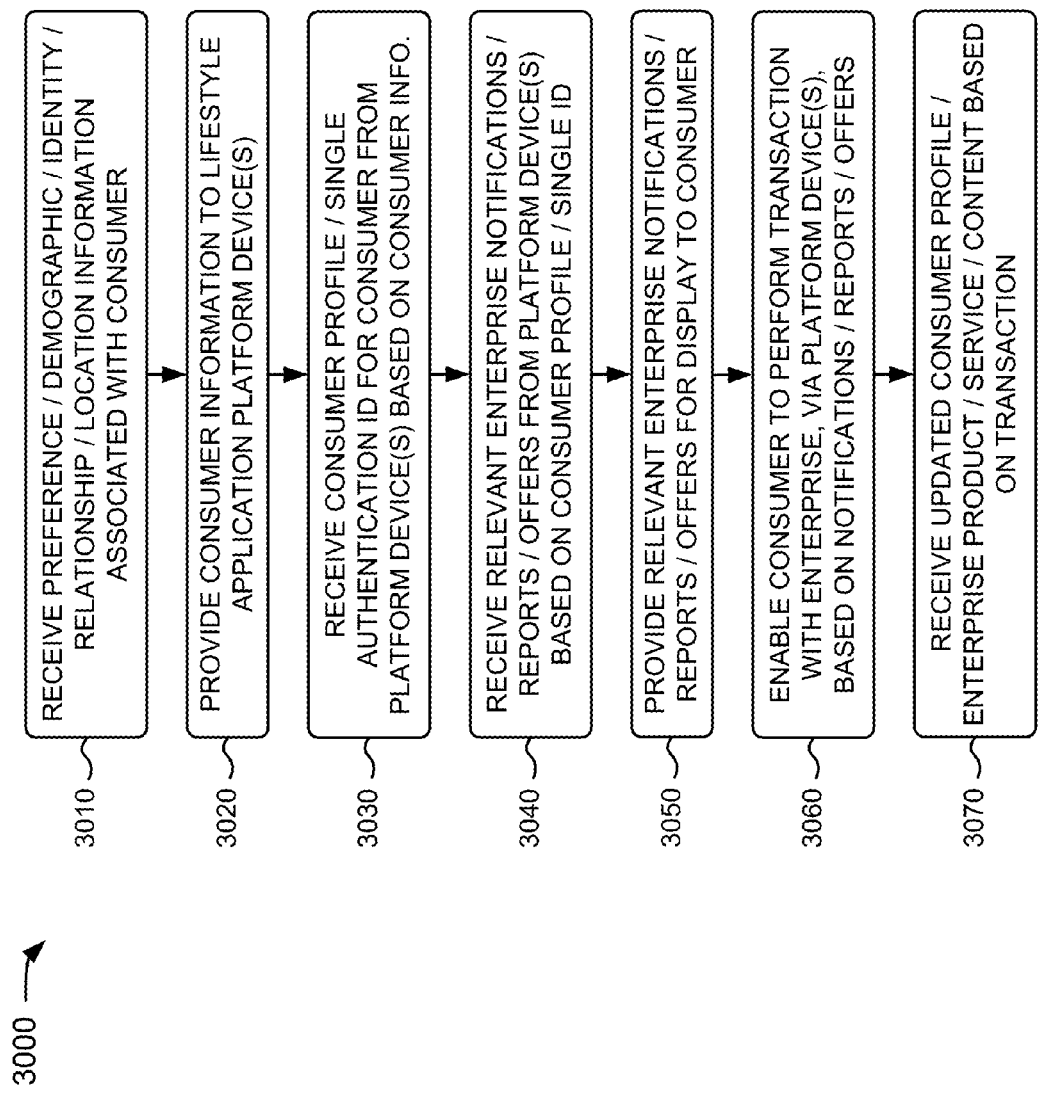

LIFESTYLE APPLICATION FOR CONSUMERS

RELATED APPLICATION

This application claims priority under 35 U.S.C. §119 based on U.S. Provisional Patent Application No. 61/581,916, filed Dec. 30, 2011, the disclosure of which is incorporated by reference herein in its entirety.

BACKGROUND

Consumers today utilize a variety of devices, such as desktop computers, smart phones, tablet computers, etc., to access online services (e.g., email applications, Internet services, television services, etc.), purchase products, services, and/or content online, and/or perform other online tasks. Information associated with the consumers (e.g., personal information, credit card numbers, etc.) may be shared with enterprises (e.g., businesses, government agencies, etc.) that provide such products, services, and/or content so that the consumers can access and interact with the enterprises in an efficient manner. However, many consumers do not permit such information to be shared with enterprises even when the enterprises may provide valuable products, services, and/or content to the consumers. One reason that consumers do not share their information is the fear that the information may be used for improper purposes, such as credit card theft, identity theft and fraud purposes, etc.

Enterprises are constantly trying to find out as much about consumers as possible so that such companies can market appropriate products, services, and/or content to the consumers. However, most enterprises know very little about the consumers of their products, services, and/or content. Until consumers permit their information to be readily shared with the enterprises, neither consumers nor the enterprises will benefit from the information.

Consumer concern about privacy (e.g., tracking, unexplained observation and aggregation of data, etc.) is high and may adversely impact many enterprises. A baseline of clear protections for consumers provides greater certainty for both consumers and enterprises. As envisioned, consumer rights may include individual control, transparency, respect for context, security, access and accuracy, focused collection of data, and accountability. Consumers may have the right to exercise control over what personal data enterprises collect from the consumers and how the enterprises use the personal data. Consumers may also have the right to expect that the personal data will be collected, used, and disclosed in ways that are consistent with a context in which the consumers provide the personal data.

Context-aware computing is the concept of leveraging context information about a consumer (e.g., utilizing a variety of devices) to improve a quality of an interaction with an enterprise. Context-aware computing may include a method by which new experiences are constructed that blend information from mobile, social, digital, and physical world sources.

BRIEF DESCRIPTION OF THE DRAWINGS

FIG. 6 is a diagram of example functional components of a consumer portal component of the lifestyle application platform;

FIGS. 13A-29G are diagrams of example user interfaces that may be generated and/or provided by a user device and/or the lifestyle application platform of FIG. 2; and FIGS. 30-32 are flow charts of an example process for providing a lifestyle application for consumers according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a lifestyle application platform (e.g., a contextual information services platform) that links identity, mobile, social, location, payment, and commerce services to anticipate a consumer's needs and to proactively recommend appropriate and customized products, services, and/or content to the consumer. The lifestyle application platform may enable the enterprises to deliver the right products, services, and/or content to consumers, may improve average revenue per unit (ARPU) for the enterprises, and may lower costs of consumer acquisition and retention. Consumers, via the lifestyle application platform, may obtain more control over their personal information, may receive less unsolicited spam, and may be provided with simple and safe access (e.g., via a single authentication identification (ID)) to their favorite brands of products, services, and/or content.

The lifestyle application platform may integrate several services, such as, for example, identity services, mobile wallet services, marketing and analytics services, emerging strategic services, etc. The lifestyle application platform may provide, to consumers, a lifestyle application (app) (sometimes referred to as "Starfish") that helps the consumers to locate and interact with their favorite brands wherever and whenever the consumers desire. The lifestyle application may link with online and physical experiences of the consumers. The lifestyle application may enable consumers to retain privacy, preferences, and control over their information; to receive relevant offers; to pay on-the-go for products, services, and/or content; and to be rewarded for their interactions with and loyalty to particular brands. Through the lifestyle application platform, the enterprises may grow, retain, and improve loyalty of their consumers, whether the consumers are on-line, mobile, or walking past a store.

Figure 1:
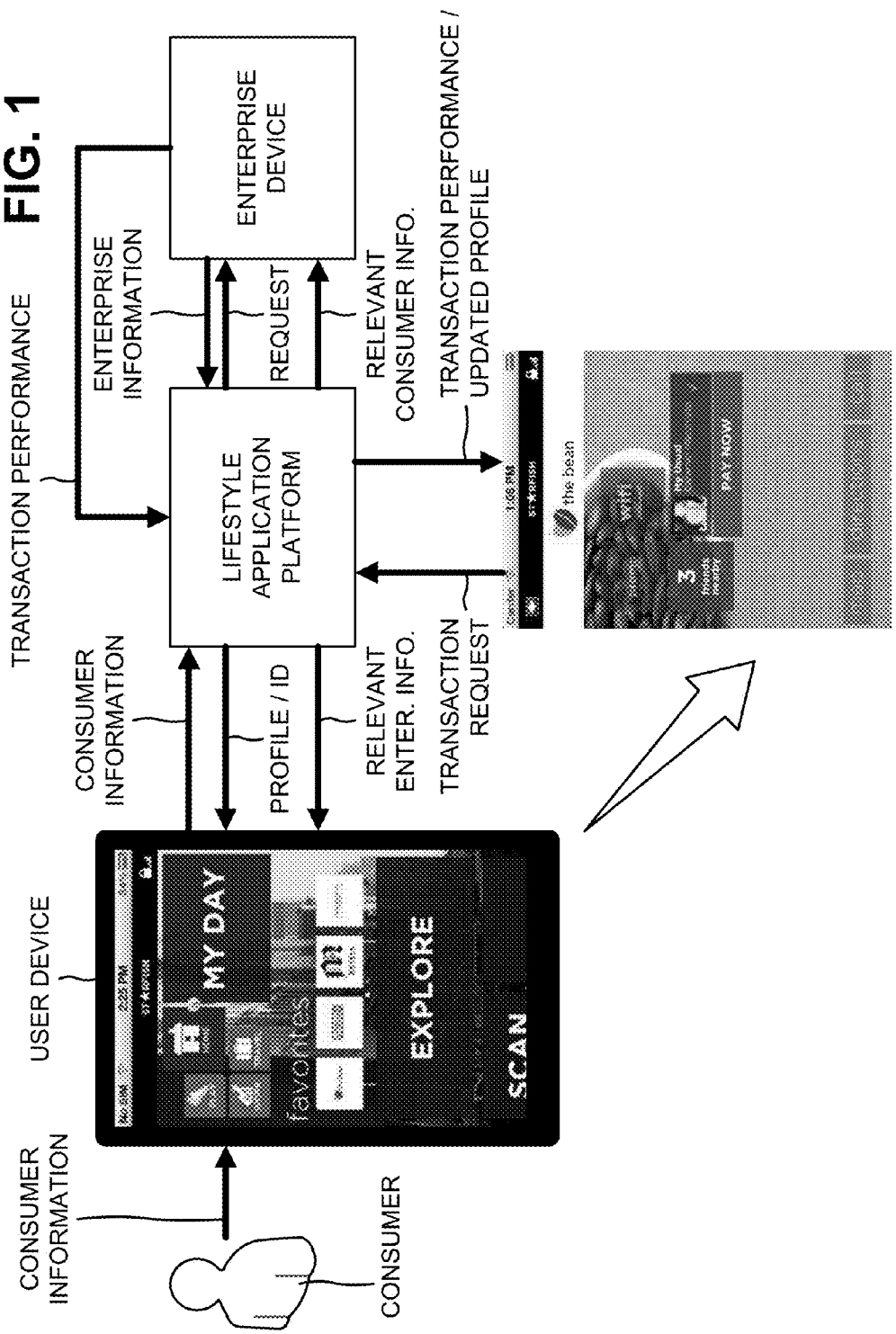
FIG. 1 is a diagram of an overview of an example implementation described herein.

FIG. 1 is a diagram of an overview of an example implementation described herein. As shown, a user device, an enterprise device, and a lifestyle application platform may be interconnected. The user device may include a smart phone, a mobile telephone, a tablet computer, a desktop computer, a workstation computer, or other types of computation and communication devices. The enterprise device may include one or more server devices, or other types of computation and communication devices, that support products, services, and/or content provided by enterprises to consumers. The lifestyle application platform may include one or more server devices, or other types of computation and communication devices, that link identity, mobile, social, location, payment, and commerce services to anticipate consumers' needs and to proactively recommend appropriate and customized products, services, and/or content to the consumers.

As further shown in FIG. 1, the user device may be associated with a consumer, and may receive consumer information from the consumer. The consumer information may include brand preferences (e.g., for products, services, and/or content); demographic information (e.g., gender, race, age, etc.); identity information (e.g., anonymous identity, pseudonymous identity, legal identity, etc.); relationship information (e.g., relationships with other consumers); etc. associated with the consumer. The user device may add information to the consumer information, such as location information (e.g., an Internet protocol (IP) address, global position system (GPS) coordinates, etc.) and/or capability information (e.g., a make, model, etc.) associated with the user device. The user device may provide the consumer information to the lifestyle application platform.

The lifestyle application platform may receive the consumer information, and may create a consumer profile and a single authentication ID for the consumer based on the consumer information. The single authentication ID may include a password, a thumbprint, a voice command, a retinal scan, etc. associated with the consumer.

The enterprise device may be associated with an enterprise (e.g., a business, an organization, a government agency, etc.), and may provide enterprise information to the lifestyle application platform. The enterprise information may include offers for products, services, and/or content provided by the enterprise; information associated with consumer interactions with the enterprise (e.g., consumer profiles, consumer information gathered by the first enterprise, etc.); information associated with consumer transactions with the enterprise; information associated with consumer preference packages (e.g., wish lists) for products, services, and/or content provided by the enterprise; etc.

The lifestyle application platform may receive the consumer information and the enterprise information. The lifestyle application platform may analyze the consumer information and the enterprise information, and may generate, from the enterprise information, notifications, reports, offers, etc. for products, services, and/or content (e.g., provided by the enterprise) relevant to the consumer based on the analysis. The lifestyle application platform may provide the notifications, reports, offers, etc. (e.g., relevant enterprise information) to the user device, which may display the notifications, reports, offers, etc. to the consumer.

The lifestyle application platform may generate, from the consumer information, consumer information (e.g., consumer profile data) relevant to the enterprise based on the analysis. The lifestyle application platform may provide the relevant consumer information to the enterprise device, which may display the relevant consumer information to a user associated with the enterprise.

Although not shown in FIG. 1, the consumer (e.g., via the user device) may retrieve a lifestyle application (app) from the lifestyle application platform, and may install the lifestyle application on the user device. The lifestyle application may enable the user device to provide the consumer information to the lifestyle application platform and to receive the consumer profile, the single authentication ID, and/or the relevant enterprise information from the lifestyle application platform. As further shown in FIG. 1, the lifestyle application may display information associated with the consumer profile, the single authentication ID, and/or the relevant enterprise information on the user device. For example, the lifestyle application may display a main page that includes information associated with the consumer's schedule (e.g., "My Day"), favorite enterprises, options to explore the relevant enterprise information, etc.

If the consumer selects a coffee shop (e.g., "the bean") from the favorites section displayed by the lifestyle application, the consumer may quickly and easily perform a transaction (e.g., buy coffee) with the coffee shop via the lifestyle application. The lifestyle application (e.g., via the user device) may provide a transaction request (e.g., to buy coffee) to the lifestyle application platform, and the lifestyle application platform may provide the transaction request to the enterprise device. The enterprise device may perform the transaction (e.g., may sell a cup of coffee to the consumer) based on the transaction request, and may provide an indication of the transaction performance to the lifestyle application platform. The lifestyle application platform may update the consumer profile based on the transaction (e.g., may increase a preference level for the coffee shop), and may provide the indication and/or the updated consumer profile to the user device. The lifestyle application may display the indication and/or the updated consumer profile to the consumer.

As used herein, the terms "consumer" and "user" may be used interchangeably. Also, the terms "consumer" and "user" are intended to be broadly interpreted to include a user device, or a user of a user device. The term "enterprise," as used herein, is intended to be broadly interpreted to include a business, an organization, a government agency, an enterprise device, a user of an enterprise device, etc.

A "product," as the term is used herein, is to be broadly interpreted to include anything that may be marketed or sold as a commodity or a good. For example, a product may include bread, coffee, bottled water, milk, soft drinks, pet food, beer, fuel, meat, fruit, automobiles, clothing, etc.

A "service," as the term is used herein, is to be broadly interpreted to include any act or variety of work done for others (e.g., for compensation). For example, a service may include a repair service (e.g., for a product), a warranty (e.g., for a product), telecommunication services (e.g., telephone services, Internet services, network services, radio services, television services, video services, etc.), an automobile service (e.g., for selling automobiles), a food service (e.g., a restaurant), a banking service, a lodging service (e.g., a hotel), etc.

The term "content," as used herein, is to be broadly interpreted to include video, audio, images, software downloads, and/or combinations of video, audio, images, and software downloads.

The term "component," as used herein, is to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
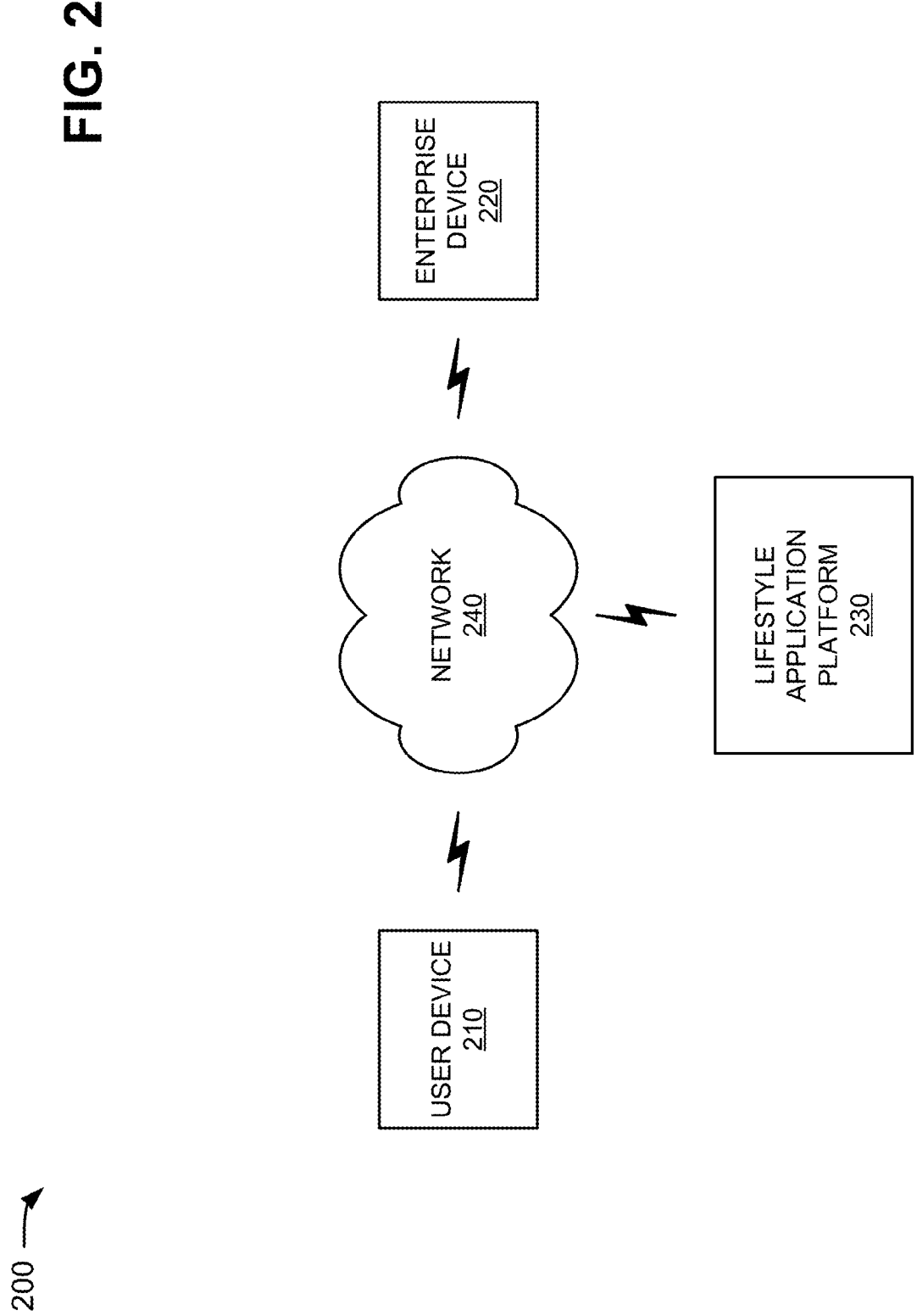
FIG. 2 is a diagram of an example environment in which systems and/or methods described herein may be implemented.

FIG. 2 is a diagram of an example environment 200 in which systems and/or methods described herein may be implemented. As illustrated, environment 200 may include a user device 210, an enterprise device 220, and a lifestyle application platform 230 connected by a network 240. The devices and/or the network of environment 200 may interconnect via wired and/or wireless connections.

User device 210 may include, for example, a radiotelephone; a personal communications system (PCS) terminal that may combine, for example, a cellular radiotelephone with data processing and data communications capabilities; a smart phone; a personal digital assistant (PDA) that may include, for example, one or more of a radiotelephone, a pager, Internet/intranet access, etc.; a laptop computer; a tablet computer; a desktop computer; a workstation computer; or other types of computation and communication devices. In one example, user device 210 may include a device that is capable of communicating with enterprise device 220 and/or lifestyle application platform 230 via network 240.

Enterprise device 220 may include one or more server devices, or other types of computation and communication devices, that gather, process, search, and/or provide information in a manner described herein. In one example implementation, enterprise device 220 may provide information associated with products, services, and/or content provided by an enterprise. For example, if the enterprise is a bank, enterprise device 220 may provide online banking services that enable consumers to perform transactions (e.g., deposits, withdrawals, etc.) with the bank; may provide electronic bank statements to consumers; may provide offers for services (e.g., loans, mortgages, etc.) to consumers; etc.

Lifestyle application platform 230 may include one or more server devices, or other types of computation and communication devices, that gather, process, search, and/or provide information in a manner described herein. In one example implementation, lifestyle application platform 230 may link identity, mobile, social, location, payment, commerce, etc. services to anticipate consumers' needs and to proactively recommend appropriate and customized products, services, and/or content to the consumers.

Network 240 may include a local area network (LAN), a wide area network (WAN), a metropolitan area network (MAN), a telephone network, such as the Public Switched Telephone Network (PSTN), an intranet, the Internet, an optical fiber (or fiber optic) based network, or a combination of networks. In one example implementation, network 240 may include a network that connects user device 210, enterprise device 220, and lifestyle application platform 230.

Although FIG. 2 shows example devices/networks of environment 200, in other implementations, environment 200 may include fewer devices/networks, different devices/networks, differently arranged devices/networks, or additional devices/networks than depicted in FIG. 2. Alternatively, or additionally, one or more devices/networks of environment 200 may perform one or more other tasks described as being performed by one or more other devices/networks of environment 200.

Figure 3:
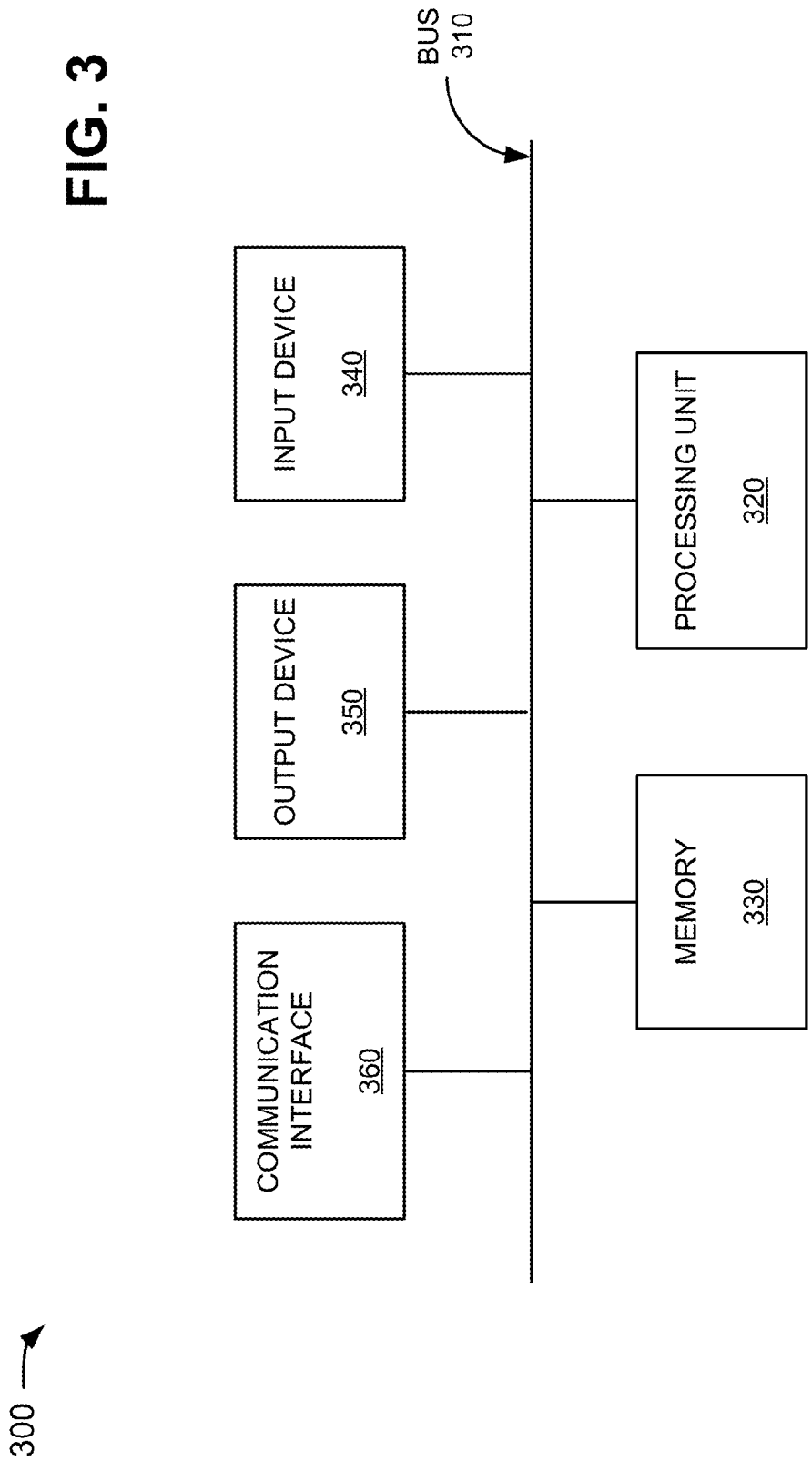
FIG. 3 is a diagram of example components of a device that may correspond to one of the devices of the environment depicted in FIG. 2.

FIG. 3 is a diagram of example components of a device 300 that may correspond to one or more devices of environment 200 (FIG. 2). In one example implementation, one or more of the devices of environment 200 may include one or more devices 300 and/or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors and/or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and a corresponding drive for storing information and/or instructions.

Input device 340 may include a device that permits an operator to input information to device 300, such as a keyboard, a keypad, a mouse, a pen, a microphone, a touch screen display, one or more biometric mechanisms, or the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of environment 300.

As described herein, device 300 may perform certain operations in response to processing unit 320 executing software instructions contained in a computer-readable medium, such as memory 330. A computer-readable medium may be defined as a non-transitory memory device. A memory device may include memory space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
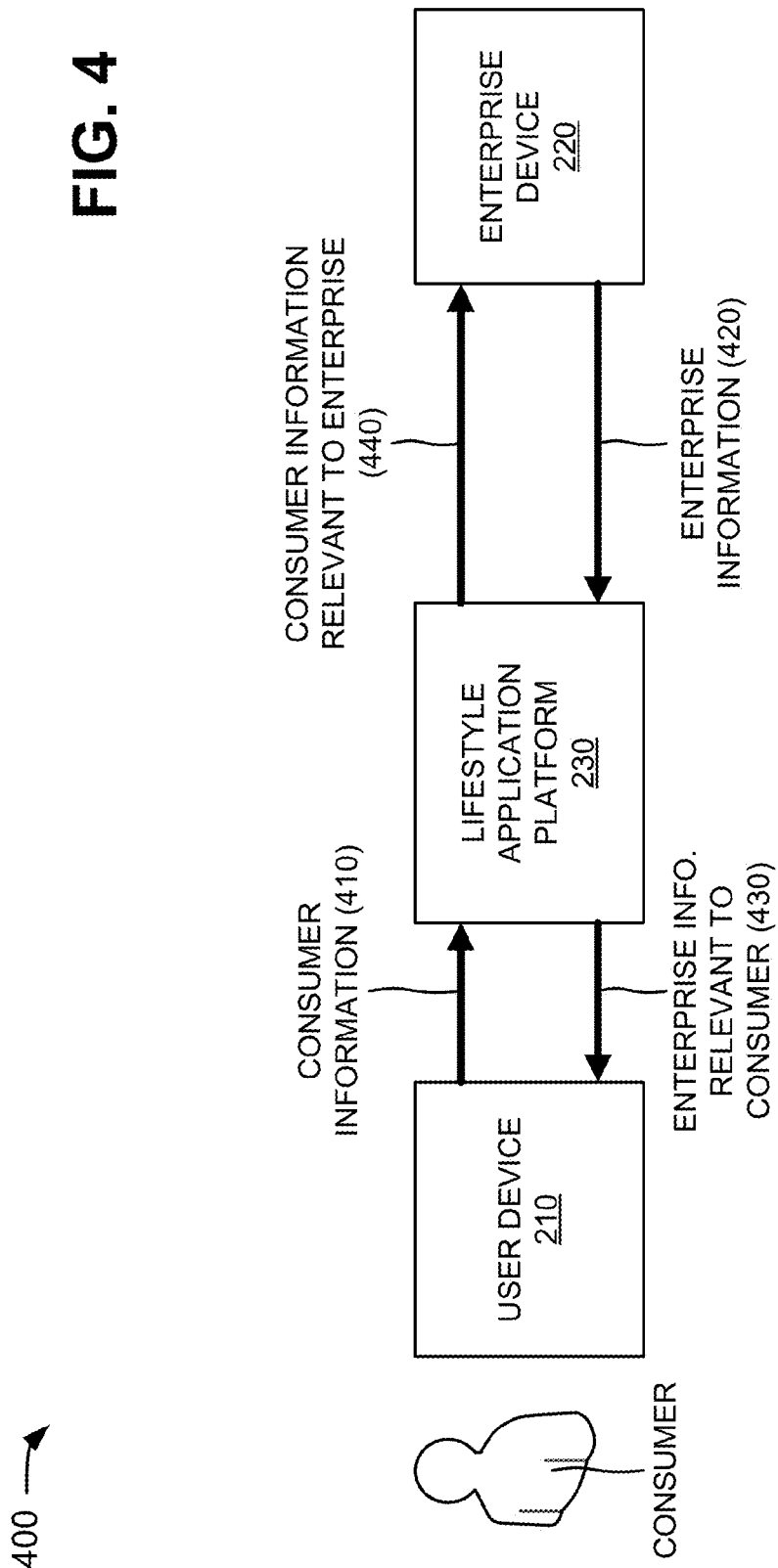
FIG. 4 is a diagram of example operations capable of being performed by an example portion of the environment in FIG. 2.

FIG. 4 is a diagram of example operations capable of being performed by an example portion 400 of environment 200 (FIG. 2). As shown, environment portion 400 may include user device 210, enterprise device 220, and lifestyle application platform 230. User device 210, enterprise device 220, and lifestyle application platform 230 may include the features described above in connection with, for example, one or more of FIGS. 1-3.

A consumer may utilize user device 210 to connect to lifestyle application platform 230, and to download a lifestyle application from lifestyle application platform 230. The lifestyle application may be installed on user device 210, and may enable user device 210 to access and/or utilize the functionality provided by lifestyle application platform 230. For example, the lifestyle application may enable the consumer, via user device 210, to create, maintain, and/or update a consumer profile that is stored by lifestyle application platform 230. The consumer profile may be automatically updated by lifestyle application platform 230 based on the consumer's interactions with enterprise devices 220 via lifestyle application platform 230. The consumer profile may enable lifestyle application platform 230 to intelligently link information provided by the consumer and enterprises so that lifestyle application platform 230 may anticipate the consumer's needs and proactively recommend appropriate and customized products, services, and/or content to the consumer.

As further shown in FIG. 4, the consumer may provide consumer information 410 to user device 210. Consumer information 410 may include brand preferences (e.g., for products, services, and/or content); demographic information (e.g., gender, race, age, etc.); identity information (e.g., anonymous identity, pseudonymous identity, legal identity, etc.); relationship information (e.g., relationships with other consumers); etc. associated with the consumer. User device 210 may add information to consumer information 410, such as location information (e.g., an IP address, GPS coordinates, etc.) and/or capability information (e.g., a make, model, etc.) associated with user device 210.

Alternatively, or additionally, user device 210 may supplement information provided in consumer information 410. For example, user device 210 may supplement the relationship information by including information associated with contacts of an address book stored on user device 210, consumer social network information, call logs information, messaging information, etc. in the relationship. User device 210 may supplement the identity information by including consumer purchase history information stored on user device 210, browsing history stored on user device 210, social network IDs of the consumer stored on user device 210, consumer user names and/or passwords, content downloaded to user device 210, etc. in the identity information.

The anonymous identity information may include information that may not identify the consumer. For example, the anonymous identity information may include a credit score associated with the consumer, a purchase history of the consumer, geo-location information associated with user device 210, a browsing history of the consumer, a propensity score associated with the consumer, an influence score associated with the consumer, etc. The pseudonymous identity information may include information that partially identifies the consumer. For example, the pseudonymous identity information may include personal data identified by the consumer (e.g., age, home address, etc.); consumer profile information (e.g., created by lifestyle application platform 230); consumer preferences for particular products, services, and/or content; consumer purchase intentions (e.g., a price range for a product, a specific type of product, etc.); social network IDs associated with the consumer; personas associated with the consumer; etc. The legal identity information may include information that completely identifies the consumer. For example, the legal identity information may include a full name of the consumer, contact information of the consumer, an IP address of user device 210, a driver's license number of the consumer, a social security number of the consumer, etc. The legal identity information may or may not include other sensitive information of the consumer, such as credit card numbers, medical information, account numbers, secret questions, passwords, personal identification numbers (PINs), etc. associated with the consumer. The consumer may have control over the information provided in customer information 410, and may opt-in or opt-out of the relationship with lifestyle application platform 230 at any time.

In one example implementation, lifestyle application platform 230 may enable the consumer to select a different type of identity information (e.g., anonymous, pseudonymous, or legal) to share with enterprises on an enterprise-by-enterprise basis, a transaction-by-transaction basis, each time user device 210 utilizes lifestyle application platform 230, etc. Further details of selecting different types of identity information are provided below in connection with, for example, FIGS. 5-7. As further shown in FIG. 4, user device 210 may provide consumer information 410 to lifestyle application platform 230.

Lifestyle application platform 230 may receive consumer information 410, and may create a consumer profile and a single authentication ID for the consumer based on consumer information 410. The single authentication ID may include a password, a thumbprint, a voice command, a retinal scan, etc. associated with the consumer. Lifestyle application platform 230 may enable user device 210 (e.g., via the lifestyle application) to access, view, and/or modify the consumer profile. The consumer may access the consumer profile and/or the functionality of lifestyle application platform 230 by providing (e.g., via user device 210) the single authentication ID to lifestyle application platform 230.

In one example, lifestyle application platform 230 may utilize the consumer's name, email address, telephone number, home address, etc. (e.g., provided in consumer information 410) to create the consumer profile. Lifestyle application platform 230 may associate a unique identifier (e.g., an alphabetical identifier, a numeric identifier, an alphanumeric identifier, etc.) with the consumer profile. Lifestyle application platform 230 may then populate the consumer profile with the brand preferences, enterprise preferences, relationship information, etc. provided by consumer information 410. Lifestyle application platform 230 may credit an appropriate amount of money to an electronic wallet associated with the consumer profile, and may award appropriate brand loyalty points (e.g., points that enable the consumer to receive benefits from enterprises) to the consumer profile.

Enterprise device 220 may be associated with an enterprise, and may provide enterprise information 420 to lifestyle application platform 230. Enterprise information 420 may include offers for products, services, and/or content provided by the enterprise; information associated with consumer interactions with the enterprise (e.g., consumer profiles, consumer information gathered by the enterprise, etc.); information associated with consumer transactions with the enterprise; information associated with consumer wish lists for products, services, and/or content provided by the enterprise; etc.

Lifestyle application platform 230 may receive enterprise information 420, and may analyze consumer information 410 and enterprise information 420. In one example implementation, lifestyle application platform 230 may compare consumer information 410 and enterprise information 420, and may determine whether any portion of consumer information 410 matches any portion of enterprise information 420. For example, if consumer information 410 indicates that the consumer is interested in a particular product offered by the enterprise, lifestyle application platform 230 may determine that information associated with the particular product should be provided to the consumer. Alternatively, or additionally, lifestyle application platform 230 may associate consumer information 410 with enterprise information 420 by comparing consumer information 410 with enterprise information 420. Lifestyle application platform 230 may determine an appropriate product, service, and/or content to provide to the consumer based on the association of consumer information 410 with enterprise information 420.

Based on the analysis, lifestyle application platform 230 may generate, from enterprise information 420, enterprise information 430 (e.g., notifications, reports, offers, etc. for products, services, and/or content provided by the enterprise) relevant to the consumer. Lifestyle application platform 230 may provide the relevant enterprise information 430 to user device 210, and user device 210 may display the relevant enterprise information 430 to the consumer.

Based on the analysis, lifestyle application platform 230 may generate, from consumer information 410, consumer information 440 (e.g., consumer profile data) relevant to the enterprise. Lifestyle application platform 230 may provide the relevant consumer information 440 to enterprise device 220, and enterprise device 220 may display the relevant consumer information 440 to a user associated with the enterprise. Alternatively, or additionally, enterprise device 220 may share the relevant consumer information 440 with other enterprise devices 220, and/or may receive relevant consumer information 440 from the other enterprise devices 220.

Although FIG. 4 shows example components of environment portion 400, in other implementations, environment portion 400 may include fewer components, different components, differently arranged components, or additional components than depicted in FIG. 4. Additionally, or alternatively, one or more components of environment portion 400 may perform one or more other tasks described as being performed by one or more other components of environment portion 400.

Figure 5:
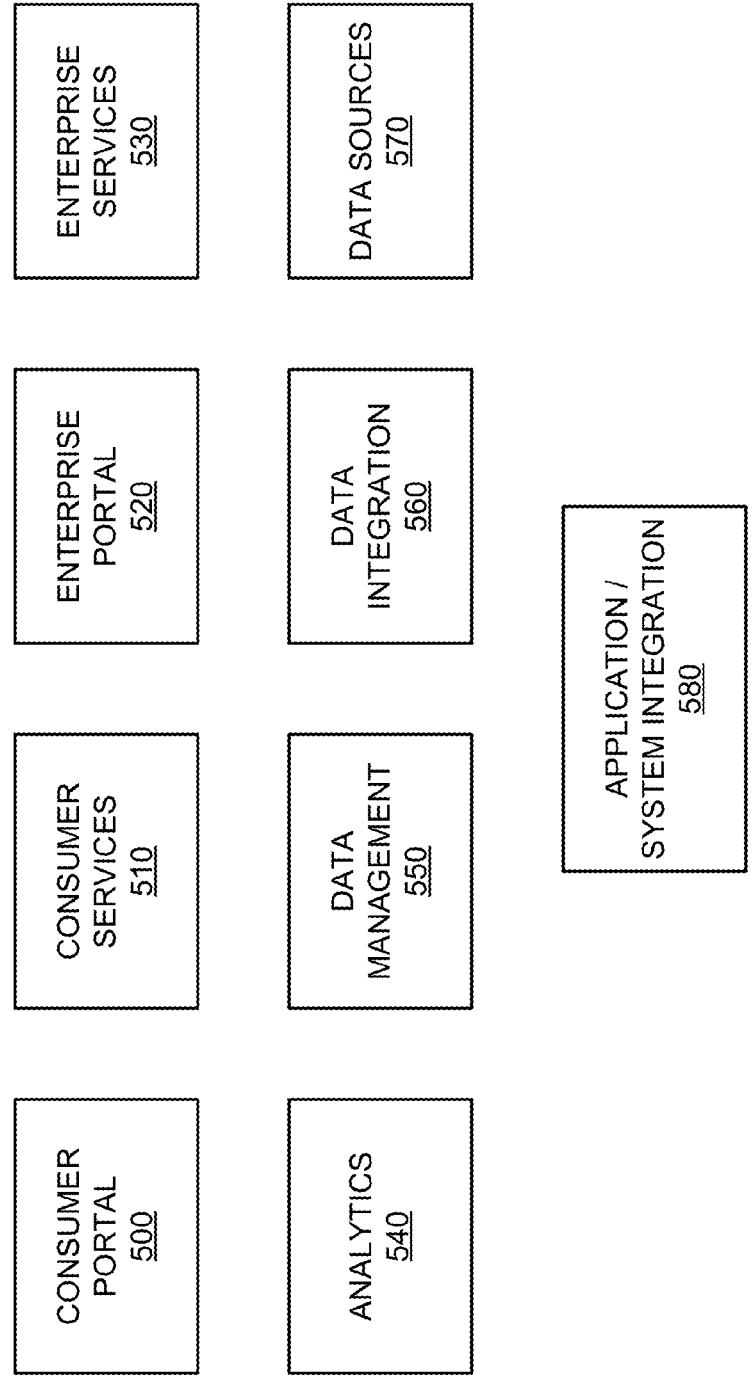
FIG. 5 is a diagram of example functional components of a lifestyle application platform of FIG. 2.

FIG. 5 is a diagram of example functional components of lifestyle application platform 230. In one implementation, the functions described in connection with FIG. 5 may be performed by one or more components of device 300 (FIG. 3) or by one or more devices 300. As shown in FIG. 5, lifestyle application platform 230 may include a consumer portal component 500, a consumer services component 510, an enterprise portal component 520, an enterprise services component 530, an analytics component 540, a data management component 550, a data integration component 560, a data sources component 570, and an application/system integration component 580.

Consumer portal component 500 may provide consumers (e.g., via user devices 210) with access to lifestyle application platform 230. In one example, consumer portal component 500 may provide a consumer interface (e.g., a consumer dashboard) that may be accessible via the lifestyle application provided on a user device 210, a web browser, etc. The consumer interface may trigger events when the consumer interacts with various technologies available to user device 210 (e.g., near field communication (NFC), GPS, etc.); may support a customized dashboard for the consumer; and may permit the consumer to contact another consumer (e.g., in a social group) directly through lifestyle application platform 230, via short message service (SMS), via a phone call, etc. In one example, the consumer interface may include a consumer profile control panel and a consumer relationship control panel that provide full functionality of lifestyle application platform 230 to consumers that have been authenticated.

Consumer portal component 500 may provide identity-related functions, such as consumer registration, consumer identity proofing, credential issuance to the consumer, authentication of the consumer, etc. Consumer portal component 500 may interface with a variety of access technologies, such as NFC, SMS, unstructured supplementary service data (USSD), web portal, mobile application, active radio-frequency identification (RFID), geo-location, digital signs, quick response (QR) codes, interactive voice response (IVR), etc. Consumer portal component 500 may support open application programming interfaces (APIs), and may support trusted service manager (TSM) capabilities for over the air (OTA) download and management of subscriber identity module (SIM) applications on mobile devices. Consumer portal component 500 may capture the consumer's geo-location via various technologies, such as GPS, WiFi, IP address, cellular tower, femtocell, A-GPS, etc.

Consumer portal component 500 may provide consumer login and authentication functionality. For example, consumer portal component 500 may not require login authentication for all consumer activities within lifestyle application platform 230. If an activity requires a consumer to login to perform the activity, consumer portal component 500 may present an authentication challenge to the consumer. When a consumer successfully completes the authentication challenge, consumer portal component 500 may return the consumer to the activity that prompted the need for login. Consumer portal component 500 may support a strong, two-factor authentication as a default for a consumer to access restricted activities. Consumer portal component 500 may support a web single sign on (SSO) authentication for accessing enterprise devices 220.

Consumer services component 510 may provide consumer services offered by lifestyle application platform 230. For example, consumer services component 510 may provide profile management services, relationship management services, identity tracking services, offer services, loyalty services, payment services, web SSO services, etc. The profile management services may enable a consumer to create, review, and/or edit a profile associated with the consumer. The relationship management services may enable a consumer to set preferences for and manage preferred brands of the consumer; offers for products, services, and/or content provided by enterprises; loyalty programs provided by enterprises; and consumer digital payment services. The identity tracking services may enable a consumer to receive alerts regarding potential identity theft, and to receive reports on how their identity has been used. The offer services may enable a consumer to manage offers (e.g., coupons, referrals, etc.) for products, services, and/or content provided by enterprises. The loyalty services may enable a consumer to manage loyalty programs provided by enterprises. The payment services may enable a consumer to manage digital payment services offered to the consumer. The web SSO services may enable the consumer to manage consumer access to enterprise devices 220.

Enterprise portal component 520 may provide enterprises (e.g., via enterprise devices 220) with access to lifestyle application platform 230. In one example, enterprise portal component 520 may provide an enterprise interface (e.g., an enterprise dashboard) that may be accessible by enterprise device 220 via a secure web browser or some other mechanism. Enterprise portal component 520 may support role-based access for various enterprise user roles, such as an enterprise security administrator, an enterprise marketing administrator, an enterprise approving authority, an enterprise coordinator, an enterprise help desk, etc. At initial login, enterprise portal component 520 may present an enterprise user with an authentication challenge. Upon successfully completing the authentication challenge, the enterprise user may have access to the enterprise interface. Enterprise portal component 520 may a support strong, two-factor authentication as a default for an enterprise user to access the enterprise interface.

Enterprise services component 530 may provide enterprise services offered by lifestyle application platform 230. For example, enterprise services component 530 may provide enterprise payment services, data exchange and processing services, profile procurement services, enterprise database maintenance services, coupon management services, referral management services, loyalty program management services, preference-based targeting tools, transaction-based consumer value forecasting, fraud prevention, etc. The enterprise payment services may enable an enterprise to manage payments to or from partner enterprises. The data exchange and processing services may enable an enterprise to schedule and manage data processing activities. The profile procurement services may enable an enterprise to procure consumer profile information from partner enterprises. The enterprise database maintenance services may enable an enterprise to manage and update internal database attributes. The coupon management services may enable an enterprise to create, manage, delete, etc. one or more coupons for consumers. The referral management services may enable an enterprise to manage referral partnerships with partner enterprises. The loyalty program management services may enable an enterprise to manage loyalty programs provided to consumers. The preference-based targeting tools may enable an enterprise to manage consumer targeting services. The transaction-based consumer value forecasting may enable an enterprise to specify market analytics report parameters and request market analytics reports. Fraud prevention may enable an enterprise to set security preferences for enterprise partners.

Analytics component 540 may enable lifestyle application platform 230 to analyze, data mine, model, segment, cluster, etc. data (e.g., consumer information 410 and/or enterprise information 420, FIG. 4). Analytics component 540 may create calculations, algorithms, etc. used by data integration component 560. Analytics component 540 may utilize the analytically-produced data to provide reports, interfaces, etc. used by consumer portal component 500 and/or enterprise portal component 520.

Data management component 550 may receive and store data for lifestyle application platform 230. The data may include internal data (e.g., consumer information 410 and/or enterprise information 420, FIG. 4) and external data. The external data may be provided by third parties to lifestyle application platform 230 and may include marketing reports, consumer information, sales reports for products, services, and/or content, etc. In one example, data management component 550 may store the data in a data warehouse or some other type of data structure.

Data integration component 560 may manage integration of data stored by lifestyle application platform 230 in data sources component 570. In one example, data integration component 560 may manage the integration of data across data sources, databases, data warehouses, etc. by applying rules and/or processes to ensure that the data is processed correctly. Data integration component 560 may integrate the data by converting the data to metadata, enriching the data, transforming the data, aggregating the data, performing ETL (extracting, transforming, and loading) on the data, cleansing the data, validating the data, harmonizing the data, etc.

Data sources component 570 may store data received by lifestyle application platform 230. In one example, data sources component 570 may store internal data and external data. The internal data may include consumer profiles, consumer transactions information, universal identity services (UIS) information, usage information associated with the lifestyle application, information associated with web usage by user devices 210, information associated with usage of user devices 210, etc. The external data may include enterprise profile information, consumer loyalty profiles, third party source data, etc.

Application/system integration component 580 may provide functionality to lifestyle application platform 230 and may control capabilities of lifestyle application platform 230. Application/system integration component 580 may provide web services and tools that leverage functionality and data stored in systems outside of lifestyle application platform 230. In one example, application/system integration component 580 may provide a rules-oriented infrastructure of policies and business rules that govern how enterprises interact with each other. Application/system integration component 580 may create, update, and manage enterprise information, enterprise profiles, enterprise accounts, etc. Application/system integration component 580 may create, update, and manage programs, such as coupon services, referral services, loyalty program services, digital payment services, etc.

Although FIG. 5 shows example functional components of lifestyle application platform 230, in other implementations, lifestyle application platform 230 may include fewer functional components, different functional components, differently arranged functional components, or additional functional components than depicted in FIG. 5. Additionally, or alternatively, one or more functional components of lifestyle application platform 230 may perform one or more other tasks described as being performed by one or more other functional components of lifestyle application platform 230.

FIG. 6 is a diagram of example functional components of consumer portal component 500 (FIG. 5). In one implementation, the functions described in connection with FIG. 6 may be performed by one or more components of device 300 (FIG. 3) or by one or more devices 300. As shown in FIG. 6, consumer portal component 500 may include a profile control panel component 600 and a relationship control panel component 610.

Profile control panel component 600 may support creation of consumer profiles via consumer manual entry of profile data (e.g., with user device 210), enterprise devices 220 bulk loading of multiple consumer profiles, lifestyle application platform 230 bulk loading of multiple consumer profiles, etc. Profile control panel component 600 may enable a consumer to review and/or edit profile data, and may enforce rules for which profile data fields are required and optional. Profile control panel component 600 may enable a consumer to confirm and submit profile data, and may return error messages to the consumer when fields are inappropriately populated or incomplete. Profile control panel component 600 may send consumer profile data to UIS so that the UIS may create or append a UIS profile for enrollment and credentialing.

In one example, profile control panel component 600 may provide a privacy management service to a consumer. The privacy management service may support a privacy setting matrix with respect to data defined by data usage, data type, whether a consumer has the option to opt-in/opt-out, etc. The privacy matrix may define a data framework to which business rules may be applied. The privacy management service may include default privacy settings as defined by lifestyle application platform 230, and may not permit a consumer to set privacy settings until after the consumer profile is created. The privacy management service may enable a consumer to prohibit use of qualifying data types. The data usage activities may include utilizing consumer profile data for telemarketing, marketing emails, marketing postal mail, online advertising, wireless location services, geographic and relevant mobile advertising, business and marketing reports, etc. The data types may include anonymous, aggregate, pseudonymous, personally identifiable, sensitive, etc. data types.

The privacy management service may enable a consumer to select a method (e.g. email, text message, intra-system communications, etc.) by which lifestyle communication platform 230 communicates information to consumer. The privacy management service may enable a consumer to save privacy settings as a privacy template, and/or to make a single selection from multiple pre-defined privacy templates.

Relationship control panel component 610 may enable a consumer to create, edit, and manage relationships with enterprises and/or other consumers. Relationship control panel component 610 may enable a consumer to control and set preferences for program management services, offer services, loyalty services, digital payment services, etc. provided by lifestyle application platform 230. Lifestyle application platform 230 may prioritize marketing channel settings in the relationship control panel component 610 over global privacy settings in profile control panel component 600 if a change to the settings has been confirmed. Relationship control panel component 610 may enable a consumer to order a product, a service, and/or content, and may tie together a stream of operations in a way that appears as one seamless transaction to the consumer, such as placing an order, redeeming an applicable offer, making a payment, receiving a loyalty program reward credit, etc.

In one example, relationship control panel component 610 may support program management services. The program management services may enable a consumer to view and set preference or "like" settings associated with enterprises, product/service brands, product/service types, data usage, contact frequency, access method (e.g., anonymous access, web SSO, etc.), program management preference packages, etc. Lifestyle application platform 230 may import consumer transactional data from enterprises and other third party data sources to pre-populate the program management preference settings not provided by the consumer. The program management service may enable a consumer to specify how the consumer's preferences are populated within lifestyle application platform 230 (e.g., via manual entry, import from a third party source, based on transactional behavior within lifestyle application platform 230, etc.).

The program management service may enable a consumer to associate other consumers into a social group, and may enable the consumer to define their relationship categories for the other consumers in the social group (e.g., as acquaintances, friends, family members, colleagues, a spouse, etc.). The program management service may import or retrieve relationship categories from sources outside lifestyle application platform 230, such as from a user device 210 operating system, third party applications, third party social media, etc. The program management service may enable a consumer to define sharing rights for a relationship category, and may store preference settings for the other consumers in the social group. The program management service may provide the preference settings for the other consumers in the social group to enterprises, and may provide the preference settings for other consumers in the social group to another consumer. The program management service may enable a consumer to exchange preferences within the social group remotely, via physical interaction, etc.

Although FIG. 6 shows example functional components of consumer portal component 500, in other implementations, consumer portal component 500 may include fewer functional components, different functional components, differently arranged functional components, or additional functional components than depicted in FIG. 6. Additionally, or alternatively, one or more functional components of consumer portal component 500 may perform one or more other tasks described as being performed by one or more other functional components of consumer portal component 500.

Figure 7:
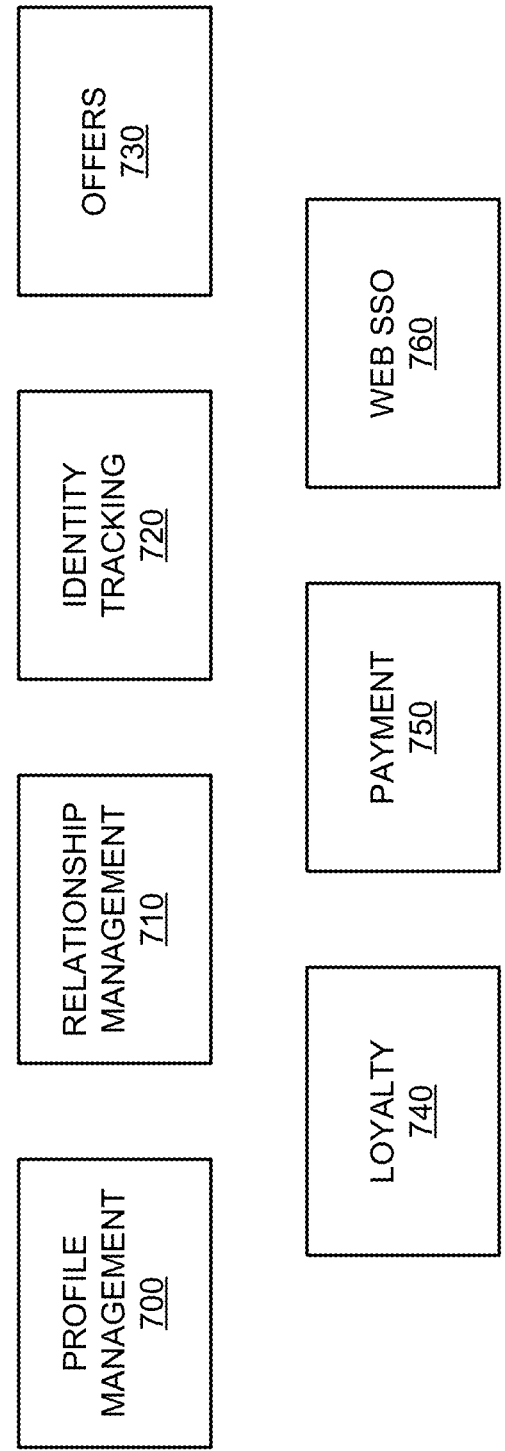
FIG. 7 is a diagram of example functional components of a consumer services component of the lifestyle application platform.

FIG. 7 is a diagram of example functional components of consumer services component 510. In one implementation, the functions described in connection with FIG. 7 may be performed by one or more components of device 300 (FIG. 3) or by one or more devices 300. As shown in FIG. 7, consumer services component 510 may include a profile management component 700, a relationship management component 710, an identity tracking component 720, an offers component 730, a loyalty component 740, a payment component 750, and a web SSO component 760.

Profile management component 700 may enable lifestyle application platform 230 to provide consumer profile management services to consumers. Profile management component 700 may enable consumers to create consumer profiles via consumer manual entry of profile data (e.g., with user device 210), enterprise devices 220 bulk loading of multiple consumer profiles, lifestyle application platform 230 bulk loading of multiple consumer profiles, etc. Profile management component 700 may enable a consumer to review and/or edit profile data, and may enforce rules for which profile data fields are required and optional. Profile management component 700 may enable a consumer to confirm and submit profile data, and may return error messages to the consumer when fields are inappropriately populated or incomplete. Profile management component 700 may send consumer profile data to a UIS so that the UIS may create or append a UIS profile for enrollment and credentialing.

Relationship management component 710 may enable a consumer to create, edit, and manage relationships with enterprises and/or other consumers. Relationship management component 710 may enable a consumer to control and set preferences for program management services, offer services, loyalty services, digital payment services, etc. provided by lifestyle application platform 230. Relationship management component 710 may provide program management services described above. For example, the program management services may enable a consumer to view and set preference settings associated with enterprises, product/service brands, product/service types, data usage, contact frequency, access method (e.g., anonymous access, Web SSO, etc.), etc.

Identity tracking component 720 may send alerts to a consumer via the consumer's preset communication channels. The alerts may alert the consumer about a potential compromise of the consumer's identity based on triggers from the UIS. Identity tracking component 720 may provide consumer account monitoring, and may provide a composite, activity-based view of account usage. Identity tracking component 720 may provide an interface for a consumer to specify and receive reports on how the consumer's identity has been used.

Offers component 730 may enable a consumer to manage offers, such as coupons, referrals, future offer-based program types, etc. A coupon may include an offer name, an offer description, an offer code, an offer workflow, a product, a service, an automatically-enrolled new consumer, a number of offers on enroll, a maximum number of offers, timing of the offer, a location of the offer, etc. Offers component 730 may enable a consumer to search offers, sort offers, and/or set interface preferences regarding how the consumer searches, sorts, and interacts with offers. Offers component 730 may enable a consumer to automatically redeem an offer based on consumer-defined qualifications, and may support dynamic, manual redemption of offers, at a time of a transaction.

Loyalty component 740 may enable a consumer to set preference settings for loyalty programs with enterprises. The preference settings may include method of contact (e.g., email, mail, telemarketing, text message, etc.), contact frequency, authentication method, etc. Lifestyle application platform 230 may import loyalty programs information (e.g., from enterprises and/or third parties), for a specific consumer, into loyalty component 740. Loyalty component 740 may enable a consumer to specify qualifications by which stored loyalty rewards points are used, such as by product category, brand, enterprise, location, offer attributes, price, cumulative savings, manual/automated selection, etc. Loyalty component 740 may enable a consumer to search loyalty program information, sort loyalty program information, and/or set interface preferences regarding how the consumer searches, sorts, and interacts with loyalty programs.

Loyalty component 740 may enable a consumer to redeem loyalty rewards points automatically based on consumer-defined qualifications, and may support dynamic, manual redemption of loyalty rewards points, at a time of a transaction. Loyalty component 740 may enable enterprises to communicate, to consumer loyalty program members, warranties, rebates, recall notices, surveys, product registrations, reviews, etc. Loyalty component 740 may communicate with outside institutions to capture payment transactions by a consumer and to credit rewards to the consumer. Loyalty component 740 may award loyalty rewards to consumers based on non-purchase transactions.

Payment component 750 may import consumer payment instrument information, such as credit card information, debit card information, coupon information, voucher information, etc. Payment component 750 may perform pre-authorization functions for digital payment transactions, and may enable a consumer to make a hybrid payment from the combination of a digital payment, redeeming an offer, and/or redeeming loyalty program rewards points based on consumer-defined qualifications. Upon completion of a payment, payment component 750 may remove an offer from a consumer's offers service, debit a consumer's loyalty program rewards account, debit a consumer's digital payment account, etc. Payment component 750 may enable a consumer to specify qualifications by which payment methods are used, such as by product category, brand, enterprise, location, offer attributes, price, cumulative savings, manual/automated selection, hybrid payments, etc.

Payment component 750 may capture a payment account transaction, for all purchases, in the form of a digital equivalent of a receipt, and may enable an enterprise to attach an offer to a digital receipt. Payment component 750 may enable a consumer to search payment account transactions, sort payment account transactions, and/or set interface preferences regarding how the consumer searches, sorts, and interacts with payment method accounts. Payment component 750 may enable a consumer to make payments via specified payment methods based on consumer-defined qualifications, and may support dynamic, manual selection of a payment method, at a time of a transaction.

Payment component 750 may enable a consumer to replenish an account balance (e.g., via funds from an account outside lifestyle application platform 230), debit an account balance (e.g., return funds to an account outside lifestyle application platform 230), and/or request a refund from an enterprise. Payment component 750 may advise a consumer on the success or failure of a payment, and may provide an e-commerce data conduit with a financial institution (e.g. a bank, a credit card provider, etc.) that shares consumer e-payment data. Payment component 750 may store a real-time transaction linkage to an institution with up-to-date balance information.

Web SSO component 760 may enable a consumer to access enterprise devices 220 via web SSO, one-time SSO, anonymous access, etc. Web SSO component 760 may provide consumer access to enterprise devices 220 at an authentication level specified by an enterprise or by the consumer for the enterprise. With regard to web SSO, web SSO component 760 may provide a consumer with web SSO access to enterprise devices 220 if specifically allowed by the enterprise. The consumer, when accessing enterprise devices 220 via web SSO access, may be authenticated and recognized by enterprise devices 220. With regard to one-time SSO, web SSO component 760 may request a consumer to confirm one-time SSO when accessing enterprise devices 220. Web SSO component 760 may permit one-time SSO access to enterprise devices 220 if specifically allowed by the enterprise. The consumer, when accessing enterprise devices 220 via one-time SSO access, may be authenticated and recognized by enterprise devices 220. Web SSO component 760 may redirect a consumer, when using anonymous access to enterprise devices 220, to a public landing page provided by enterprise devices 220.

Although FIG. 7 shows example functional components of consumer services component 510, in other implementations, consumer services component 510 may include fewer functional components, different functional components, differently arranged functional components, or additional functional components than depicted in FIG. 7. Additionally, or alternatively, one or more functional components of consumer services component 510 may perform one or more other tasks described as being performed by one or more other functional components of consumer services component 510.

Figure 8:
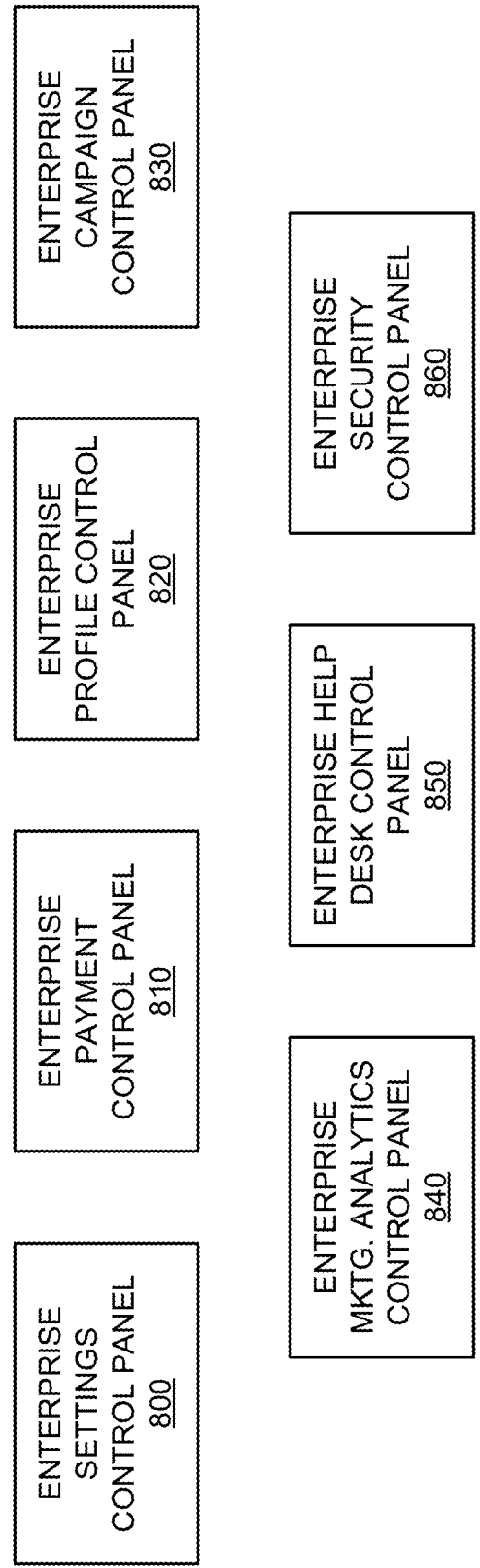
FIG. 8 is a diagram of example functional components of an enterprise portal component of the lifestyle application platform.

FIG. 8 is a diagram of example functional components of enterprise portal component 520 of lifestyle application platform 230 (FIG. 2). In one implementation, the functions described in connection with FIG. 8 may be performed by one or more components of device 300 (FIG. 3) or by one or more devices 300. As shown in FIG. 8, enterprise portal component 520 may include an enterprise settings control panel component 800, an enterprise payment control panel component 810, an enterprise profile control panel component 820, an enterprise campaign control panel component 830, an enterprise marketing analytics control panel component 840, an enterprise help desk control panel component 850, and an enterprise security control panel component 860.

Enterprise settings control panel component 800 may enable an enterprise to restrict/enable data exchange with another enterprise, and define and manage the enterprise's locations, the enterprise's association with offer/loyalty programs, the enterprise's customer association with the offer/loyalty programs, etc. Enterprise settings control panel component 800 may enable an enterprise to restrict or enable data sharing privileges with another enterprise, and may provide restricted data element sharing between enterprises for profile procurement, referral, analytics, etc. exchanges. Enterprise settings control panel component 800 may enable an enterprise to define one or multiple enterprise locations that may interact with consumers, and to retrieve enterprise locations, update enterprise locations, delete enterprise locations, etc.

Enterprise settings control panel component 800 may enable an enterprise to define one or more programs, retrieve programs, update programs, etc. The programs may include coupon services, loyalty program services, referral services, digital payment services, etc. Enterprise settings control panel component 800 may enable an enterprise to associate the enterprise with one or more programs, retrieve the associated programs, create associated programs, delete associated programs, etc. Enterprise settings control panel component 800 may enable an enterprise to associate one or more consumers with a program (e.g., subject to the consumer's approval), retrieve the associated consumer programs, create associated consumer programs, delete associated consumer programs, etc.

Enterprise settings control panel component 800 may enable an enterprise to define one or more workflows that dictate how an action within lifestyle application platform 230 is triggered by an event. Enterprise settings control panel component 800 may enable an enterprise to retrieve workflows, update workflows, obtain specifications for workflows, update the specifications for workflows, etc. Enterprise settings control panel component 800 may enable an enterprise to define settings that require confirmation of the enterprise for certain marketing activities. The marketing activities may include profile procurement requests, profile procurement request acceptance, coupon publication approval, referral requests, referral request acceptance, loyalty program publication approval, etc. Enterprise settings control panel component 800 may enable an enterprise to customize and limit the enterprise dashboard functionality.

Enterprise payment control panel component 810 may enable an enterprise to replenish the enterprise's accounts balance; debit the enterprise's accounts balance; view, search, and sort the enterprise's payments; set interface settings; request a refund for a payment; track collection status of marketing exchange fees; etc. Enterprise payment control panel component 810 may enable various payment methods (e.g., credit card, debit card, automated clearing house (ACH) transactions, etc.) to be imported for an enterprise, and may enable an enterprise to replenish the enterprise's account balance (e.g., via funds from an account outside of lifestyle application platform 230). Enterprise payment control panel component 810 may enable an enterprise to debit the enterprise's account balance (e.g., returning funds to an account outside of lifestyle application platform 230), and may capture a payment account transaction, for all purchases, in the form of a digital equivalent of a receipt.

Enterprise payment control panel component 810 may enable an enterprise to search payment account transactions, sort payment account transactions, set interface preferences regarding how the enterprise searches, sorts, and interacts with payment method accounts, etc. Enterprise payment control panel component 810 may enable an enterprise to request a refund from lifestyle application platform 230, and may notify an enterprise about a success or a failure of a payment. Enterprise payment control panel component 810 may provide an e-commerce data conduit with a financial institution (e.g. a bank, a credit card provider, etc.) that shares an enterprise's e-payment data. Enterprise payment control panel component 810 may provide a method for tracking all agreed upon fees for consumer data record exchange, as well as a collection status of those fees.

Enterprise profile control panel component 820 may provide role-based access and operation rights for an enterprise to data exchange and processing services, profile procurement services, enterprise database maintenance services, etc. Enterprise profile control panel component 820 may compile a list of consumer data records based on data element criteria and selectivity, may differentiate between opt-in and opt-out consumer data records, and may suppress or select those records as specified by particular rules. Enterprise profile control panel component 820 may suppress records for marketing campaigns that do not meet a consumer's frequency preferences, and may support receipt of data files from third party sources (e.g., enterprise partners, government agencies, etc.).

Enterprise campaign control panel component 830 may provide role-based access and operations rights for an enterprise to coupon management services, referral management services, loyalty program management services, etc. Enterprise campaign control panel component 830 may identify real-time, transaction-based parses from a transaction log file as a basis for triggering a marketing program based on coupons, referrals, loyalty program management, future marketing effort-based programs, marketing efforts on enterprise devices 220, marketing efforts from third party systems, etc. Enterprise campaign control panel component 830 may relay real-time transaction-based triggers from the transaction log file to enterprise device 220.

Enterprise campaign control panel component 830 may create marketing programs that rely upon real-time transactional data exchange with enterprise device 220 immediately after a purchase so that associated product offerings may be conveyed to a consumer. Enterprise campaign control panel component 830 may create geo-location based marketing programs that provide geographically targeted marketing efforts based upon consumer proximity to an enterprise location. Enterprise campaign control panel component 830 may create marketing programs that rely on providing related suggestions while a consumer is searching for products and offers.

Enterprise marketing analytics control panel component 840 may provide an enterprise with access to customer targeting services, market analysis services, etc. Enterprise marketing analytics control panel component 840 may capture, for analytics processing, transaction data at every process step within lifestyle application platform 230 that interacts with a consumer data element. Enterprise marketing analytics control panel component 840 may capture, for marketing analytics processing, consumer data, such as demographic information, identity information, geographic information, transactional information, channel specific contact information, campaign performances, etc. associated with consumers. Enterprise marketing analytics control panel component 840 may generate analytics reports based on the consumer data and/or based on third party data received from enterprise devices 220.

For consumers who are customers of an enterprise, enterprise help desk control panel component 850 may retrieve consumer information, create consumer profiles, update consumer profiles, retrieve consumer profiles, obtain a status of a consumer, change the status of the consumer, etc. Enterprise help desk control panel component 850 may enable an enterprise to retrieve accounts of a consumer, retrieve balance information for a consumer account, retrieve transactions of a consumer account, etc.

Enterprise security control panel component 860 may enable an enterprise to access UIS administrative functionality and to set security preferences for the enterprise. Enterprise security control panel component 860 may enable an enterprise to have search, auditing, and reporting capabilities for fraud and security log records of the enterprise. Enterprise security control panel component 860 may enable enterprises to change lifestyle application platform 230 default login duration settings.

Although FIG. 8 shows example functional components of enterprise portal component 520, in other implementations, enterprise portal component 520 may include fewer functional components, different functional components, differently arranged functional components, or additional functional components than depicted in FIG. 8. Additionally, or alternatively, one or more functional components of enterprise portal component 520 may perform one or more other tasks described as being performed by one or more other functional components of enterprise portal component 520.

Figure 9:
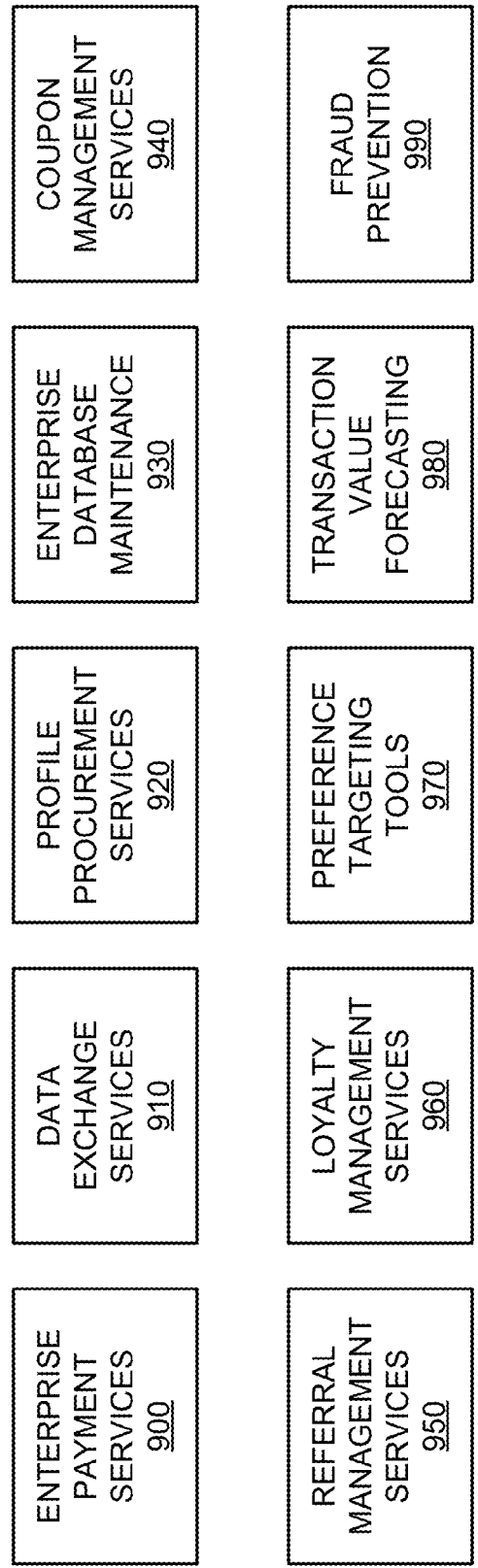
FIG. 9 is a diagram of example functional components of an enterprise services component of the lifestyle application platform.

FIG. 9 is a diagram of example functional components of enterprise services component 530 of lifestyle application platform 230 (FIG. 2). In one implementation, the functions described in connection with FIG. 9 may be performed by one or more components of device 300 (FIG. 3) or by one or more devices 300. As shown in FIG. 9, enterprise services component 530 may include an enterprise payment services component 900, an enterprise data exchange services component 910, an enterprise profile procurement services component 920, an enterprise database maintenance component 930, an enterprise coupon management services component 940, an enterprise referral management services component 950, an enterprise loyalty management services component 960, an enterprise preference targeting tools component 970, an enterprise transaction value forecasting component 980, and an enterprise fraud prevention component 990.

Enterprise payment services component 900 may enable an enterprise to replenish the enterprise's accounts balance; debit the enterprise's accounts balance; view, search, and sort the enterprise's payments; set interface settings; request a refund for a payment; track collection status of marketing exchange fees; etc. Enterprise payment services component 900 may enable various payment methods to be imported for an enterprise, and may enable an enterprise to replenish the enterprise's account balance. Enterprise payment services component 900 may enable an enterprise to debit the enterprise's account balance, and may capture a payment account transaction, for all purchases, in the form of a digital equivalent of a receipt.

Enterprise payment services component 900 may enable an enterprise to search payment account transactions, sort payment account transactions, set interface preferences regarding how the enterprise searches, sorts, and interacts with payment method accounts, etc. Enterprise payment services component 900 may enable an enterprise to request a refund from lifestyle application platform 230, and may notify an enterprise about a success or a failure of a payment. Enterprise payment services component 900 may provide an e-commerce data conduit with a financial institution that shares an enterprise's e-payment data. Enterprise payment services component 900 may track all agreed upon fees for consumer data record exchange, as well as a collection status of those fees.

Enterprise data exchange services component 910 may enable an enterprise to schedule data processing activities, such as data downloading, data merging and/or purging, data cleansing, data suppression, data fulfillment, etc. Enterprise data exchange services component 910 may perform data merging/purging, may de-duplicate consumer data records, and may compile the information into a single flat file. The data cleansing may be performed against known, acceptable data records. Enterprise data exchange services component 910 may suppress or omit a consumer data record from another consumer data record for consumers that opted out of marketing campaign data usage, are listed on government compiled privacy lists, have not paid for products or services, opted out of all marketing activities, etc.

Enterprise data exchange services component 910 may suppress of consumer data provided by an enterprise within a marketing exchange community, and may transmit compiled consumer data records to an authorized third party, such as a mail house, an email fulfillment provider, a SMS provider, a list broker service, etc. Enterprise data exchange services component 910 may provide an enterprise with a status view of all merge/purge, data cleanse, suppression and fulfillment processes that pertain to the enterprise. Enterprise data exchange services component 910 may provide an enterprise a detailed data processing view that can be searched and sorted by campaign, marketing channel, product/service, stage of data processing, etc.

Enterprise profile procurement services component 920 may enable an enterprise to obtain data order counts, request a data order from another enterprise, track a data order, append documentation to a data order, review a data order from another enterprise, approve a data order, etc. Enterprise profile procurement services component 920 may enable enterprises to exchange consumer profile data with segmentation and criteria based data element selectivity. Enterprise profile procurement services component 920 may support consumer data record selectivity based on demographics, purchase type, industry segmentation, income, purchase amount, purchase method, ethnicity, etc. Enterprise profile procurement services component 920 may enable an enterprise to query a database storing consumer data records by data record selectivity.

Enterprise profile procurement services component 920 may enable an enterprise to confirm and order a list of consumer data records for a defined marketing campaign from another enterprise. Enterprise profile procurement services component 920 may enable an enterprise to track all list order requests that pertain to the enterprise, and to attach required documentation to a list order, such as marketing content, list rental agreement terms, an invoice, etc. Enterprise profile procurement services component 920 may enable an enterprise to review associated list order documentation and accept a list order request. Enterprise profile procurement services component 920 may transmit data files from one enterprise to another enterprise once a list order request has been confirmed, and may enable an enterprise to confirm a list order request.

Enterprise database maintenance component 930 may enable an enterprise to cleanse and update the enterprise's internal database attributes. Enterprise database maintenance component 930 may link a consumer across multiple enterprise devices 220 and/or lifestyle application platform 230 so that when changes are made to the consumer's profile, the changes are made across multiple enterprise devices 220. Enterprise database maintenance component 930 may provide business rules that establish a priority for consumer profile data received from various sources.

Enterprise coupon management services component 940 may enable an enterprise to create a coupon, edit a coupon, copy a coupon, delete a coupon, publish a coupon, attach a coupon to a campaign, etc. A coupon may include a coupon name, a coupon description, a coupon code, a coupon workflow, a product/service name, a maximum number of offers, timing conditions, location information, etc. Enterprise coupon management services component 940 may enable an enterprise to confirm a coupon publication action.

Enterprise referral management services component 950 may enable an enterprise to request a referral partnership initiation (e.g., with another enterprise), request a referral partnership termination, track referral requests, append documentation to a referral request, confirm a referral request, etc. Enterprise referral management services component 950 may enable an enterprise to request a referral partnership initiation for a defined marketing campaign with another enterprise. The documentation appended to a referral request may include marketing content, referral program terms, a fee structure, etc. Enterprise referral management services component 950 may enable an enterprise to review the referral request documentation, and to accept a referral initiation request. Enterprise referral management services component 950 may transmit real-time transactional log data from one enterprise to another enterprise once a referral initiation request has been confirmed. Enterprise referral management services component 950 may track all agreed upon fees for referral program exchanges, as well as the collection status of those fees.

Enterprise loyalty management services component 960 may enable an enterprise to create a loyalty program, edit a loyalty program, copy a loyalty program, delete a loyalty program, publish a loyalty program, attach a loyalty program to a campaign, manage loyalty program registration, manage points awards, manage benefit allocations, etc. The loyalty program may include a loyalty program name, a loyalty program description, a loyalty program code, a loyalty program workflow, qualifying products/services, a maximum number of offers, a maximum number of points, an initial number of points, a valid time period for the program, location information, etc.

Enterprise preference targeting tools component 970 may provide analytics tools for an enterprise to identify potential consumers for marketing activities for specific products, services, and/or content. Enterprise preference targeting tools component 970 may provide tools for an enterprise to predict consumer value potential in terms of response likelihood and lifetime value of new customers. Enterprise preference targeting tools component 970 may provide tools for an enterprise to perform campaign response analysis tying marketing efforts to consumer orders, with multiple forms of performance reporting. Enterprise preference targeting tools component 970 may provide an enterprise with performance modeling tools for untapped markets, cross-sell opportunities, identification of "at risk" customers, prediction of future loyalty and churn, etc.

Enterprise transaction value forecasting component 980 may provide tools for an enterprise to specify market analytics report parameters and request market analytics reports. Enterprise transaction value forecasting component 980 may enable an enterprise to request data enrichment of consumer data stored by lifestyle application platform 230. Enterprise transaction value forecasting component 980 may provide tools for an enterprise to conduct customer profiling and analysis across various anonymous or aggregate data categories, such as demographic, self-identified, geographic, transactional, etc. data categories. Enterprise transaction value forecasting component 980 may provide reporting tools for an enterprise to evaluate the enterprise's marketing exchange performance, and may provide reporting tools for planning, budgeting, forecasting, and executing marketing campaigns and measuring response.

Enterprise fraud prevention component 990 may enable an enterprise to access UIS administrative functionality and to set security preferences for the enterprise. Enterprise fraud prevention component 990 may enable an enterprise to have search, auditing, and reporting capabilities for fraud and security log records of the enterprise and/or of consumers associated with the enterprise.

Although FIG. 9 shows example functional components of enterprise services component 530, in other implementations, enterprise services component 530 may include fewer functional components, different functional components, differently arranged functional components, or additional functional components than depicted in FIG. 9. Additionally, or alternatively, one or more functional components of enterprise services component 530 may perform one or more other tasks described as being performed by one or more other functional components of enterprise services component 530.

Figure 10:
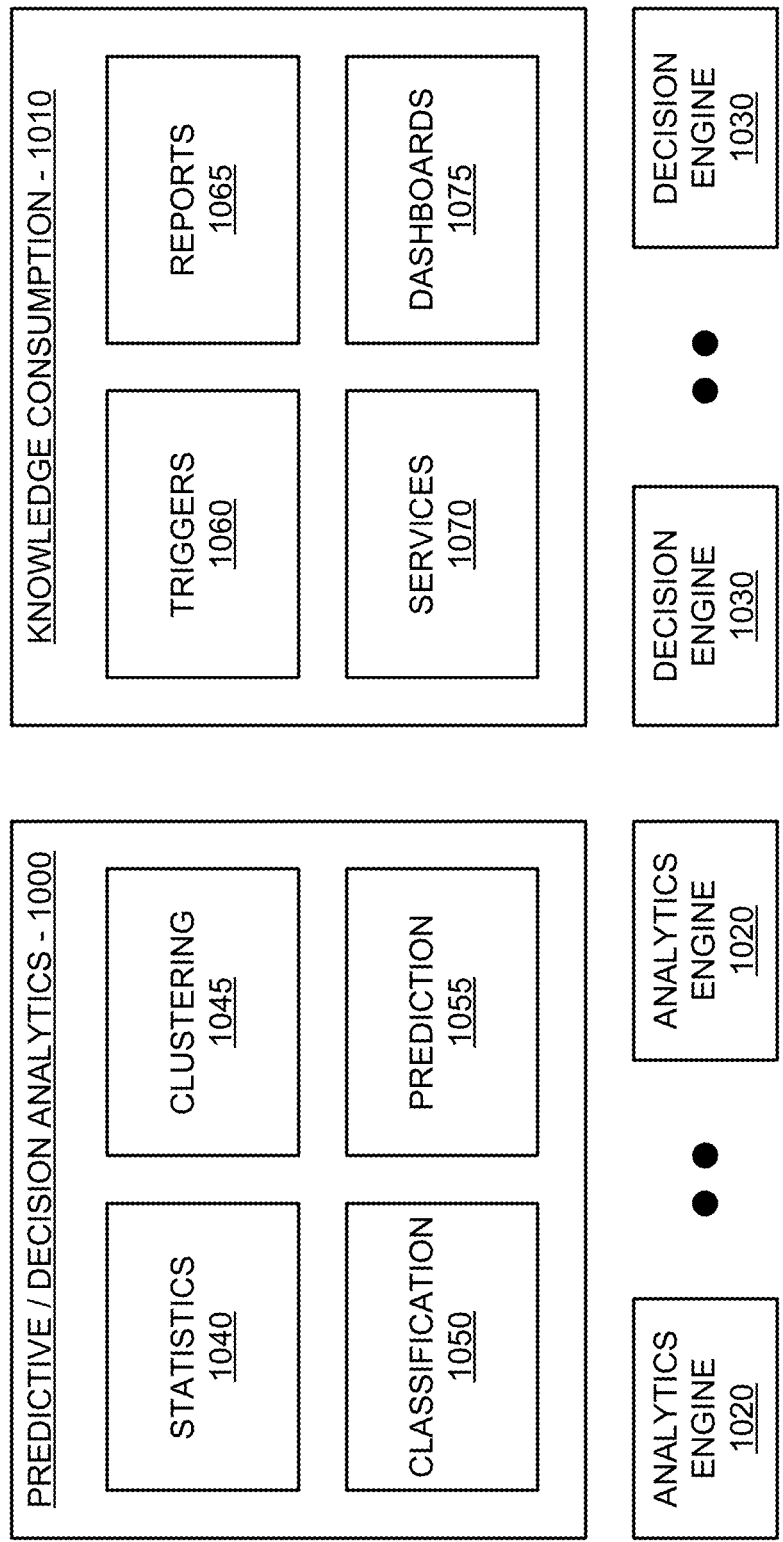
FIG. 10 is a diagram of example functional components of an analytics component of the lifestyle application platform.

FIG. 10 is a diagram of example functional components of analytics component 540 of lifestyle application platform 230 (FIG. 2). In one implementation, the functions described in connection with FIG. 10 may be performed by one or more components of device 300 (FIG. 3) or by one or more devices 300. As shown in FIG. 10, analytics component 540 may include a predictive/decision analytics component 1000, a knowledge consumption component 1010, one or more analytics engines 1020, and one or more decision engines 1030.

Predictive/decision analytics component 1000 may perform predictive and/or decision analytics on data (e.g., consumer information 410 and/or enterprise information 420, FIG. 4) stored by lifestyle application platform 230. The predictive analytics may include a variety of techniques (e.g., modeling, machine learning, data mining, etc.) that analyze current and historical data to make predictions about future events. The predictive analytics may exploit patterns found in historical and transactional data to identify risks and opportunities for enterprises. The predictive analytics may capture relationships among many factors to allow assessment of risk or potential associated with a particular set of conditions, which may guide decision making for candidate transactions. The decision analytics may includes procedures, methods, and/or tools for identifying, representing, and assessing aspects of a decision, and for prescribing a recommended course of action.

In one example implementation, predictive/decision analytics component 1000 may utilize statistics 1040, clustering 1045, classification 1050, and/or prediction 1055 to make predictions (e.g., about consumer behavior). Statistics 1040 may include collecting, organizing, analyzing, interpreting, and presenting data. Clustering 1045 may include assigning a set of data into groups (e.g., clusters) so that data in the same cluster may be more similar to each other than to data in other clusters. In one example, clustering 1045 may be used in conjunction with explorative data mining. Classification 1050 may include identifying to which set of categories (e.g., classifications) a new data observation belongs based on a training set of data containing data with a known category membership. Prediction 1055 may include analyzing current and historical data to make predictions about future events (e.g., consumer behavior).

Knowledge consumption component 1010 may utilize the data stored by lifestyle application platform 230 to generate triggers 1060, reports 1065, services 1070, and/or dashboards 1075. Triggers 1060 may include mechanisms that cause lifestyle application platform 230 to push information (e.g., offers, notifications, marketing campaigns, etc.) to consumers (e.g., via user devices 210). Reports 1065 may include analytics reports, marketing reports, sales reports for products, services, and/or content, etc. Services 1070 may include any of the services described herein for lifestyle application platform 230. For example, services 1070 may include program management services, privacy management services, an offers service, loyalty services, digital payment services, etc. Dashboards 1075 may include any of the dashboards described herein for lifestyle application platform 230. For example, dashboards 1075 may include the consumer dashboard provided by consumer portal component 500, the enterprise dashboard provided by enterprise portal component 520, etc.

Analytics engine 1020 may provide advanced and continuous analysis of real-time information and historical data retrieved and/or received by lifestyle application platform 230. Analytics engine 1020 may analyze data from multiple information sources and may provide insight into consumer behavior.

Decision engine 1030 may use data received from consumers (e.g., consumer information 410, FIG. 4) and/or enterprises (e.g., enterprise information 420, FIG. 4) to provide more relevant or targeted offers for products, services, and/or content. Decision engine 1030 may use such data to provide customized offers for each consumer.

Although FIG. 10 shows example functional components of analytics component 540, in other implementations, analytics component 540 may include fewer functional components, different functional components, differently arranged functional components, or additional functional components than depicted in FIG. 10. Additionally, or alternatively, one or more functional components of analytics component 540 may perform one or more other tasks described as being performed by one or more other functional components of analytics component 540.

Figure 11:
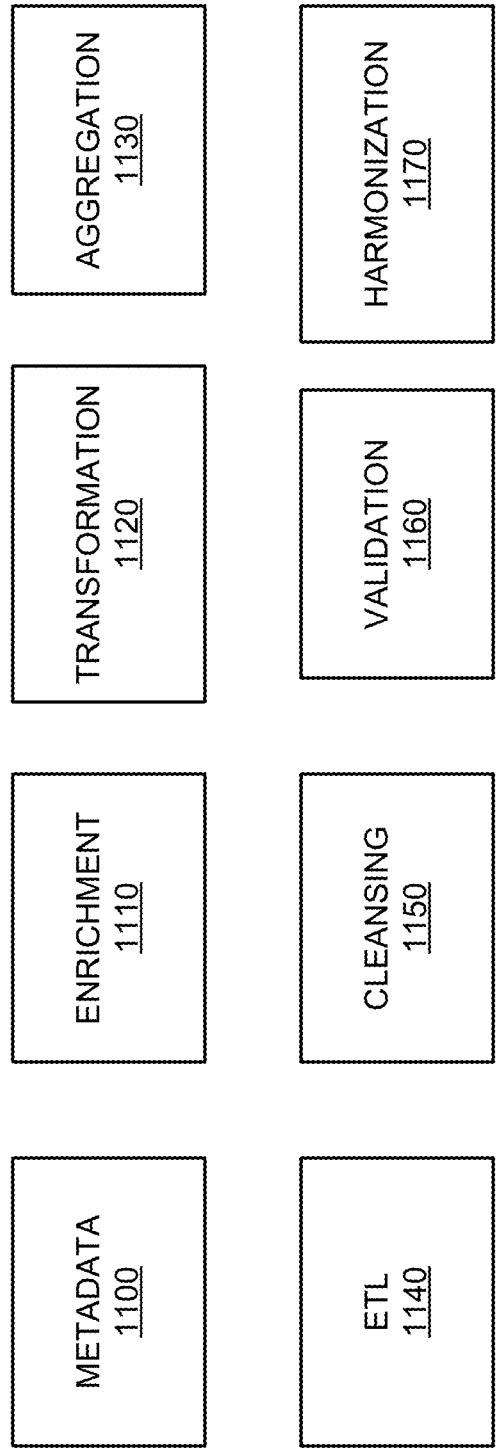
FIG. 11 is a diagram of example functional components of a data integration component of the lifestyle application platform.

FIG. 11 is a diagram of example functional components of data integration component 560 of lifestyle application platform 230 (FIG. 2). In one implementation, the functions described in connection with FIG. 11 may be performed by one or more components of device 300 (FIG. 3) or by one or more devices 300. As shown in FIG. 11, data integration component 560 may include a metadata component 1100, an enrichment component 1110, a transformation component 1120, an aggregation component 1130, an ETL component 1140, a cleansing component 1150, a validation component 1160, and a harmonization component 1170.

Metadata component 1100 may create metadata for some or all of the data retrieved and/or received by lifestyle application platform 230. In one example, the quality of the original data may be increased by creating metadata for the data.

Enrichment component 1110 may add external information, from multiple sources, to the data retrieved/received by lifestyle application platform 230. The external information may enhance the quality and richness of the data, and may provide more information to enterprises (e.g., about consumers).

Transformation component 1120 may convert the data retrieved/received by lifestyle application platform 230 from a first data format into a second, different data format. In one example, the data may be transformed into a format that may be utilized by user devices 210 and/or enterprise devices 220.

Aggregation component 1130 may aggregate the data retrieved/received by lifestyle application platform 230 into a summary form for a variety of purposes (e.g., statistical analysis, obtain more information about particular consumers based on specific variables, such as age, profession, income, etc.).

ETL component 1140 may extract data (e.g., the data retrieved/received by lifestyle application platform 230) from outside sources, may transform the data to fit operational needs (e.g., of the enterprises), and may load the data into an end target (e.g., a database, an operational data store, a data mart, a data warehouse, etc.).

Cleansing component 1150 may detect and correct (or remove) corrupt or inaccurate records from the data retrieved/received by lifestyle application platform 230. In one example, cleansing component 1150 may identify incomplete, incorrect, inaccurate, irrelevant, etc. parts of the data, and may replace, modify, or delete the identified parts of the data.

Validation component 1160 may use routines (e.g., validation rules, check routines, etc.) to check for correctness, meaningfulness, and security of the data retrieved/received by lifestyle application platform 230. The routines may be implemented through automated facilities of a data dictionary or by inclusion of explicit application program validation logic.

Harmonization component 1170 may compare two or more data records (e.g., from the data retrieved/received by lifestyle application platform 230), and may identify commonalties among the data records that warrant the data records being combined, or harmonized, into a single data record.

Although FIG. 11 shows example functional components of data integration component 560, in other implementations, data integration component 560 may include fewer functional components, different functional components, differently arranged functional components, or additional functional components than depicted in FIG. 11. Additionally, or alternatively, one or more functional components of data integration component 560 may perform one or more other tasks described as being performed by one or more other functional components of data integration component 560.

Figure 12:
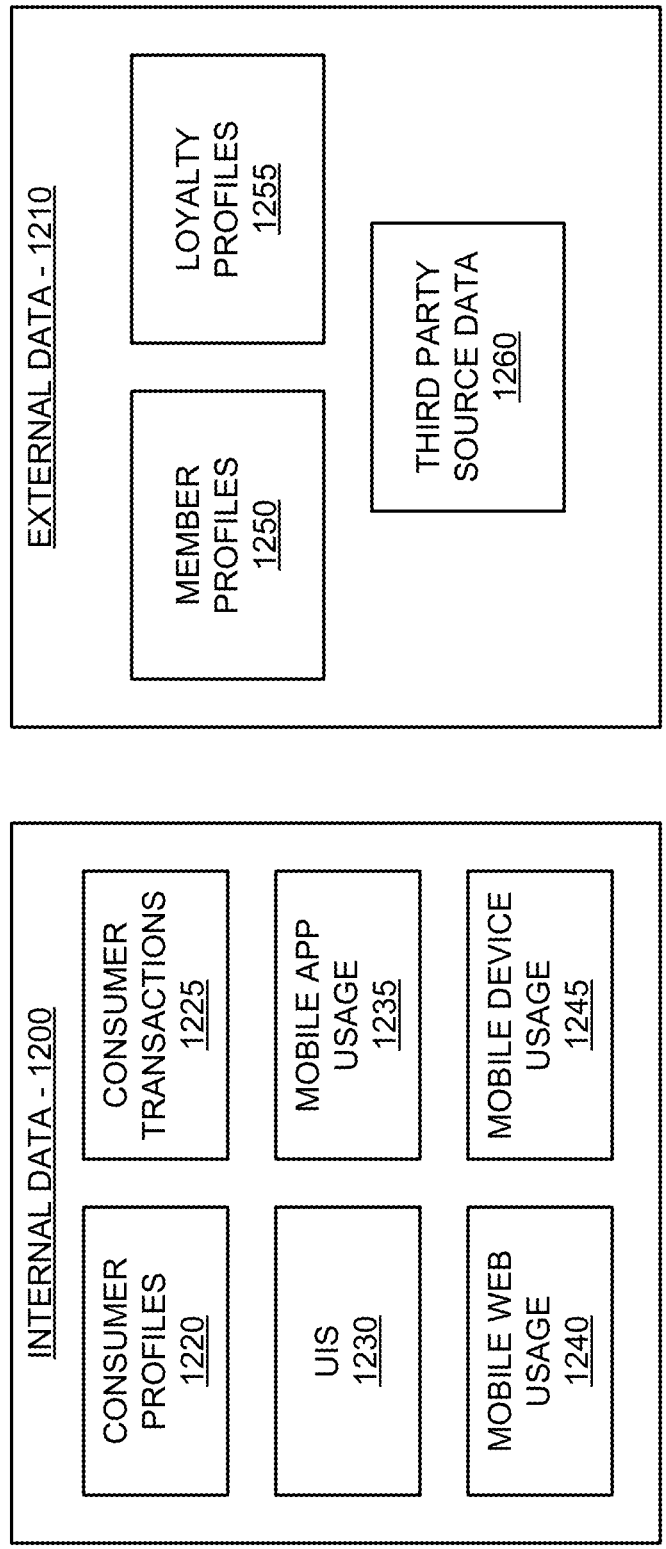
FIG. 12 is a diagram of example data that may be provided in a data sources component of the lifestyle application platform.

FIG. 12 is a diagram of example data that may be provided in data sources component 570 of lifestyle application platform 230 (FIG. 2). As shown in FIG. 12, data sources component 570 may include internal data 1200 and external data 1210.

Internal data 1200 may include data associated with consumers and/or user devices 210 utilized by consumers. For example, internal data 1200 may include consumer profiles 1220, consumer transactions 1225, UIS information 1230, mobile application usage information 1235, mobile web usage information 1240, and mobile device usage information 1245. Consumer profiles 1220 may include information associated with profiles created by consumers as described herein. Consumer transactions 1225 may include transactions performed by consumers with lifestyles application platform 230, as described herein. UIS information 1230 may include identity services information provided by a UIS. Mobile application usage information 1235 may include information associated with usage of the lifestyle application by consumers (e.g., via user devices 210). Mobile web usage information 1240 may include information associated with web usage by consumers (e.g., via user devices 210). Mobile device usage information 1245 may include information associated with usage of user devices 210 by consumers.

External data 1210 may include data associated with enterprises, enterprise devices 220 utilized by enterprises, and/or third parties. For example, external data 1210 may include member profiles 1250, loyalty profiles 1255, and third party source data 1260. Member profiles 1250 may include information associated with profiles created by enterprises via lifestyle application platform 230. Loyalty profiles 1255 may include information associated with consumer loyalty profiles for enterprises associated with lifestyle application platform 230. Third party source data 1260 may include data provided by third parties to lifestyle application platform 230, such as marketing reports, consumer information, sales reports for products, services, and/or content, etc.

Although FIG. 12 shows example data that may be provided in data sources component 570, in other implementations, data sources component 570 may include less data, different data, differently arranged data, or additional data than depicted in FIG. 12.

FIGS. 13A-29G are diagrams of example user interfaces 1300-2960 that may be generated and/or provided by user device 210 (e.g., via the lifestyle application) and/or lifestyle application platform 230. User interfaces 1300-2960 may include graphical user interfaces (GUIs) or non-graphical user interfaces, such as text-based interfaces. User interfaces 1300-2960 may provide information to users via customized interfaces (e.g., proprietary interfaces) and/or other types of interfaces (e.g., browser-based interfaces, etc.). User interfaces 1300-2960 may receive user inputs via one or more input devices, may be user-configurable (e.g., a user may change the sizes of user interfaces 1300-2960, information displayed in user interfaces 1300-2960, color schemes used by user interfaces 1300-2960, positions of text, images, icons, windows, etc., in user interfaces 1300-2960, etc.), and/or may not be user-configurable. Information associated with user interfaces 1300-2960 may be selected and/or manipulated by a consumer associated with user device 210 (e.g., via a touch screen display, a mouse, a keyboard, a keypad, voice commands, etc.).

The user interfaces of FIGS. 13A-13F may depict the steps for installing the lifestyle application on user device 210. In one example, user device 210 may receive an email from lifestyle application platform 230 with a link to begin the installation. If the consumer selects the link in the email, user interface 1300 of FIG. 13A may be displayed to the consumer. User interface 1300 may provide information about the lifestyle application (e.g., a version number, a file size, etc.) and may instruct the consumer to register user device 210 before installing the lifestyle application. If the consumer selects a "Register Device" button, user device 210 may communicate with lifestyle application platform 230 so that lifestyle application platform 230 may register user device 210.

Figure 13C:
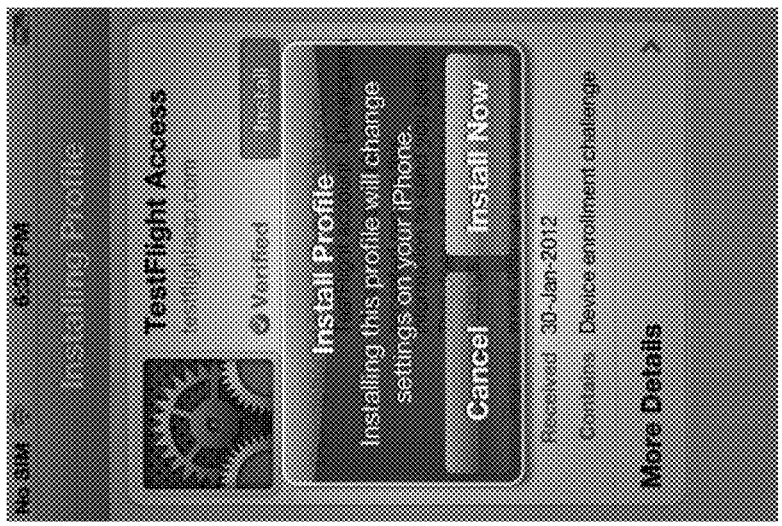
Figure 13B:
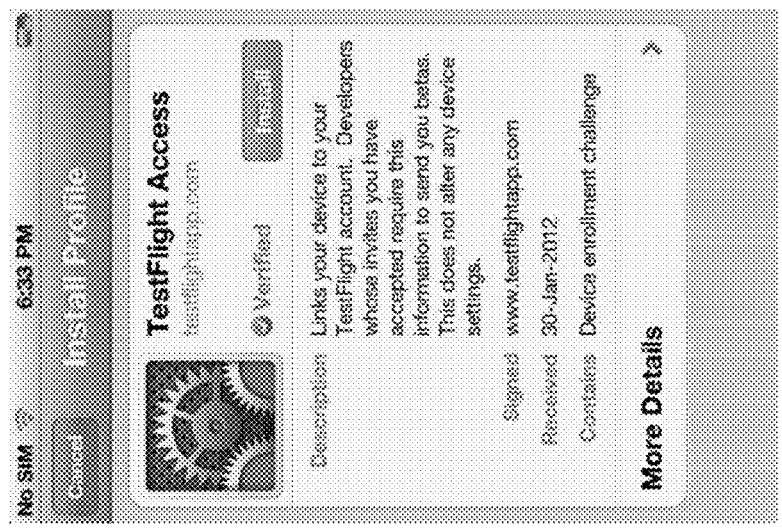
Figure 13A:
Figure 13F:
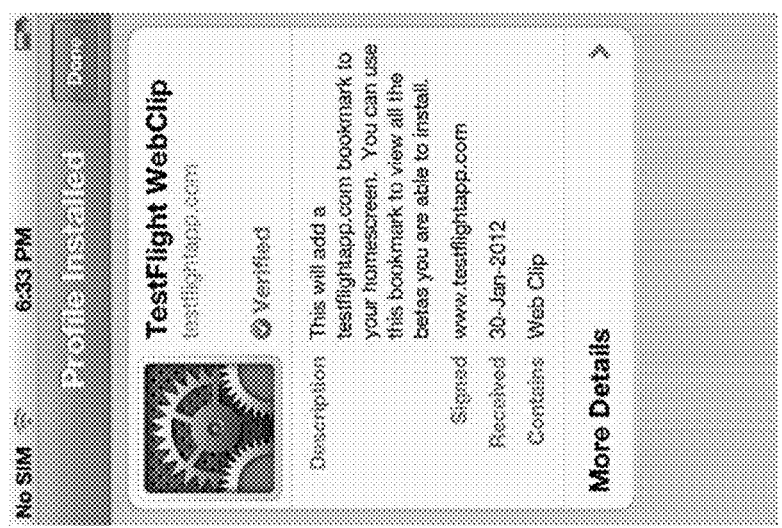

After user device 210 is registered, user interface 1310 of FIG. 13B may be displayed to the consumer. User interface 1310 may provide information about installing a profile for the lifestyle application on user device 210, and may include a mechanism (e.g., an "Install" button) that may begin the installation of the profile. If the consumer selects the "Install" button, user device 210 may begin the profile installation process and user interface 1320 of FIG. 13C may be displayed to the consumer. User interface 1320 may provide a warning that installing the profile on user device 210 will change settings on user device 210. If the consumer wants to proceed with the profile installation, the consumer may select an "Install Now" button. If the consumer selects the "Install Now" button, the profile for the lifestyle application may be installed on user device 210 (e.g., by lifestyle application platform 230). After the profile is installed, user interface 1330 of FIG. 13D may be displayed to the consumer. User interface 1330 may provide information confirming that the profile is installed on user device 210, and may include a mechanism (e.g., a "Done" button) that may begin the lifestyle application installation process.

Figure 13E:
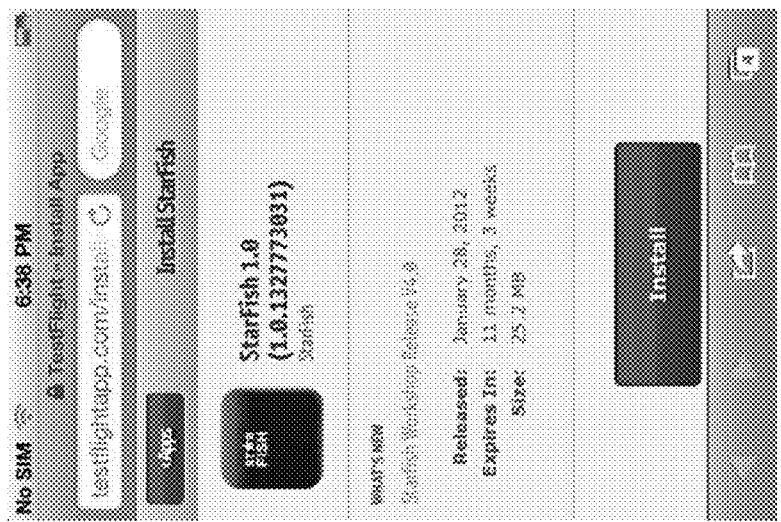
Figure 13D:
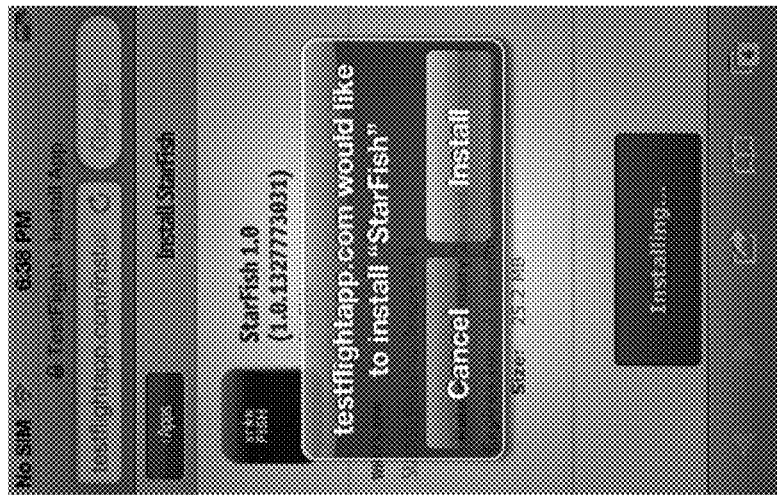

If the consumer selects the "Done" button, user interface 1340 of FIG. 13E may be displayed to the consumer. User interface 1340 may provide information about the lifestyle application (e.g., a version number, a file size, etc.), and may include a mechanism (e.g., an "Install" button) that may begin the installation of the lifestyle application. If the consumer selects the "Install" button, user device 210 may begin the lifestyle application installation process and user interface 1350 of FIG. 13F may be displayed to the consumer. User interface 1350 may provide a notification querying whether the consumer wants to install the lifestyle application on user device 210. If the consumer wants to proceed with the lifestyle application installation, the consumer may select an "Install" button. If the consumer selects the "Install" button, the lifestyle application may be installed on user device 210 (e.g., by lifestyle application platform 230).

The lifestyle application may include a main screen (or channel), a social screen, and a shop screen. User interfaces 1400 and 1420 of FIGS. 14A and 14C, respectively, may provide an example of information provided in a portion of the main screen. As shown, the main screen may include an explore button, a scan and pay button, a me button, a social button, and a shop button. In one example implementation, any of buttons described herein may be replaced with other types of selection mechanisms, such as icons, links, etc. Features associated with the explore button, the scan and pay button, the me button, the social button, and the shop button are described below.

Figures 14A, 14B:
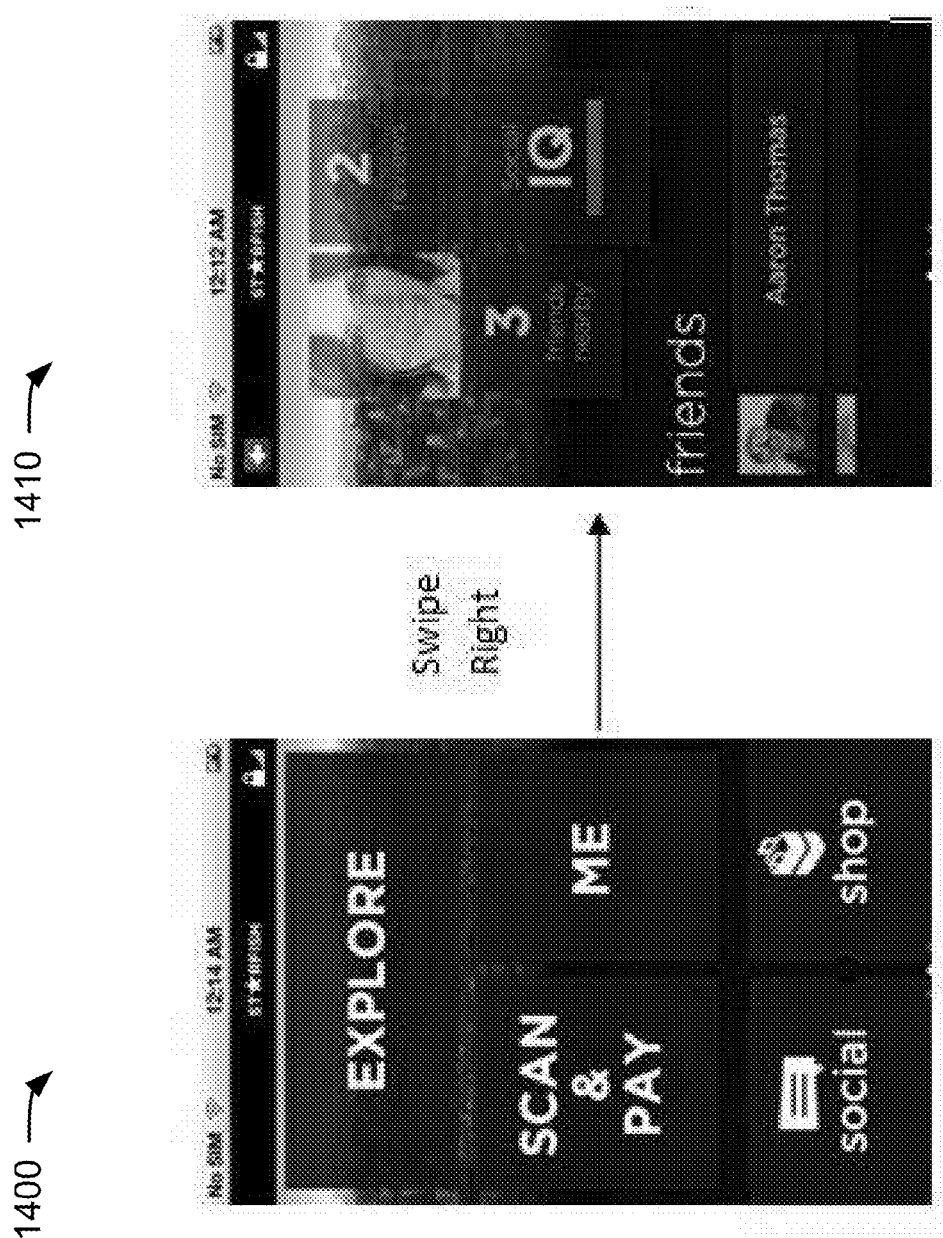

If the consumer selects the social button, user interface 1410 of FIG. 14B may be displayed to the consumer. Alternatively, or additionally, the consumer may swipe right or left to reach user interface 1410. User interface 1410 may provide information associated with consumer's social screen. As shown, the social screen may include an image of the consumer or an image selected by the consumer, a reviews button, a friends nearby button, a social intelligence quotient (IQ) button, a list of the consumer's friends, etc. Selection of the reviews button may cause the lifestyle application to display reviews of different products, service, and/or content provided by other consumers associated with lifestyle application platform 230. Selection of the friends nearby button may cause the lifestyle application to display a list of the consumer's friends that are physically located near (e.g., a predetermined distance from) the consumer. Selection of the social IQ button may cause the lifestyle application to display a social IQ of the consumer. The social IQ may include a number or some other mechanism that identifies how many of the consumer's friends are associated with lifestyle application platform 230. In one example, a higher the social IQ number (e.g., higher than a threshold) may cause the lifestyle application to provide certain benefits (e.g., rewards, special offers, etc.) to the consumer since the information about the consumer's friends may be valuable to the enterprises.

If the consumer selects the shop button, user interface 1430 of FIG. 14D may be displayed to the consumer. Alternatively, or additionally, the consumer may swipe right or left to reach user interface 1430. User interface 1430 may provide information associated with consumer's shop screen. As shown, the shop screen may include an image of the consumer or an image selected by the consumer, a restaurants button, an events button, a shop IQ button, a list of offers available from various enterprises (e.g., 10% off clothes at a clothing store), etc. Selection of the restaurants button may cause the lifestyle application to display a list of restaurants that meet a preference (e.g., gluten-free) associated with the consumer. Selection of the events button may cause the lifestyle application to display a list of events (e.g., sales, special offers, etc.) provided by enterprises associated with the consumer. Selection of the shop IQ button may cause the lifestyle application to display a shop IQ of the consumer. The shop IQ may include a number or some other mechanism that identifies shopping habits (e.g., brand preferences, number of transactions, dollar amount spent, etc.) of the consumer. In one example, a higher the shop IQ number (e.g., higher than threshold) may cause the lifestyle application to provide certain benefits (e.g., rewards, special offers, etc.) to the consumer since the information about the consumer's shopping habits may be valuable to the enterprises.

When the lifestyle application is launched, the main screen may be displayed to the consumer. User interface 1500 of FIG. 15A may provide an example of information provided in a portion of the main screen. As shown, the main screen may include a play button, a home button, a work button, a travel button, a my day button, a favorites section, and an explore button. Selection of the play button may cause the lifestyle application to display relevant enterprise information 430 from enterprises that provide social products, services, and/or content (e.g., movie times, restaurant information, etc.) to the consumer. Selection of the work button may cause the lifestyle application to display relevant enterprise information 430 from enterprises that provide work-related products, services, and/or content (e.g., teleconferencing services, financial market information, etc.) to the consumer. Selection of the travel button may cause the lifestyle application to display relevant enterprise information 430 from enterprises that provide travel-related products, services, and/or content (e.g., airline services, hotel services, etc.) to the consumer. Selection of the my day button may cause the lifestyle application to display a calendar that lists meetings, events, etc. of the consumer. The favorites section may display a list of the consumer's favorite brands, enterprises, etc.

If the consumer swipes right or left, user interface 1510 of FIG. 15B may be displayed to the consumer. User interface 1510 may provide the shop screen and may include the features described above for user interface 1430 (FIG. 14D). If the consumer selects the shop IQ button, user interface 1520 of FIG. 15C may be displayed to the consumer. User interface 1520 may provide an expanded view of the consumer's shop IQ. For example, user interface 1520 may reference an item purchased at a particular store (e.g., Better Purchase), and may ask the consumer whether the particular store is the consumer's favorite source for consumer electronics. Based on the consumer's response to the question about the particular store, the consumer's shop IQ may change. For example, the shop IQ may increase or decrease based on whether the consumer responds yes or no to the question about the particular store.

Figure 15E:
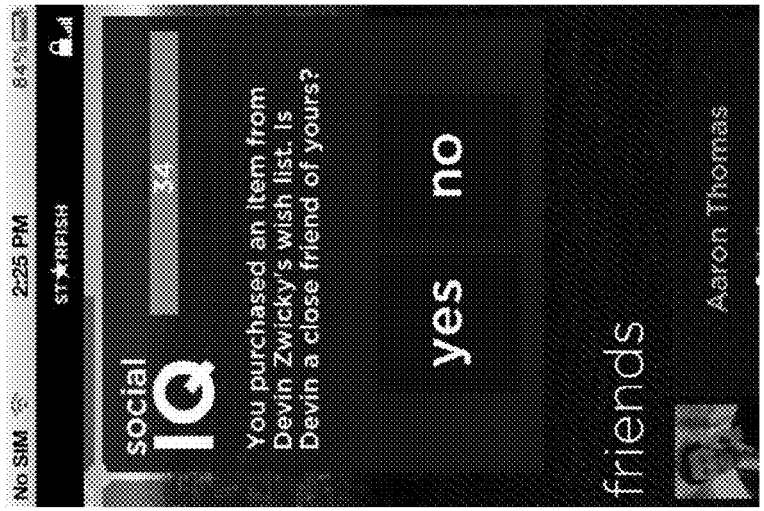
Figure 15D:
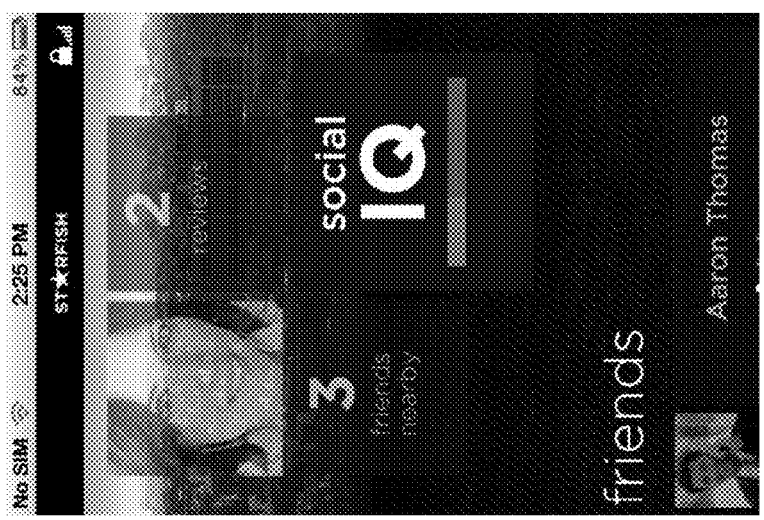

If the consumer swipes right or left, user interface 1530 of FIG. 15D may be displayed to the consumer. User interface 1530 may provide the social screen and may include the features described above for user interface 1410 (FIG. 14B). If the consumer selects the social IQ button, user interface 1540 of FIG. 15E may be displayed to the consumer. User interface 1540 may provide an expanded view of the consumer's social IQ. For example, user interface 1540 may reference an item purchased from a person's (e.g., Devin Zwicky) wish list, and may ask the consumer whether the person is a close friend of the consumer. Based on the consumer's response to the question about the person, the consumer's social IQ may change. For example, the social IQ may increase or decrease based on whether the consumer responds yes or no to the question about the person.

Figure 16B:
Figure 16A:
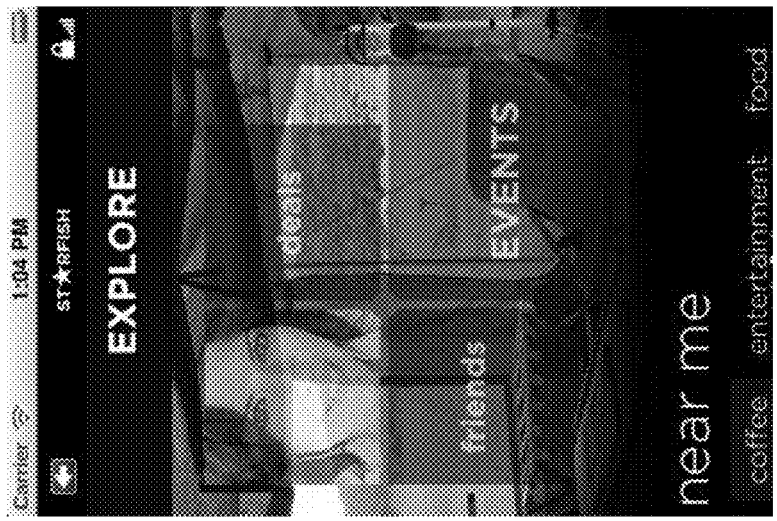

If the consumer selects the explore button (see FIGS. 14A and 15A) of the main screen, user interface 1600 of FIG. 16A may be displayed to the consumer. User interface 1600 may provide the explore screen and may include a deals button, a friends button, an events button, a near me section, etc. Selection of the deals button may cause the lifestyle application to display deals for products, services, and/or content relevant to the consumer. Selection of the friends button may cause the lifestyle application to display a list of the consumer's friends. Selection of the events button may cause the lifestyle application to display events (e.g., sales, special offers, etc.) associated with products, services, and/or content relevant to the consumer.

The consumer may scroll down to see information associated with the near me section, as shown in user interface 1610 of FIG. 16B. User interface 1610 may provide information associated with different products, services, and/or content from enterprises that are physically located near (e.g., within a predetermined distance) the consumer. For example, user interface 1610 may provide a list of coffee shops, entertainment, food, etc. located near the consumer. The consumer may access the shop screen from the explore screen of FIGS. 16A and 16B, and the lifestyle application may display user interface 1620 of FIG. 16C and/or user interface 1630 of FIG. 16D to the consumer. User interfaces 1620 and 1630 may include the features described above in connection with user interfaces 1510 (FIG. 15B) and 1520 (FIG. 15C), respectively.

If the consumer selects the scan and pay button of the main screen (see FIG. 14A), user interface 1700 of FIG. 17A may be displayed to the consumer. User interface 1700 may provide the scan and pay screen and may include a snap picture button, a voice search button, a scan an item button, a recent section, etc. Selection of the snap picture button may cause user device 210 to enable the consumer to take a picture with a camera of user device 210. Selection of the voice search button may cause the lifestyle application to enable the consumer to perform a voice search. Selection of the scan an item button may cause the lifestyle application to enable the consumer to scan and pay for a product, service, and/or content.

The consumer may scroll down to see information associated with the recent section, as shown in user interface 1710 of FIG. 17B. User interface 1710 may provide information associated with different products, services, and/or content from enterprises that were recently purchased by the consumer. For example, user interface 1710 may provide information associated with a dinner, a dress, etc. that were recently purchased by the consumer. The consumer may access the social screen from the scan and pay screen of FIGS. 17A and 17B, and the lifestyle application may display user interface 1720 of FIG. 17C and/or user interface 1730 of FIG. 17D to the consumer. User interfaces 1720 and 1730 may include the features described above in connection with user interfaces 1530 (FIG. 15D) and 1540 (FIG. 15E), respectively.

Alternatively, or additionally, the consumer may access the shop screen from the scan and pay screen of FIGS. 17A and 17B, and the lifestyle application may display user interface 1740 of FIG. 17E and/or user interface 1750 of FIG. 17F to the consumer. User interfaces 1740 and 1750 may include the features described above in connection with user interfaces 1510 (FIG. 15B) and 1520 (FIG. 15C), respectively.

Figures 18A, 18B, 18C:
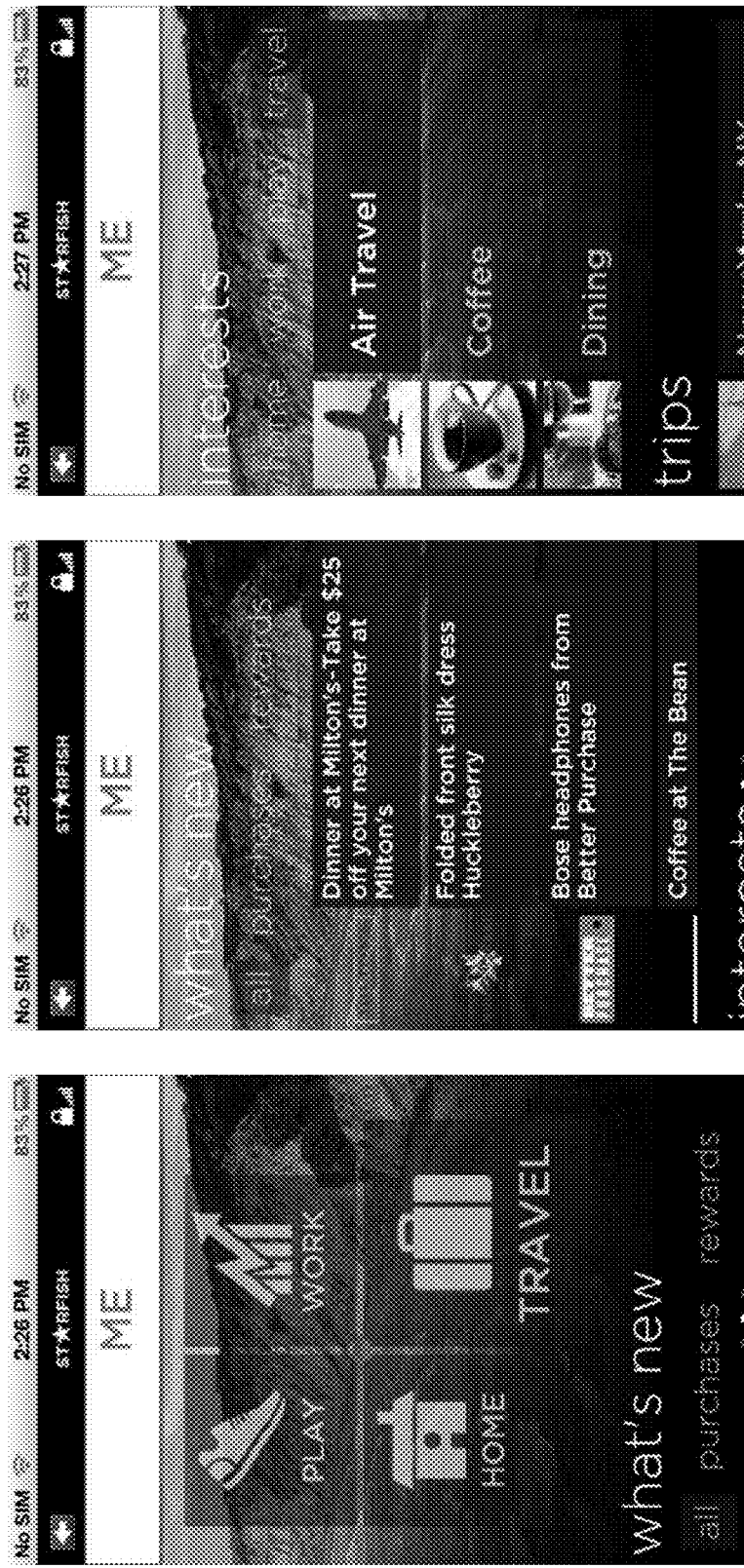
Figure 18D:
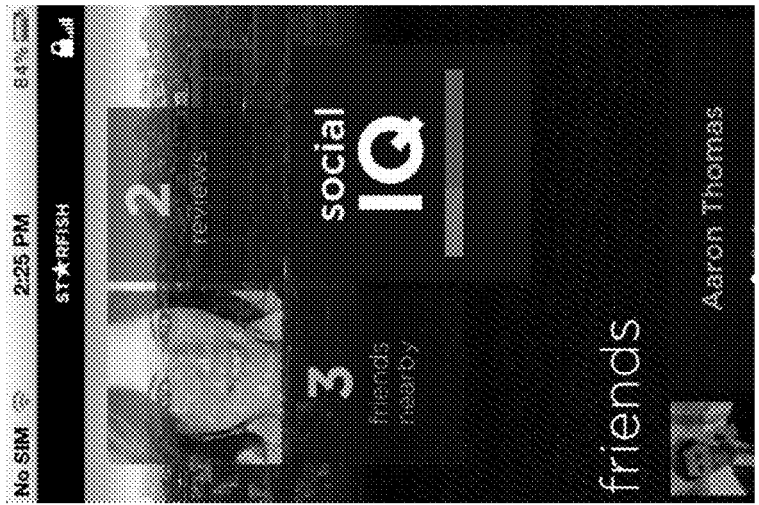
Figure 18E:
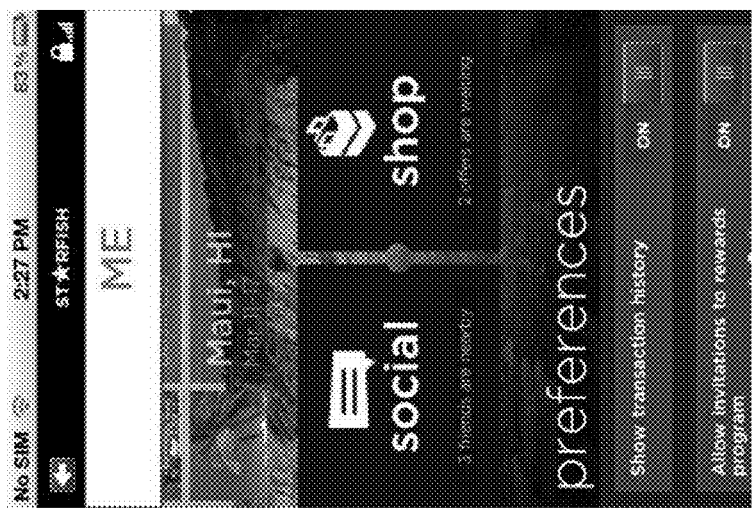

If the consumer selects the me button (see FIG. 14A) of the main screen, user interface 1800 of FIG. 18A may be displayed to the consumer. User interface 1800 may provide the me screen and may include a play button, a work button, a home button, a travel button, a what's new section, etc. The me screen may enable the consumer to set global privacy settings, view receipts for transactions, etc. Selection of the play button may cause the lifestyle application to display relevant enterprise information 430 from enterprises that provide social products, services, and/or content to the consumer. Selection of the work button may cause the lifestyle application to display relevant enterprise information 430 from enterprises that provide work-related products, services, and/or content to the consumer. Selection of the home button may cause the lifestyle application to display the main screen (FIG. 14A). Selection of the travel button may cause the lifestyle application to display relevant enterprise information 430 from enterprises that provide travel-related products, services, and/or content to the consumer.

The consumer may scroll down to see information associated with the what's new section, as shown in user interface 1805 of FIG. 18B. User interface 1805 may provide information associated with purchases, rewards, etc. that were made or received by the consumer. For example, user interface 1805 may provide information associated with a dinner, a dress, headphones, coffee, etc. that were recently purchased by the consumer. The consumer may continue to scroll down to see information associated with an interests section, as shown in user interface 1810 of FIG. 18C. User interface 1810 may include information associated with interests of the consumer. For example, if the consumer is utilizing a travel mode, the interests may include information associated with air travel, coffee shops, dining, etc. If the consumer selects air travel, user interface 1815 of FIG. 18D may be displayed to the consumer. User interface 1815 may provide a list of enterprises that provide air travel services. The consumer may continue to scroll down to see information associated with a trips section, as shown in user interface 1820 of FIG. 18E. User interface 1820 may include information associated with trips planned by the consumer.

Figure 18F:
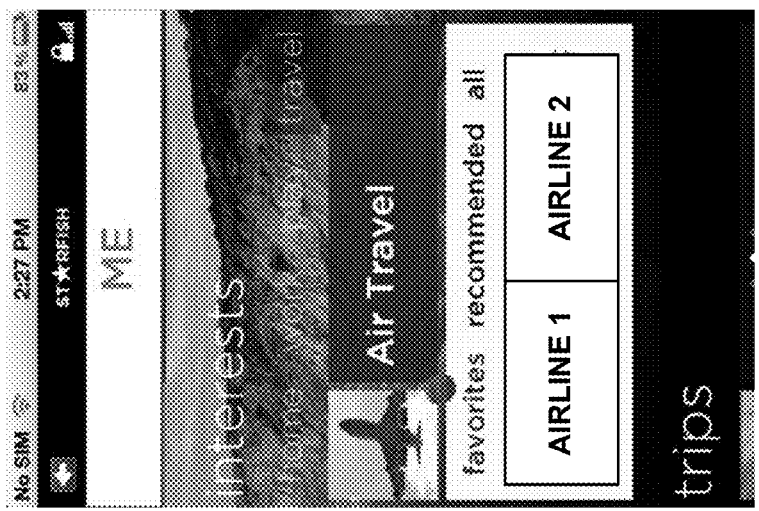
Figure 18I:
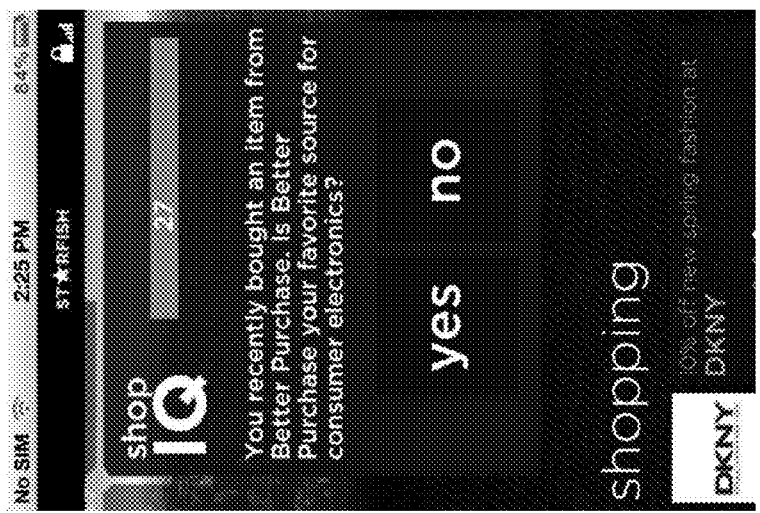
Figure 18H:
Figure 18G:
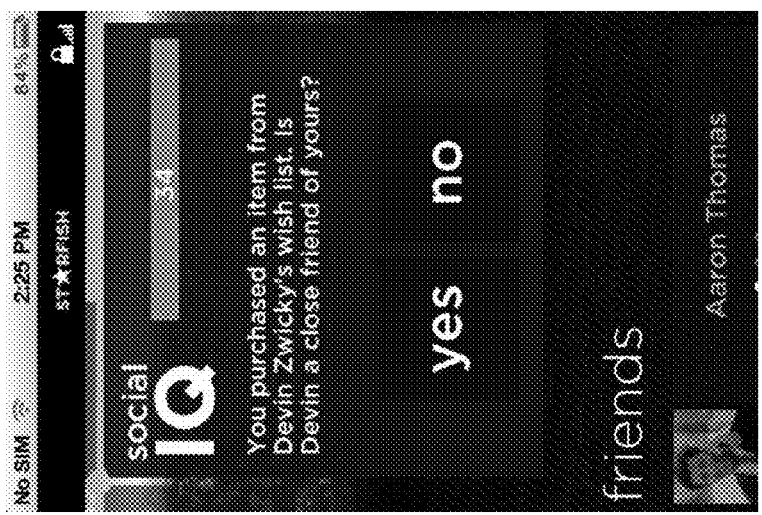
Figure 18Q:
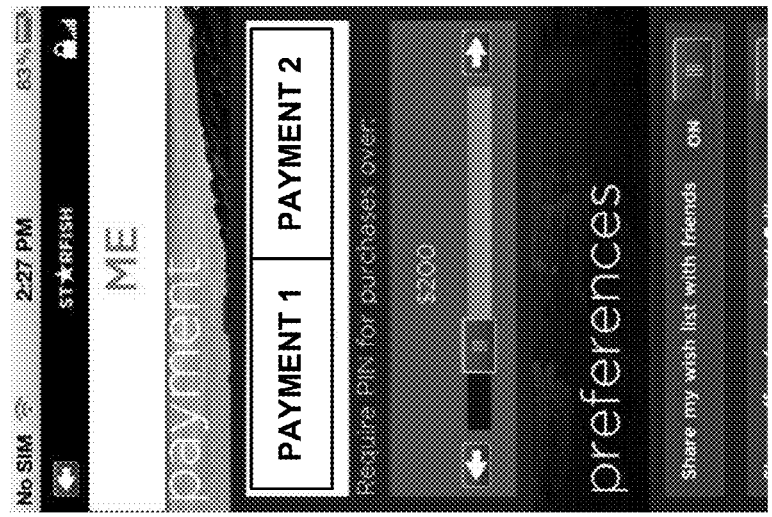
Figure 18P:
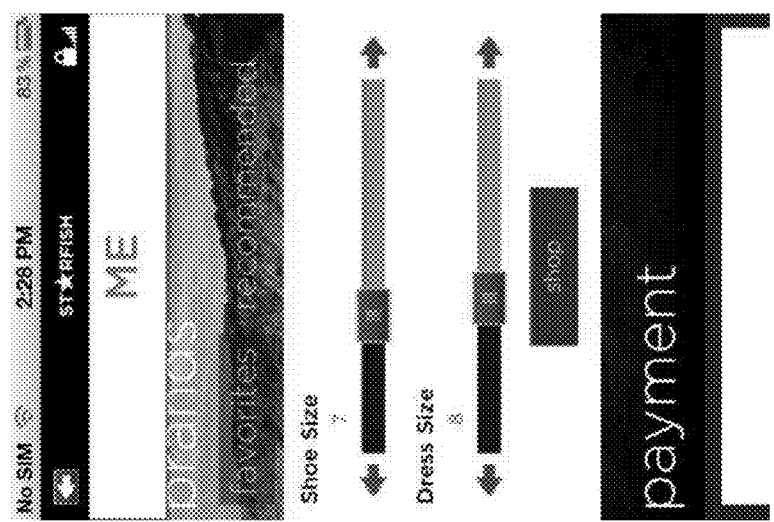

The consumer may access the social screen from the me screen of FIGS. 18A-18E, and the lifestyle application may display user interface 1825 of FIG. 18F and/or user interface 1830 of FIG. 18G to the consumer. User interfaces 1825 and 1830 may include the features described above in connection with user interfaces 1530 (FIG. 15D) and 1540 (FIG. 15E), respectively. Alternatively, or additionally, the consumer may access the shop screen from the me screen of FIGS. 18A-18E, and the lifestyle application may display user interface 1835 of FIG. 18H and/or user interface 1840 of FIG. 18I to the consumer. User interfaces 1835 and 1840 may include the features described above in connection with user interfaces 1510 (FIG. 15B) and 1520 (FIG. 15C), respectively.

The consumer may continue to scroll down to see information associated with a brands section, as shown in user interface 1845 of FIG. 18J. User interface 1845 may include information associated with the consumer's favorite brands. The consumer may set a privacy level (e.g., anonymous, pseudonymous, legal, etc.) for each of the brands listed in the brands section. For example, the consumer may elect to share a bare minimum amount of information about the consumer, as shown in user interface 1850 of FIG. 18K. Alternatively, the consumer may elect to share the consumer's preferences anonymously so that the enterprises know what the consumer likes and can customize the consumer's experience, as shown in user interface 1855 of FIG. 18L. Alternatively, the consumer may elect to share the consumer's location and identity so that the enterprises may provide VIP service to the consumer, as shown in user interface 1860 of FIG. 18M. Alternatively, the consumer may elect to share the consumer's full profile so that the enterprises may offer highly personalized offers for products, services, etc., as shown in user interface 1865 of FIG. 18N.

The consumer may utilize the brands section to set preferences for each of the brands listed in the brands section. For example, the consumer may change a shoe size and a dress size of the consumer (e.g., for an enterprise offering shoes or dresses) via the brands section, as shown in user interface 1870 of FIG. 18O and user interface 1875 of FIG. 18P. The consumer may continue to scroll down to see information associated with a payment section, as shown in user interface 1880 of FIG. 18Q. User interface 1880 may enable the consumer to set payment settings. For example, the consumer may require a personal identification number (PIN) for purchases over an amount (e.g., $200) set by the consumer. The consumer may receive an authentication challenge based on the payment amount set in the payment section. For example, if the consumer performs a transaction with Better Purchase for an amount that exceeds $200, the lifestyle application may display a "Verify Pin" screen. If the transaction amount does not exceed $200, the transaction may be completed without entering a PIN.

Figures 19A, 19B:
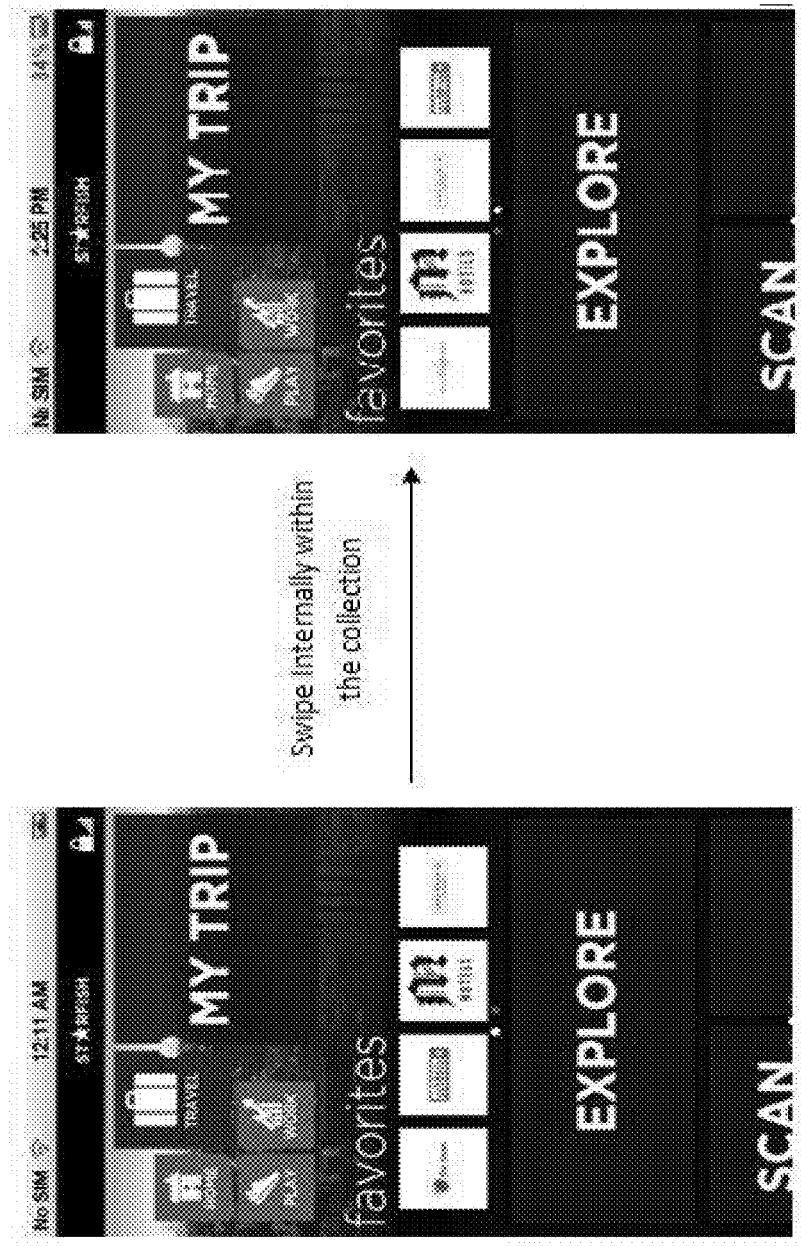

User interface 1900 of FIG. 19A may display the main screen (e.g., described above in FIG. 14A) to the consumer. As shown, user interface 1900 may include the favorites section that provides a list of the consumer's favorite brands. However, user interface 1900 may be unable to display all of the consumer's favorite brands on a single screen. Thus, the consumer may swipe right or left on the favorites section to see additional brands of the brands section, as shown in user interface 1910 of FIG. 19B.

Figure 20A:
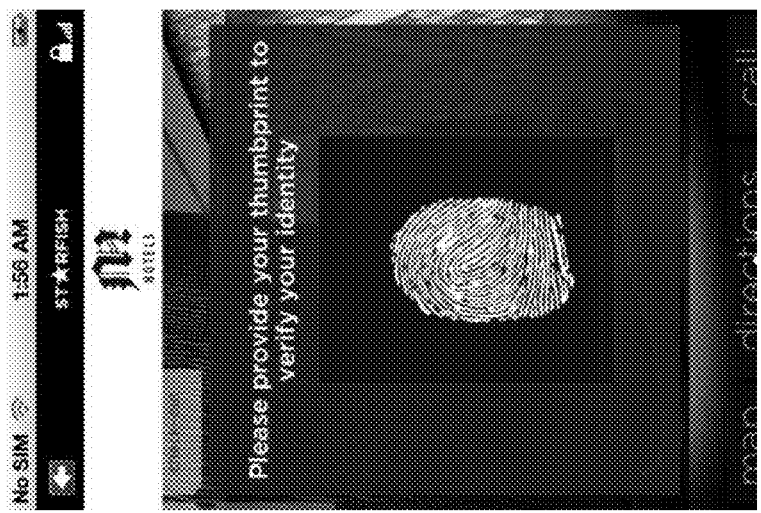
Figure 20B:
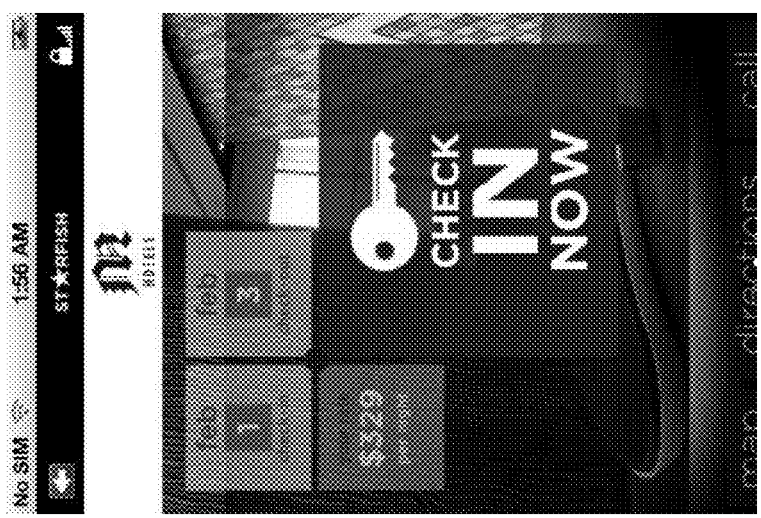
Figure 20C:
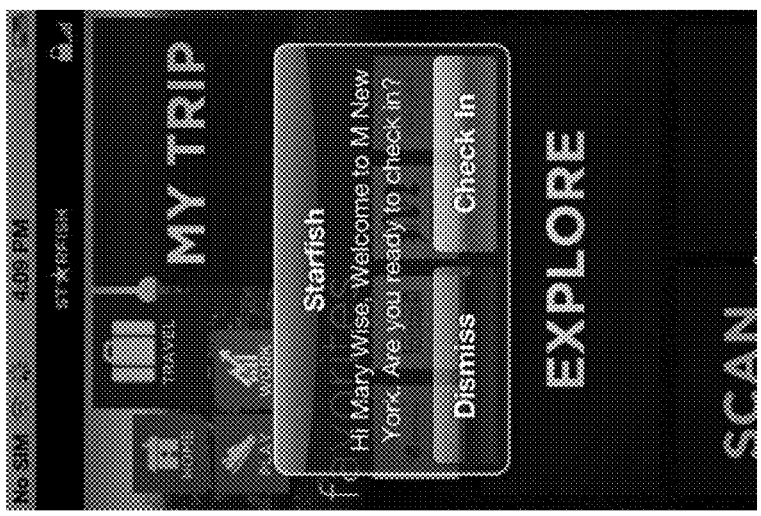
Figure 20M:
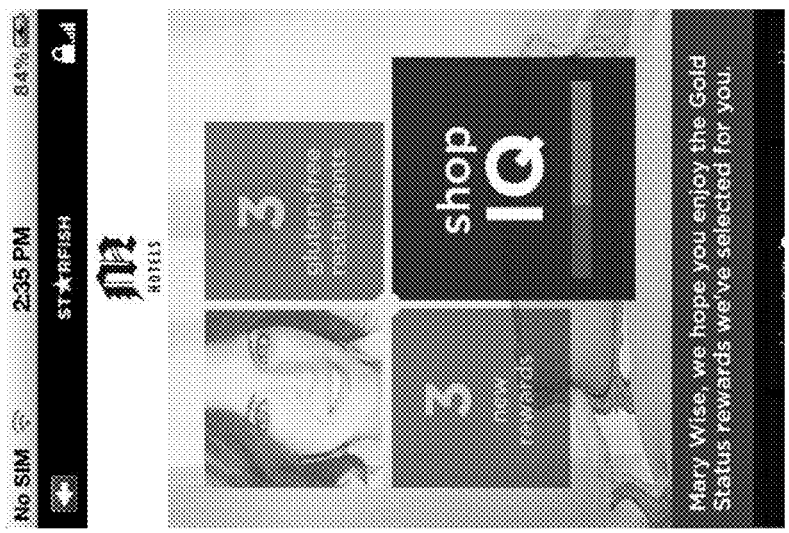
Figure 20N:
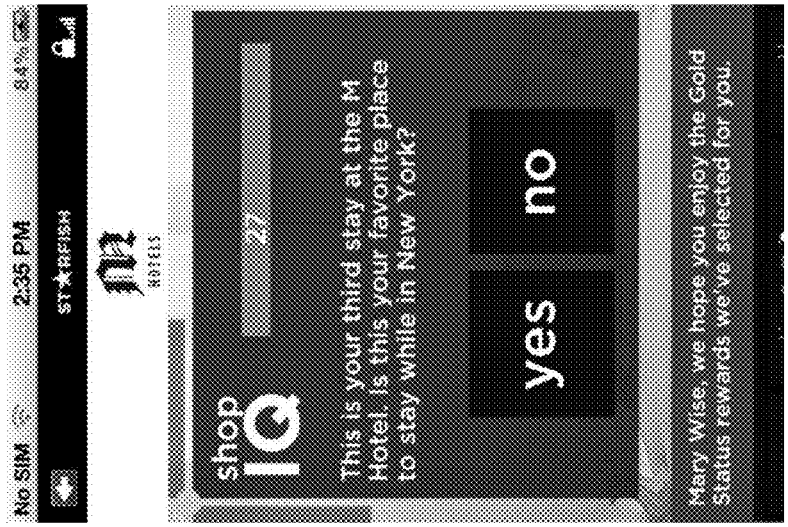
Figure 20Q:
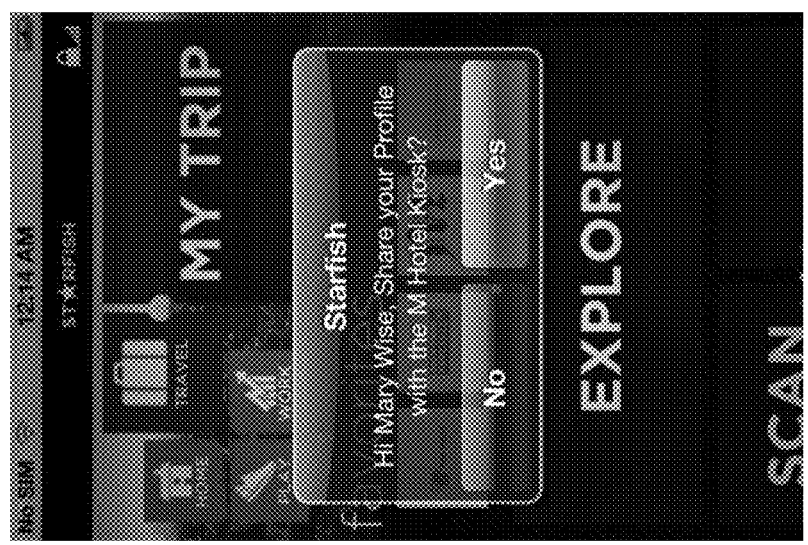

In one example, user interfaces 2000-2080 of FIGS. 20A-20Q may depict information associated with a hotel check in scenario. Assume that the consumer associated with user device 210 previously reserved a room at a particular hotel (e.g., M Hotel) via lifestyle application platform 230. Accordingly, lifestyle application platform 230 may store all of the information associated with the consumer's reservation.

When the consumer approaches the hotel with user device 210, location information associated with user device 210 may trigger lifestyle application platform 230 to provide a notification to user device 210. For example, as shown in FIG. 20A, the notification may cause the lifestyle application to display user interface 2000. User interface 2000 may display a notification asking whether the consumer wishes to check into the hotel (e.g., "Hi Mary Wise. Welcome to M New York. Are you ready to check in?") If the consumer selects "Check In" on user interface 2000, user interface 2005 of FIG. 20B may be displayed to the consumer. User interface 2005 may display a "check in now" window to the consumer.

If the consumer selects the "check in now" window of FIG. 20B, user interface 2010 of FIG. 20C may be displayed to the consumer. User interface 2010 may request that the consumer provide a thumbprint (or some other verification mechanism) to verify an identity of the consumer. If the consumer provides a thumbprint and lifestyle application platform 230 verifies the consumer thumbprint, user interface 2015 of FIG. 20D may be displayed to the consumer. User interface 2015 may provide the consumer with an option to receive an electronic room key or to unlock the door to the consumer's hotel room. Since the consumer does not have the electronic room key yet, the consumer may elect to receive the electronic room key.

When the consumer elects to receive the electronic room key, lifestyle application platform 230 may provide the electronic room key to user device 210 and user interface 2020 of FIG. 20E may be displayed to the consumer. User interface 2020 may indicate that user device 210 has received the electronic room key and that the electronic room key is ready for use. The lifestyle application may provide information associated with the reservation in user interface 2025 of FIG. 20F. User interface 2025 may display, to the consumer, a room number (e.g., Room #222), an option to call the front desk, directions, an option to open the door to the room, etc. If the consumer selects the option to open the door to the room, user interface 2030 of FIG. 20G may be displayed to the consumer. User interface 2030 may provide the consumer with option to receive an electronic room key or to unlock the door to the consumer's hotel room. Since the consumer has the electronic room key, the consumer may elect to unlock the door to the hotel room. When the consumer elects to unlock the door, the consumer may tap user device 210 against a lock of the door, and the electronic room key (e.g., provided to user device 210) may unlock the door. Once the door is unlocked, the lifestyle application may display user interface 2035 of FIG. 20H to the consumer. User interface 2035 may provide details about the room (e.g., a rate per night, check-in and check-out dates, etc.) and other information (e.g., maps, directions, phone numbers, etc.).

The consumer may return to the main screen (e.g., described above in FIG. 14A), as shown in user interface 2040 of FIG. 20I. From the main screen, the consumer may manipulate the favorites section until an icon or button for the M Hotel appears in the favorites section. As shown in user interface 2045 of FIG. 20J, the consumer may select the button for the M Hotel from the favorites section to once again view the room details displayed in user interface 2035 (FIG. 20H).

The consumer may access the social screen from the main screen of FIG. 20I, and the lifestyle application may display user interface 2050 of FIG. 20K and/or user interface 2055 of FIG. 20L to the consumer. User interfaces 2050 and 2055 may include the features described above in connection with user interfaces 1530 (FIG. 15D) and 1540 (FIG. 15E), respectively. If the consumer selects the social IQ button from user interface 2050, user interface 2055 may display information associated with the consumer's social contacts. For example, user interface 2055 may indicate that Kate Ashby is staying at the same M Hotel as the consumer, and may ask whether Kate Ashby is the consumer's work colleague.

Alternatively, or additionally, the consumer may access the shop screen from the main screen of FIG. 20I, and the lifestyle application may display user interface 2060 of FIG. 20M and/or user interface 2065 of FIG. 20N to the consumer. User interfaces 2060 and 2065 may include the features described above in connection with user interfaces 1510 (FIG. 15B) and 1520 (FIG. 15C), respectively. If the consumer selects the shop IQ button from user interface 2060, user interface 2065 may display information associated with the M Hotel. For example, user interface 2065 may indicate that this is the consumer's third stay at the M Hotel, and may ask whether the M Hotel is the consumer's favorite place to stay while in New York.

The consumer may share the consumer's profile with the M Hotel's kiosk so that the consumer may see personalized offers from the M Hotel. For example, the consumer may return to the main screen (e.g., described above in FIG. 14A), as shown in user interface 2070 of FIG. 20O. From the main screen, the consumer may manipulate the favorites section until an icon or button for the M Hotel appears in the favorites section. As shown in user interface 2075 of FIG. 20P, the consumer may select the button for the M Hotel from the favorites section to share the consumer's profile with the M Hotel kiosk. User interface 2080 of FIG. 20Q may be displayed to the consumer and may ask whether the consumer wants to share the consumer's profile with the M Hotel kiosk.

Figure 21C:
Figure 21D:
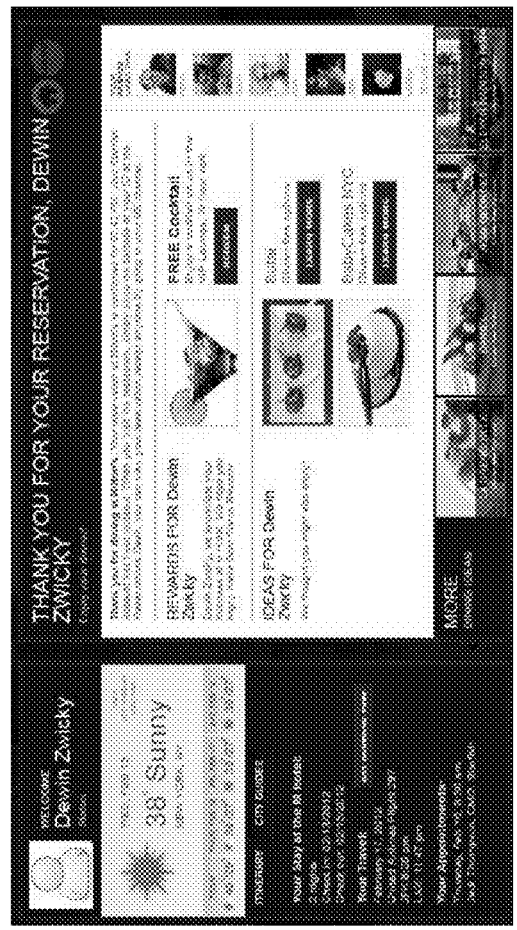

After the consumer's profile is provided to the hotel kiosk, user interface 2100 of FIG. 21A may be displayed by the hotel kiosk to the consumer. User interface 2100 may include information customized to the consumer, such as weather information, reservation information, travel information, dining information, etc. If the consumer selects a dinner deal at Milton's restaurant, user interface 2110 of FIG. 21B may be displayed to the consumer by the hotel kiosk. User interface 2110 may include information associated with the dinner deal provided by Milton's restaurant. If the consumer selects a reservation button, user interface 2120 of FIG. 21C may be displayed to the consumer by the hotel kiosk. User interface 2120 may enable the consumer to book a reservation time and date with Milton's restaurant. After booking the reservation, the consumer may select a confirm reservation button and user interface 2130 of FIG. 21D may be displayed to the consumer by the hotel kiosk. User interface 2130 may include information associated with recommendations, rewards, offers, etc. provided by Milton's restaurant.

Figure 21E:
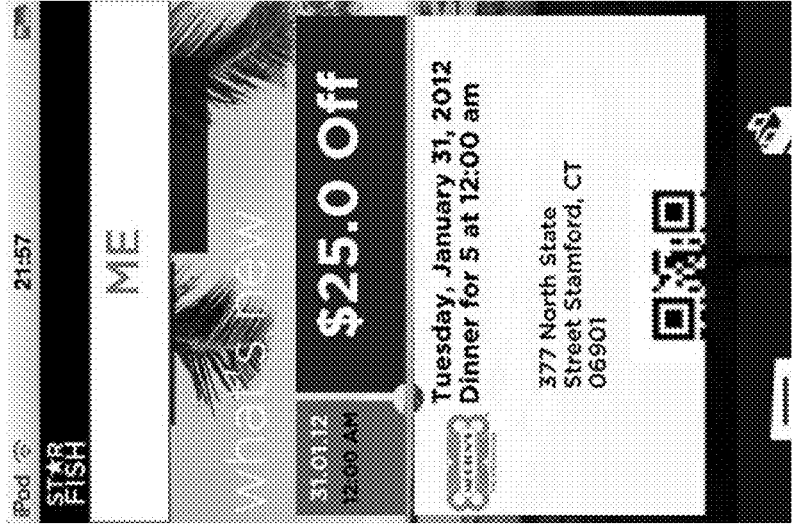
Figure 21F:
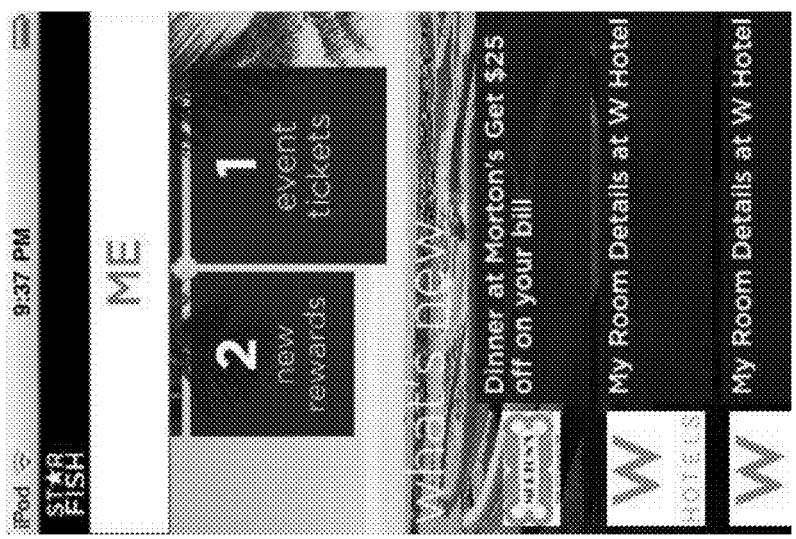

The consumer may utilize the lifestyle application on user device 210 to navigate to the me screen, as shown in user interface 2140 of FIG. 21E. In one example, user interface 2140 may include the features described above in connection with user interface 1800 (FIG. 18A). User interface 2140 may display recent receipts for the consumer's purchases. For example, the consumer may select "Dinner at Milton's," and the lifestyle application may display user interface 2150 of FIG. 21F to the consumer. User interface 2150 may enable the consumer to view the receipt for the dinner at Milton's restaurant and to check the correctness of the receipt.

In one example, user interfaces 2200-2255 of FIGS. 22A-22L may depict information associated with the purchase of coffee from a coffee shop (e.g., the bean). User interface 2200 of FIG. 22A may display the main screen (e.g., described above in FIG. 14A) to the consumer. The consumer may select the explore button from the main screen, and the lifestyle application may display user interface 2205 of FIG. 22B to the consumer. User interface 2205 may include the features described above in connection with user interface 1600 (FIG. 16A). The consumer may select "coffee" from the near me section of user interface 2205, and the lifestyle application may display user interface 2210 of FIG. 22C to the consumer. User interface 2210 may provide a list of coffee shops near the consumer, such as the bean, the Spot cafe, etc.

Figure 22C:
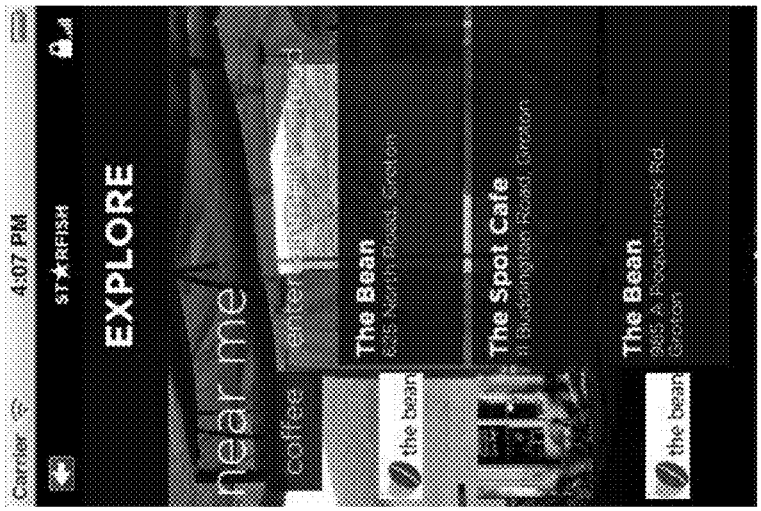
Figure 22B:
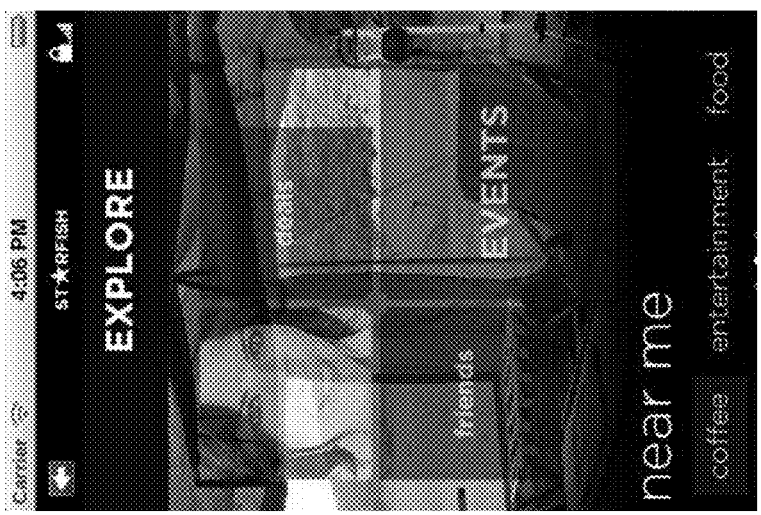
Figure 22A:
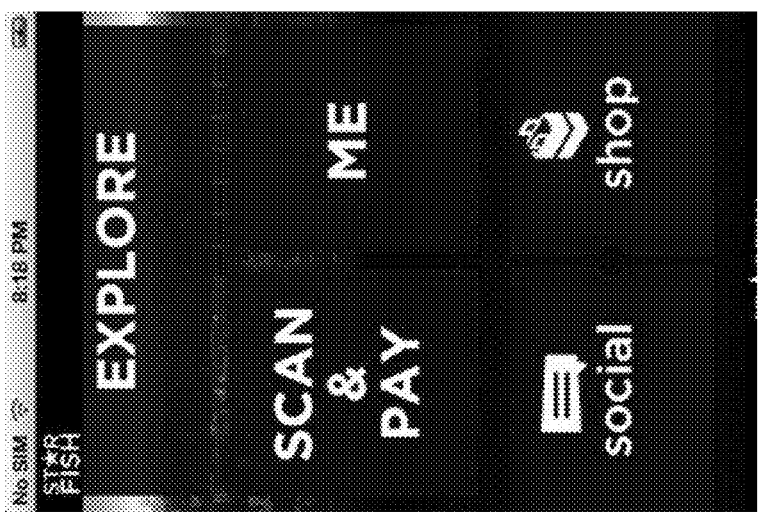
Figure 22D:
Figure 22E:
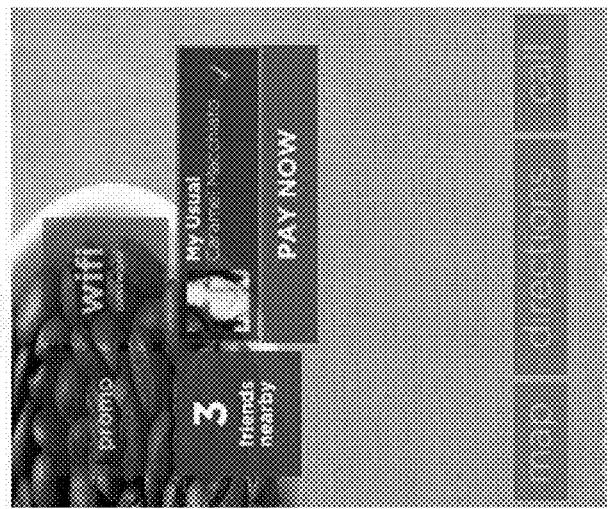

The consumer may select the bean coffee shop from the list, and the lifestyle application may display user interface 2215 of FIG. 22D to the consumer. User interface 2215 may include a quick order button to order coffee from the bean, a map button to provide a map of the area around the bean, a directions button to provide directions to the bean, a call button to call the bean, etc. If the consumer selects the quick order button, the lifestyle application may cause user device 210 to place an order for coffee from the bean and may display user interface 2220 of FIG. 22E to the consumer. User interface 2220 may provide information associated with coffee that the consumer typically orders (e.g., caramel macchiato) and a pay now button that enables the consumer to pay for the coffee.

Figure 22F:
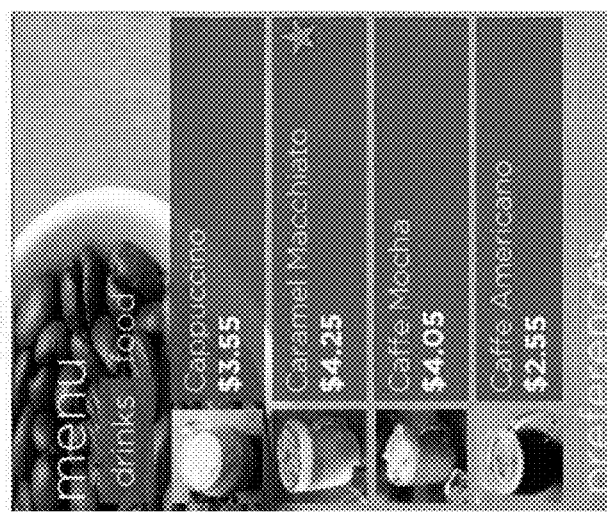
Figures 22G, 22H, 22I:
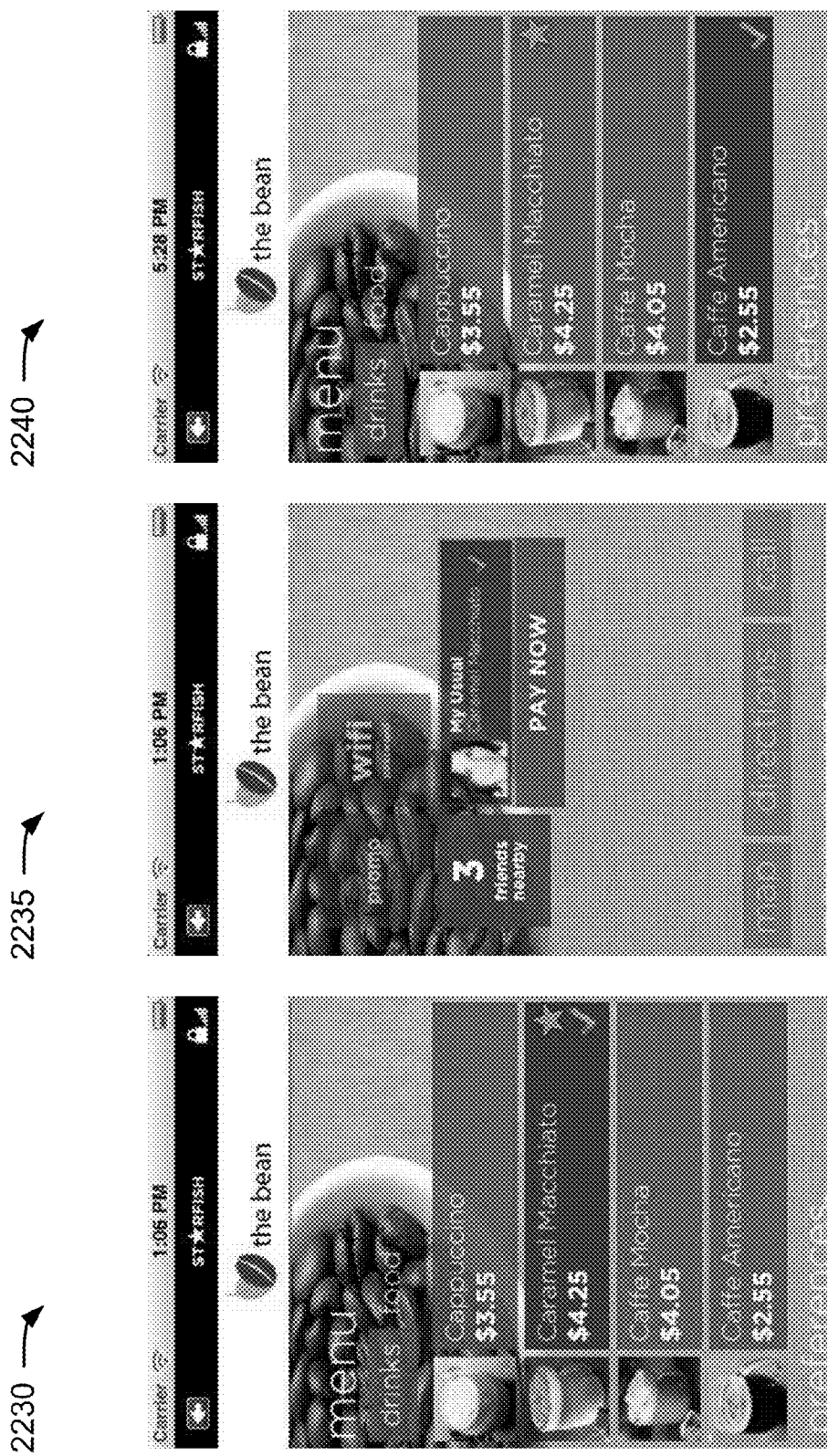
Figures 22J, 22K, 22L:
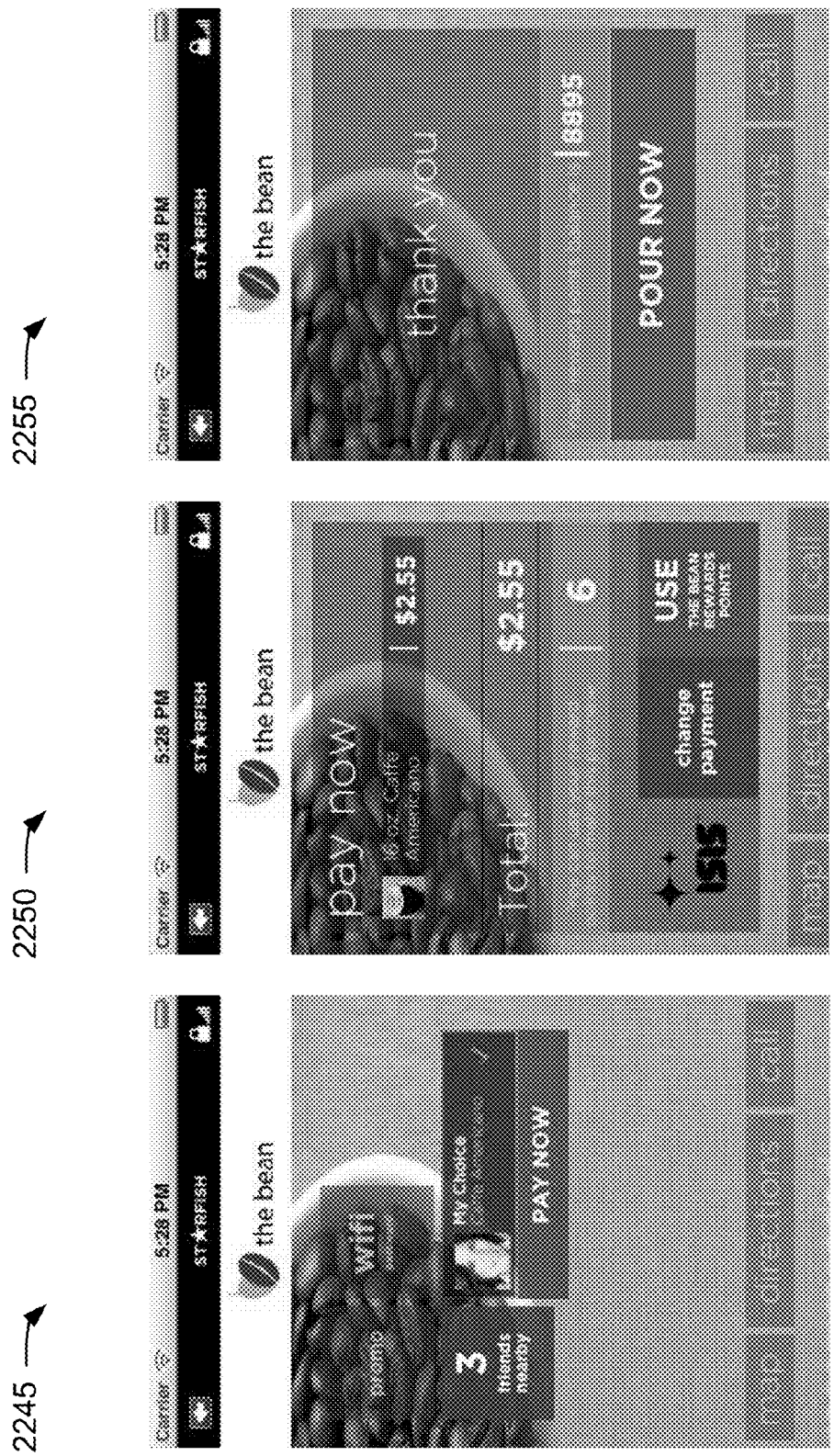

Alternatively, if the consumer selects the quick order button, the lifestyle application may display user interface 2225 of FIG. 22F to the consumer. User interface 2225 may provide a list of coffees available to the consumer, as well the typically-ordered coffee. If the consumer selects the typically-ordered coffee (e.g., the caramel macchiato), as shown in user interface 2230 of FIG. 22G, the lifestyle application may display user interface 2235 of FIG. 22H to the consumer. User interface 2235 may provide information associated with the ordered coffee and a pay now button that enables the consumer to pay for the coffee. Alternatively, if the consumer selects another coffee (e.g., caffe americano), as shown in user interface 2240 of FIG. 22I, the lifestyle application may display user interface 2245 of FIG. 22J to the consumer. User interface 2245 may provide information associated with the ordered coffee and a pay now button that enables the consumer to pay for the coffee. If the consumer selects the pay now button, the lifestyle application may cause a payment (e.g., of $2.55) to be provided to the bean, and may display user interface 2250 of FIG. 22K to the consumer. User interface 2250 may provide a cost of the coffee, an option to use reward points to pay for the coffee, etc. If the consumer elects to use the reward points to pay for the coffee, the lifestyle application may pay for the coffee with the rewards points and may display user interface 2255 of FIG. 22L to the consumer. User interface 2255 may include information confirming payment with the rewards points, a balance of the consumer's reward points, an option to pour the coffee now, etc.

Figures 23D, 23E, 23F:
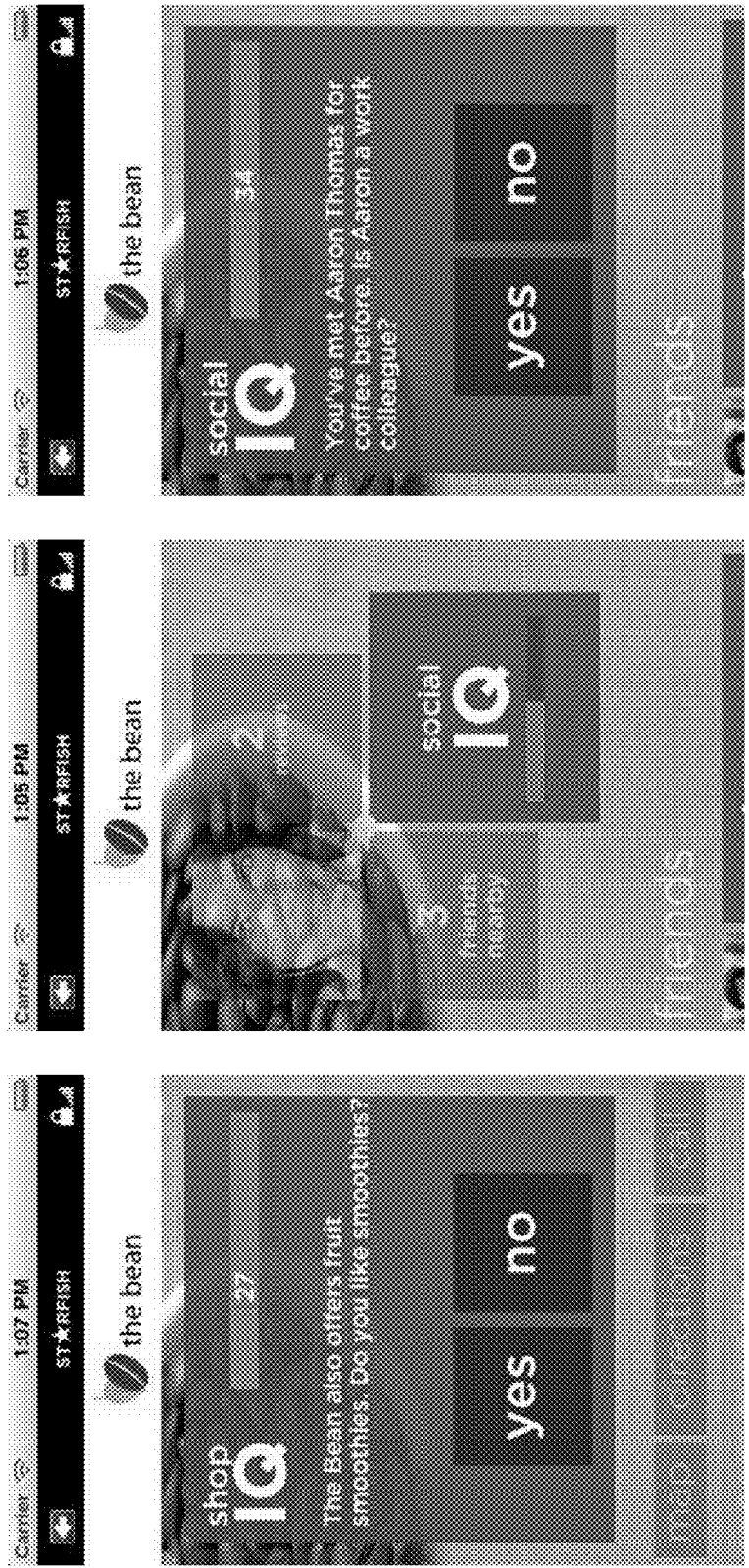

Alternatively, or additionally, user interfaces 2300-2370 of FIGS. 23A-220 may depict information associated with the purchase of coffee from a coffee shop (e.g., the bean). User interface 2300 of FIG. 23A may display the main screen (e.g., described above in FIG. 14A) to the consumer. The consumer may select the bean coffee shop from the favorites section of the main screen, and the lifestyle application may display user interface 2305 of FIG. 23B to the consumer. User interface 2305 may include a promo button to show promotions available from the bean, a map button to provide a map of the area around the bean, a directions button to provide directions to the bean, a call button to call the bean, etc. The consumer may access the shop screen from user interface 2305, and the lifestyle application may display user interface 2310 of FIG. 23C and/or user interface 2315 of FIG. 23D to the consumer. User interfaces 2310 and 2315 may include the features described above in connection with user interfaces 1510 (FIG. 15B) and 1520 (FIG. 15C), respectively. User interface 2315 may also include information stating that the bean sells fruit smoothies and inquiring whether the consumer likes fruit smoothies.

The consumer may access the social screen from user interface 2305, and the lifestyle application may display user interface 2320 of FIG. 23E and/or user interface 2325 of FIG. 23F to the consumer. User interfaces 2320 and 2325 may include the features described above in connection with user interfaces 1530 (FIG. 15D) and 1540 (FIG. 15E), respectively. User interface 2325 may also include information stating the consumer met Aaron Thomas for coffee before and inquiring whether Aaron Thomas is a work colleague of the consumer. The consumer may scroll down the social screen to display user interface 2330 of FIG. 23G. User interface 2330 may provide a list of the consumer's friends that are near (e.g., within a predetermined distance) the consumer. If the consumer selects one of the friends (e.g., Aaron Thomas) from the list, the lifestyle application may display user interface 2335 of FIG. 23H to the consumer. User interface 2335 may include buttons to initiate a chat, a phone call, or a meeting with Aaron Thomas.

Figures 23G, 23H, 23I:
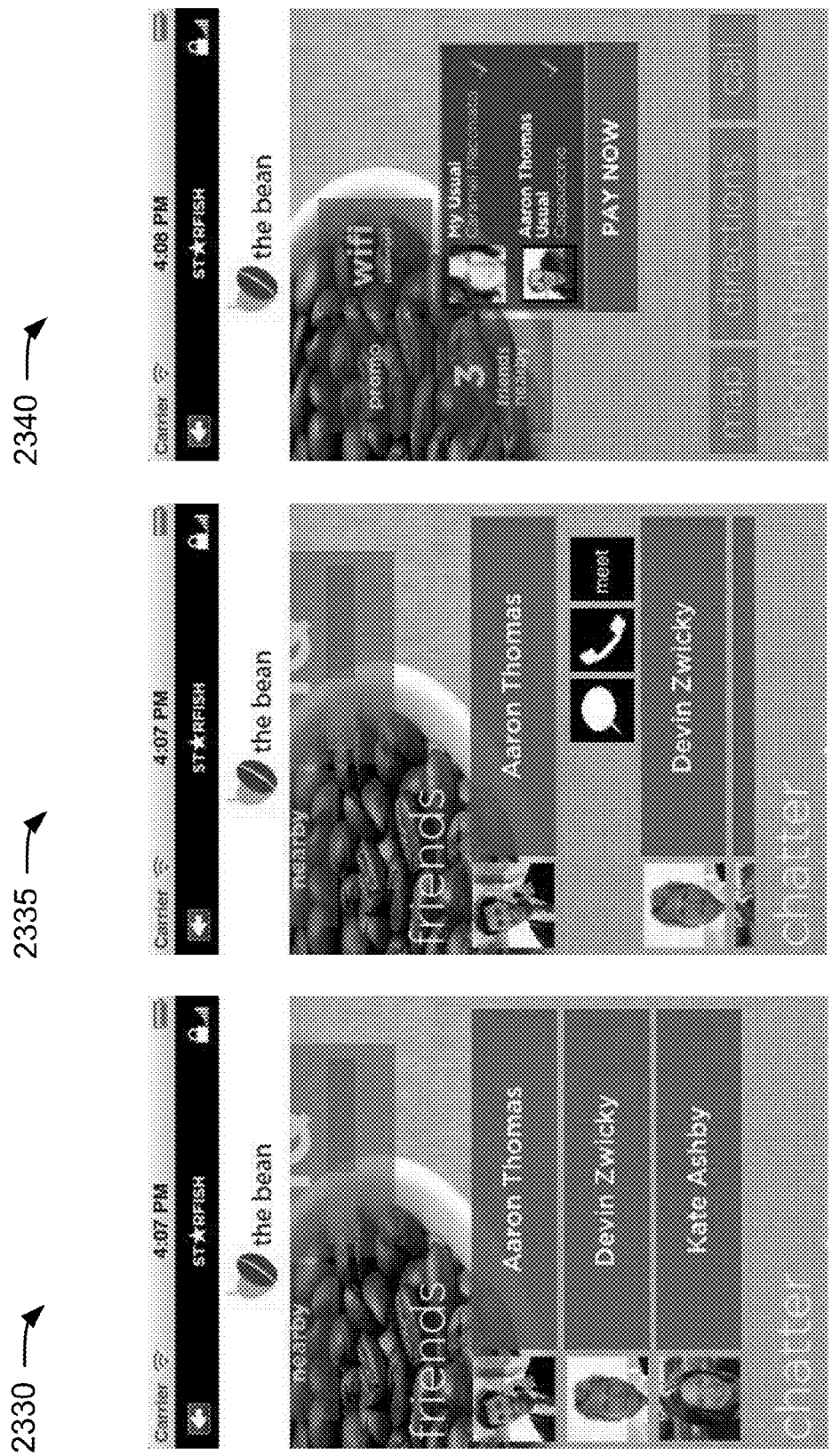

If the consumer selects the meet button, the lifestyle application may place an order for the consumer's usual coffee and Aaron Thomas' usual coffee from the bean and may display user interface 2340 of FIG. 23I to the consumer. User interface 2340 may provide information associated with the ordered coffee and a pay now button that enables the consumer to pay for both coffees. If the consumer selects the pay now button, the lifestyle application may cause a payment (e.g., of $7.80) to be provided to the bean, and may display user interface 2345 of FIG. 23J to the consumer. User interface 2345 may provide a cost of the coffee, an option to use reward points to pay for the coffee, etc. If the consumer elects to use the reward points to pay for the coffee, the lifestyle application may pay for the coffee with the rewards points and may display user interface 2350 of FIG. 23K to the consumer. User interface 2350 may include information confirming payment with the rewards points, a balance of the consumer's reward points, an option to pour the coffee now, etc. If the consumer selects a pour now button, the lifestyle application may provide user interface 2355 of FIG. 23L for display to the consumer. User interface 2355 may include an option (e.g., a my order button) to view a receipt for the ordered coffee.

If the consumer selects the my order button, the lifestyle application may provide user interface 2360 of FIG. 23M for display to the consumer. User interface 2360 may provide a summary of the order (e.g., a caramel macchiato and a cappuccino), a QR code for the receipt, etc. The consumer may navigate to the me screen shown in user interface 2365 of FIG. 23N. User interface 2365 may include the features described above in connection with user interface 1800 (FIG. 18A). User interface 2365 may display the coffee purchase from the bean in the what's new section. If the consumer selects the coffee purchase, the lifestyle application may provide user interface 2370 of FIG. 23O for display to the consumer. User interface 2370 may include a receipt for the purchased coffee, including when the coffee was purchased, a cost of the coffee, a location of the bean, etc.

Figure 24C:
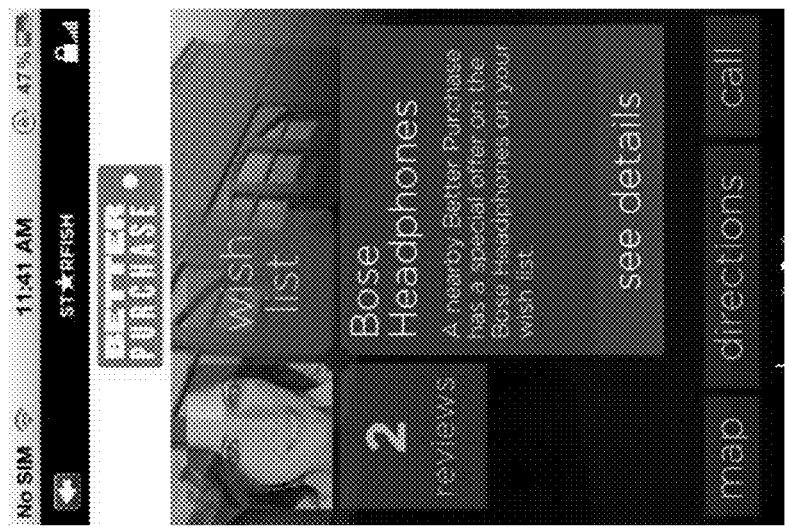
Figure 24B:
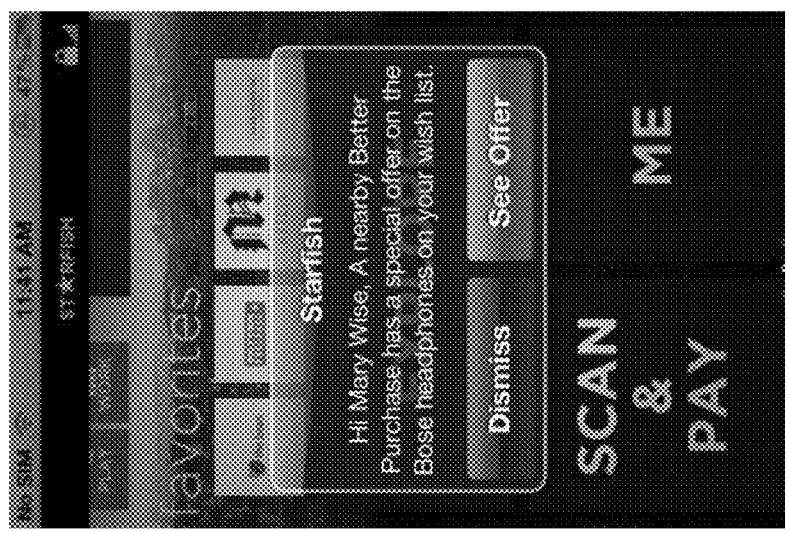
Figure 24A:
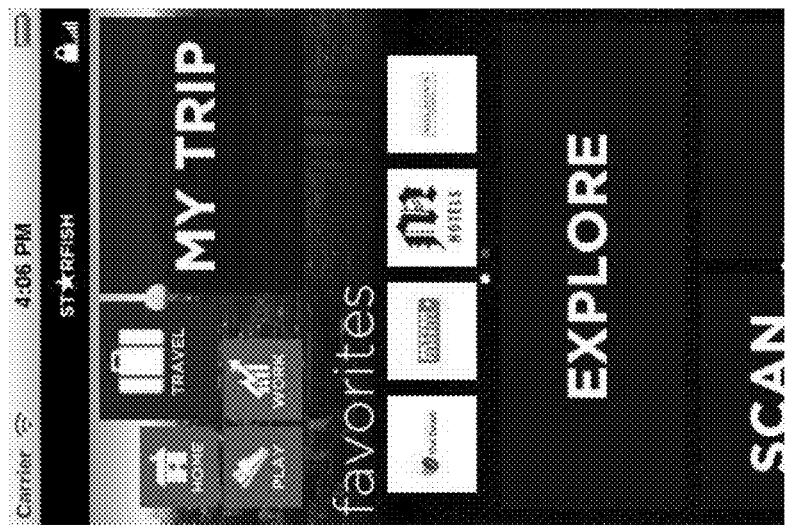
Figures 24D, 24E:
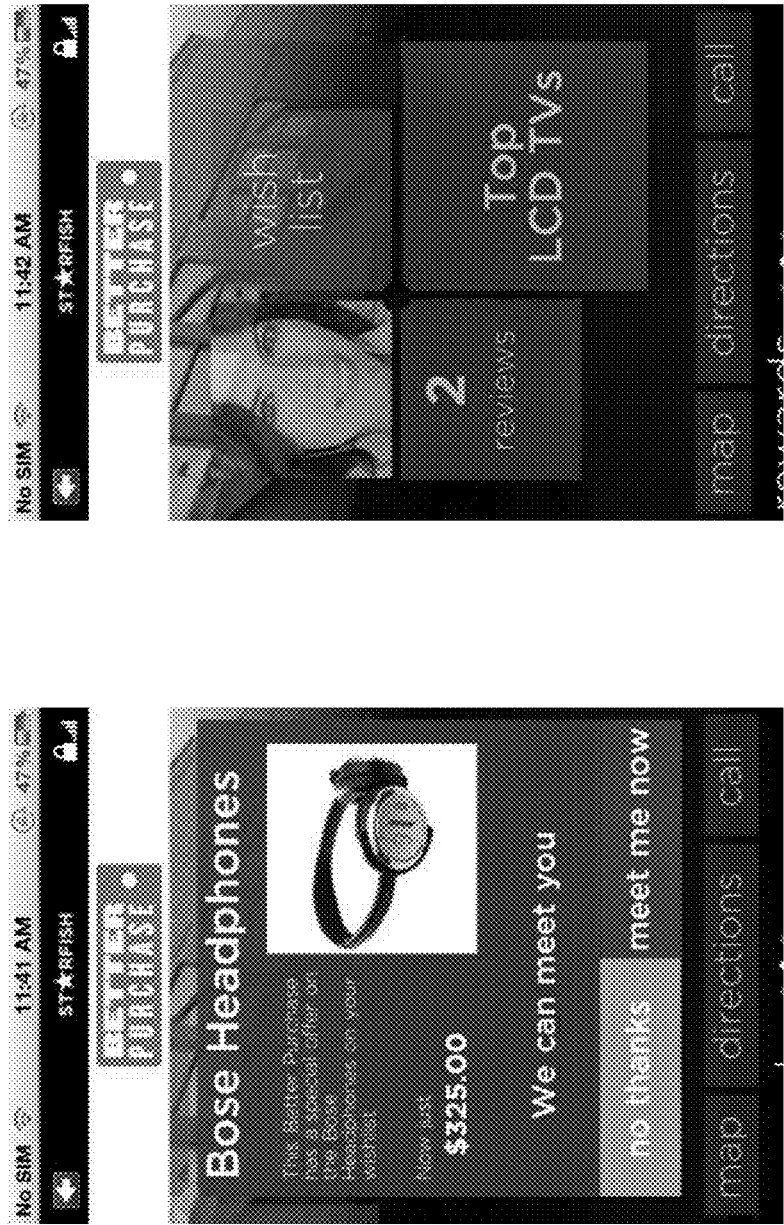
Figure 24F:
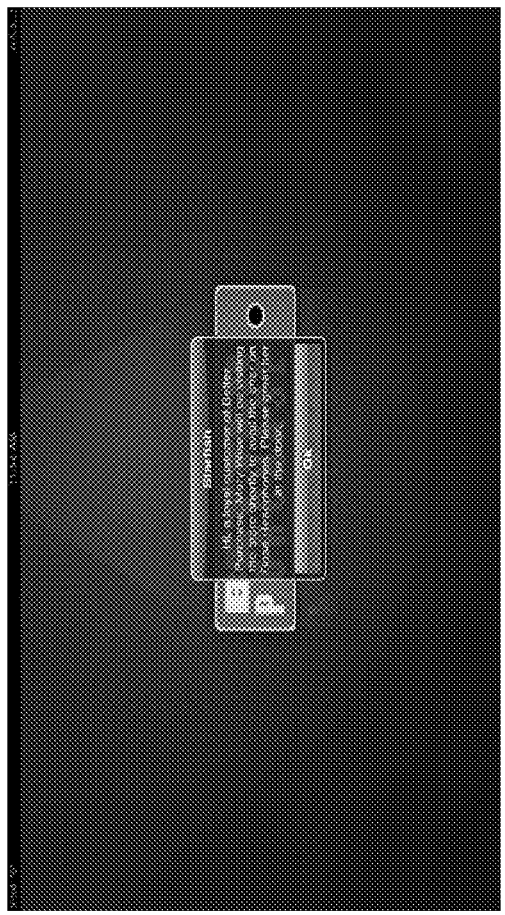
Figure 24G:
Figure 24P:
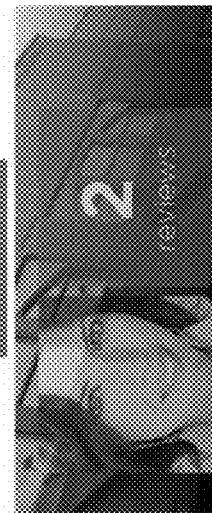
Figure 24O:
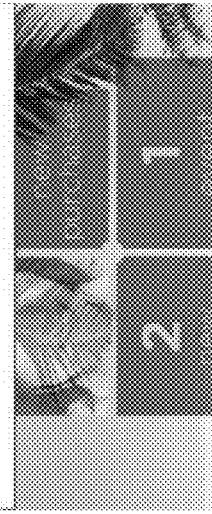
Figure 24N:
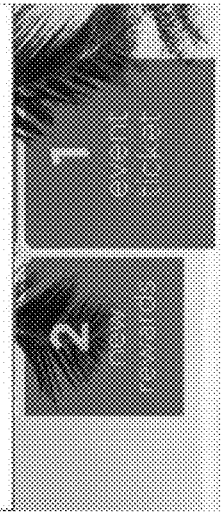
Figures 24Q, 24R, 24S:
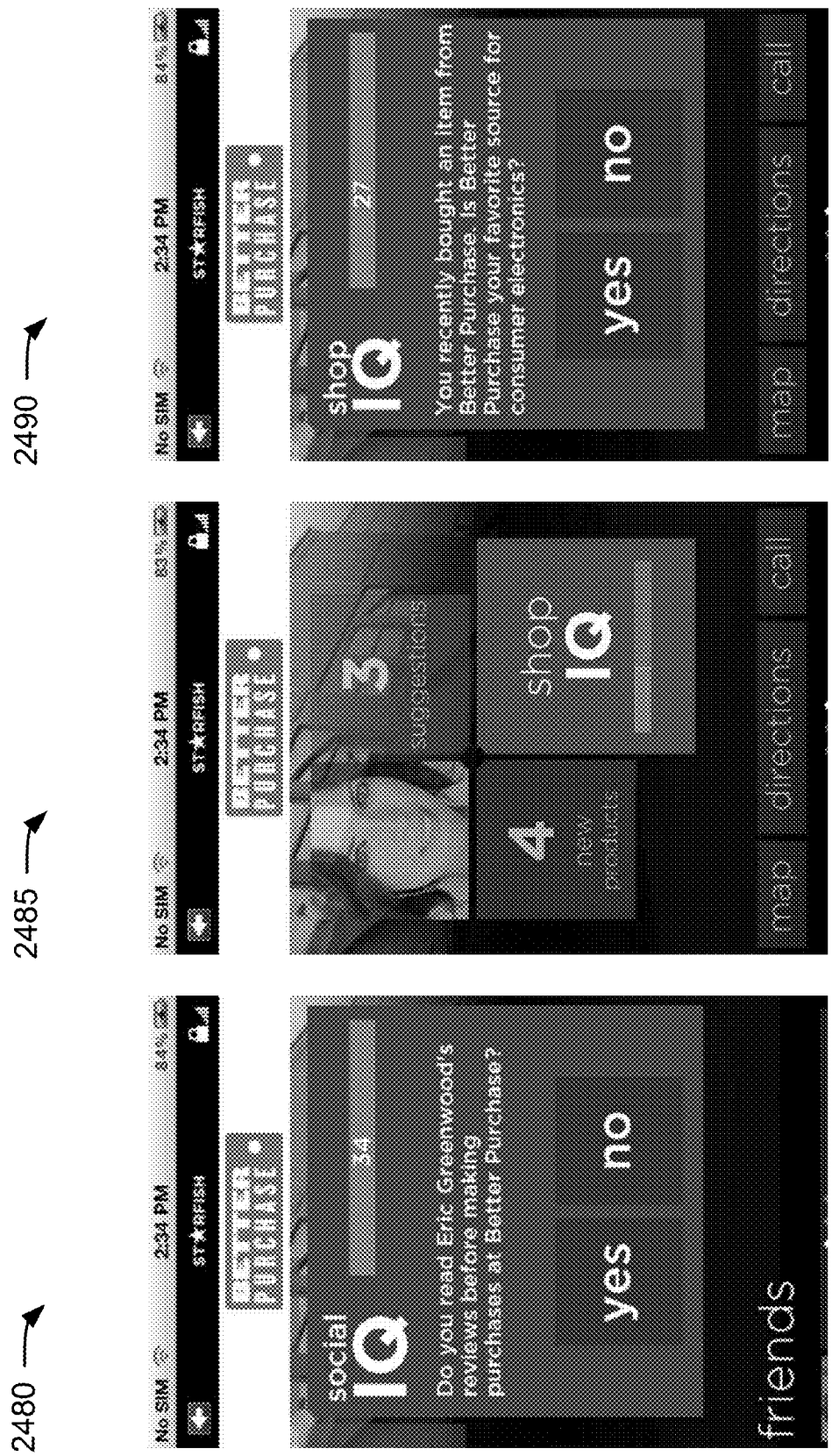

In one example, user interfaces 2400-2490 of FIGS. 24A-24S may depict information associated with a purchase from an electronics store (e.g., the Better Purchase). User interface 2400 of FIG. 24A may display the main screen (e.g., described above in FIG. 14A) to the consumer. The consumer may select the Better Purchase store from the favorites section of the main screen, and the lifestyle application may display user interface 2405 of FIG. 24B to the consumer. User interface 2405 may display a notification about a special offer on headphones (e.g., on the consumer's wish list) available at the Better Purchase store. If the consumer selects a see offer button of user interface 2405, the lifestyle application may provide user interface 2410 of FIG. 24C for display to the consumer. User interface 2410 may provide a description of the special offer and an option to see details about the special offer for the headphones.

If the consumer selects the see details option, the lifestyle application may provide user interface 2415 of FIG. 24D for display to the consumer. User interface 2415 may provide a picture of the headphones, a price of the headphones, an option to meet a salesperson at the nearest Better Purchase store, etc. If the consumer selects the option to meet the salesperson, the lifestyle application may send an alert to the salesperson at the Better Purchase and may provide user interface 2420 of FIG. 24E for display to the consumer. User interface 2420 may provide promotional information for other related offers provided by the Better Purchase.

The salesperson (e.g., via a user device 210) at the Better Purchase may receive an alert as shown in user interface 2425 of FIG. 24F. The alert may indicate that the consumer will be visiting the store shortly about the offer on the headphones. The salesperson may select an OK button to view details associated with the customer coming to visit the store, as shown in user interface 2430 of FIG. 24G. The customer details may include a picture of the customer, rewards points earned by the customer, recent purchases by the customer, details about the headphones the customer wants to purchase, etc. The salesperson may greet the consumer at the door of the Better Purchase, and may immediately direct the consumer to the headphones.

Once the consumer has the headphones, the consumer may initiate payment for the headphones by accessing the main screen as shown in user interface 2435 of FIG. 24H and selecting the Better Purchase button from the favorites section. When the user selects the Better Purchase button, the lifestyle application may provide user interface 2440 of FIG. 24I for display to the consumer. User interface 2440 may ask whether the consumer wishes to pay for the headphones. If the consumer selects a "Pay Now" button on user interface 2440, the lifestyle application may provide user interface 2445 of FIG. 24J for display to the consumer. User interface 2445 may provide a description of the headphones, a purchase price, a pay now button, etc. If the consumer selects a pay now button on user interface 2445, the lifestyle application may provide user interface 2450 of FIG. 24K for display to the consumer. User interface 2450 may request that the consumer provide a PIN (e.g., since the purchase is over $200) to complete the transaction. If the consumer provides the correct PIN, the lifestyle application may provide payment to the Better Purchase and may provide user interface 2455 of FIG. 24L for display to the consumer. User interface 2455 may provide an indication that the payment for the headphones is complete, a number of reward points received for the purchase, etc.

The consumer may access the shop screen from user interface 2455, and the lifestyle application may display user interface 2460 of FIG. 24M to the consumer. User interface 2460 may include the features described above in connection with user interface 1510 (FIG. 15B). The consumer may navigate to the me screen shown in user interface 2465 of FIG. 24N. User interface 2465 may include the features described above in connection with user interface 1800 (FIG. 18A). User interface 2465 may display the headphones purchased from the Better Purchase in the what's new section. If the consumer selects the headphones purchase, the lifestyle application may provide user interface 2470 of FIG. 24O for display to the consumer. User interface 2470 may include a receipt for the purchased headphones, including when the headphones were purchased, a cost of the headphones, etc.

The consumer may access the social screen from user interface 2470, and the lifestyle application may display user interface 2475 of FIG. 24P and/or user interface 2480 of FIG. 24Q to the consumer. User interfaces 2475 and 2480 may include the features described above in connection with user interfaces 1530 (FIG. 15D) and 1540 (FIG. 15E), respectively. User interface 2480 may also include information inquiring whether the consumer read Eric Greenwood's reviews before making purchases at the Better Purchase.

The consumer may access the shop screen from user interface 2470, and the lifestyle application may display user interface 2485 of FIG. 24R and/or user interface 2490 of FIG. 24S to the consumer. User interfaces 2485 and 2490 may include the features described above in connection with user interfaces 1510 (FIG. 15B) and 1520 (FIG. 15C), respectively. User interface 2490 may also include information stating that the consumer recently bought an item from the Better Purchase and inquiring whether the Better Purchase is the consumer's favorite source for consumer electronics.

Figures 25A, 25B:
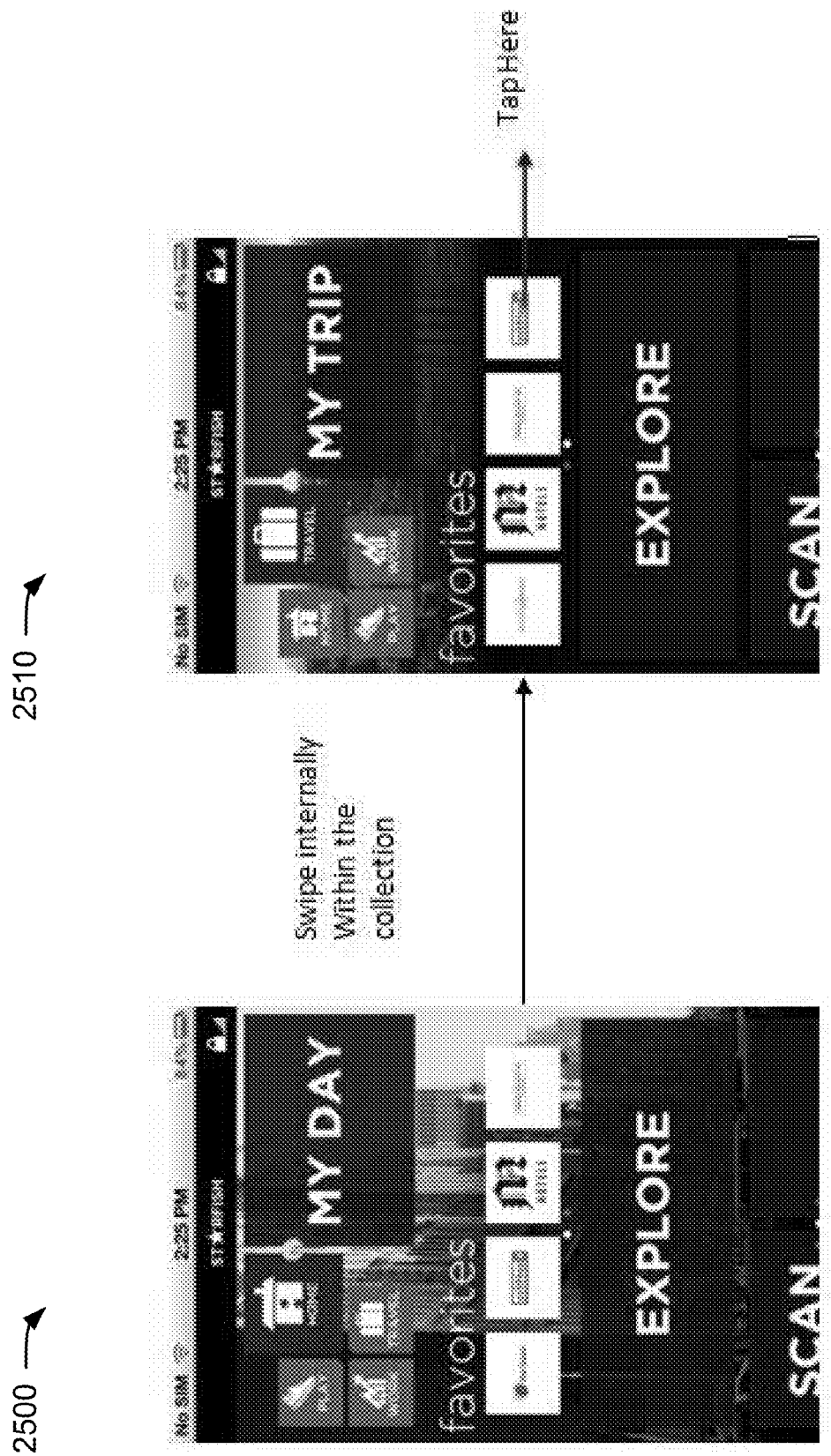
Figure 25C:
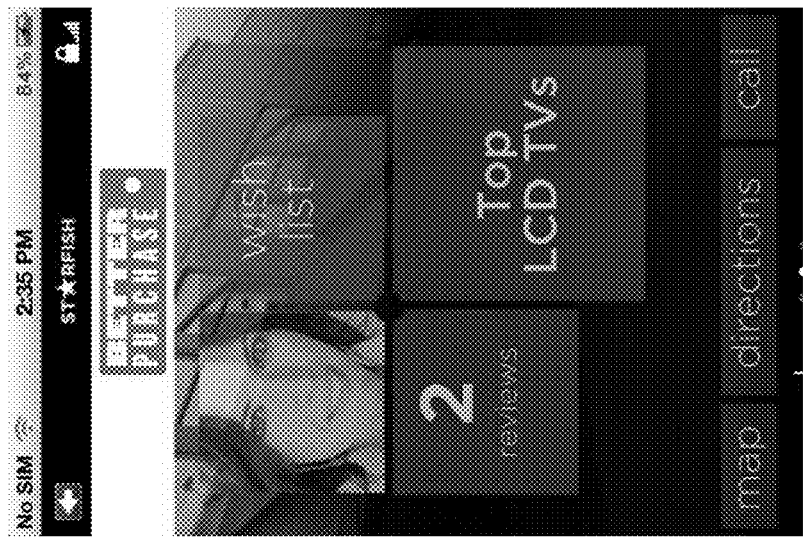

Alternatively, or additionally, the consumer may access the main screen (e.g., described above in FIG. 14A), as shown in user interface 2500 of FIG. 25A. The consumer may select the Better Purchase store from the favorites section of the main screen, as indicated in user interface 2510 of FIG. 25B, and the lifestyle application may display user interface 2520 of FIG. 25C to the consumer. User interface 2520 may display the Better Purchase main screen and may include a wish list button, a review button, a top items button, etc.

Figure 26A:
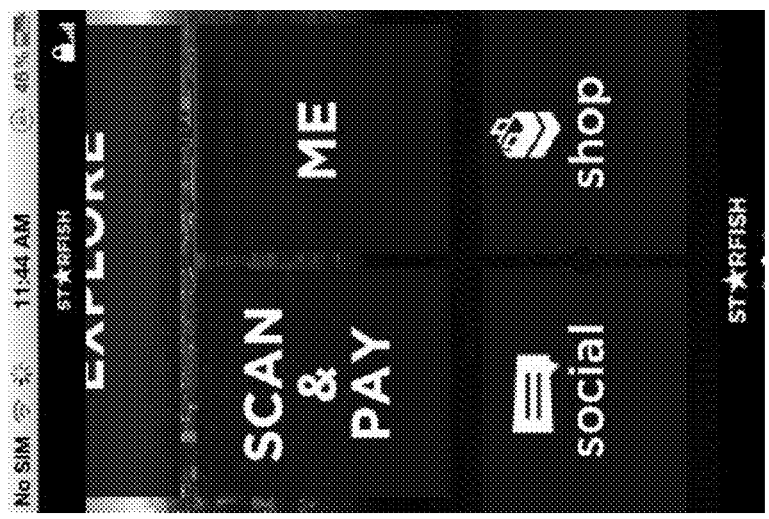
Figure 26B:
Figure 26C:
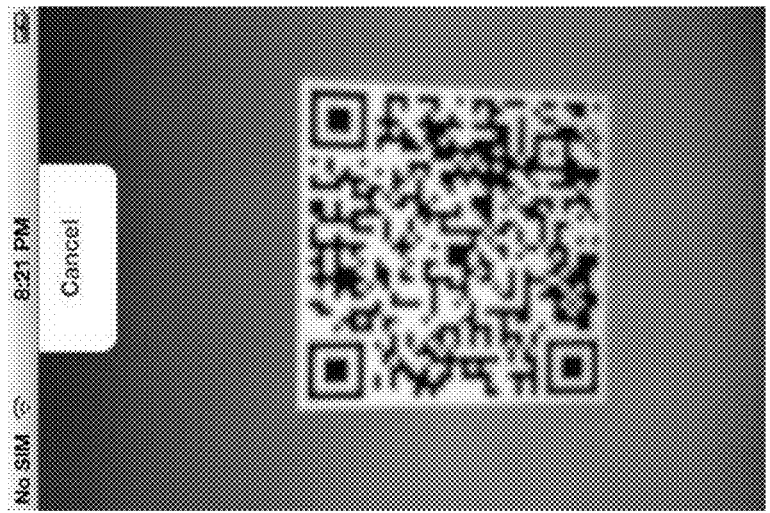
Figures 26D, 26E, 26F:
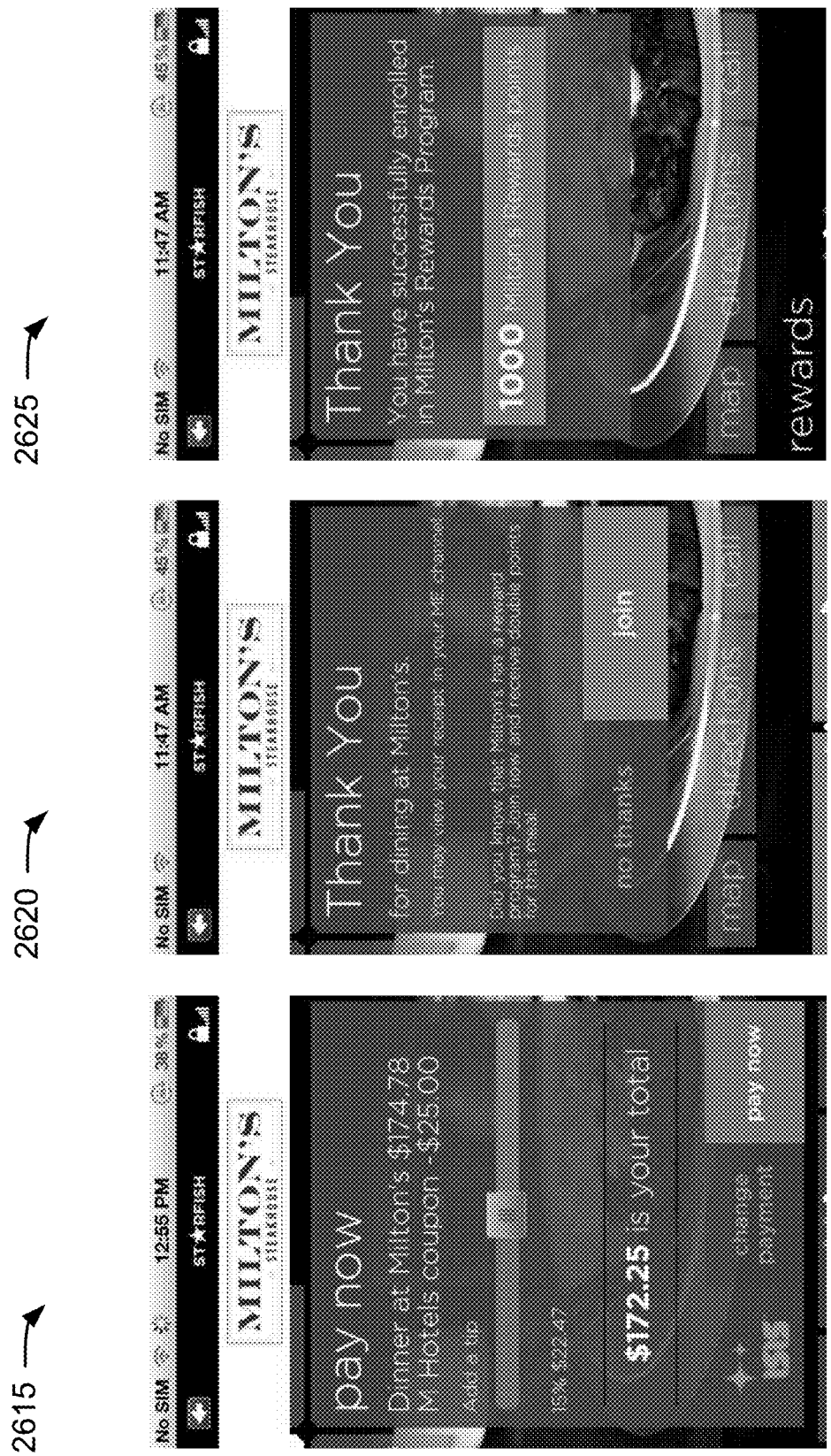
Figure 26N:
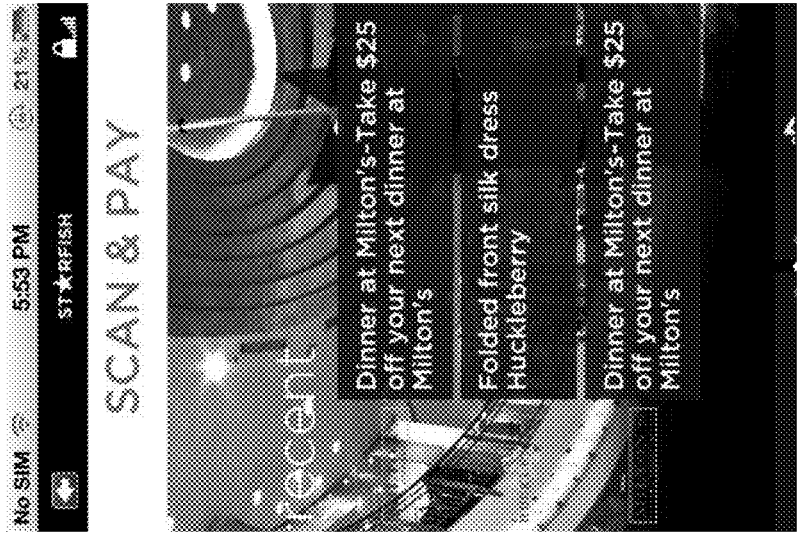
Figure 26M:
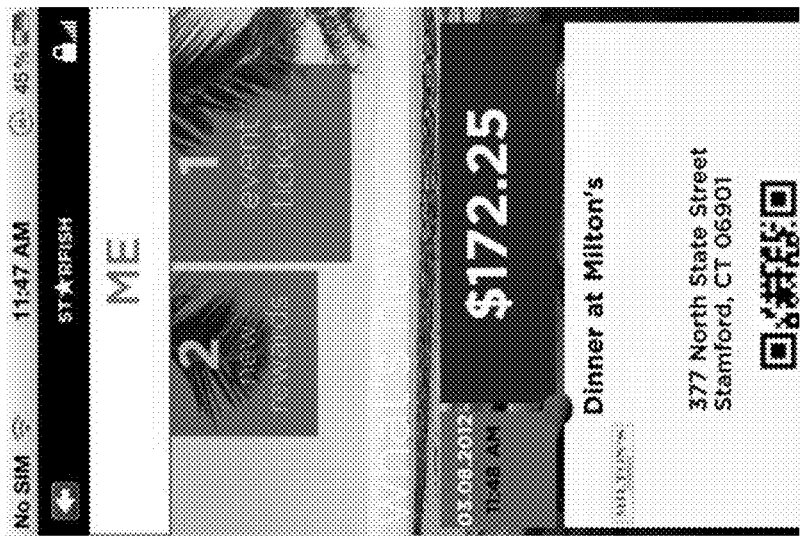

In one example, user interfaces 2600-2665 of FIGS. 26A-26N may depict information associated with a purchase of dinner from Milton's restaurant. User interface 2600 of FIG. 26A may display the main screen (e.g., described above in FIG. 14A) to the consumer. The consumer may select the scan and pay button, and the lifestyle application may display user interface 2605 of FIG. 26B to the consumer. User interface 2605 may include the features described above in connection with user interface 1700 (FIG. 17A). The consumer may select the scan an item button from user interface 2605, and may scan (e.g., via user device 210) a QR code (or a barcode) provided on the receipt from Milton's restaurant, as indicated in user interface 2610 of FIG. 26C.

Once the receipt is scanned, the consumer may use a mechanism (e.g., a slider bar) to add a tip to the dinner purchase, as indicated in user interface 2615 of FIG. 26D. After adding the tip, the consumer may select a pay now button from user interface 2615, and the lifestyle application may submit a payment for the dinner to Milton's restaurant. The lifestyle application may provide user interface 2620 of FIG. 26E for display to the consumer. User interface 2620 may include information about an option to join a loyalty program for Milton's restaurant. The consumer may or may not join the loyalty program. If the consumer elects to join the loyalty program, the lifestyle application may display user interface 2625 of FIG. 26F to the consumer. User interface 2625 may indicate that the consumer has successfully joined Milton's rewards program and may provide information regarding the amount of rewards points received by the consumer.

If the consumer selects a "Thank You" button of user interface 2625, the lifestyle application may provide user interface 2630 of FIG. 26G for display to the consumer. User interface 2630 may provide information associated with other offers available from Milton's restaurant. The consumer may access the social screen from user interface 2630, and the lifestyle application may display user interface 2635 of FIG. 26H and/or user interface 2640 of FIG. 26I to the consumer. User interfaces 2635 and 2640 may include the features described above in connection with user interfaces 1530 (FIG. 15D) and 1540 (FIG. 15E), respectively. User interface 2640 may also include information inquiring whether Milton's restaurant is the consumer's favorite place for business dinners.

The consumer may access the shop screen from user interface 2630, and the lifestyle application may display user interface 2645 of FIG. 26J and/or user interface 2650 of FIG. 26K to the consumer. User interfaces 2645 and 2650 may include the features described above in connection with user interfaces 1510 (FIG. 15B) and 1520 (FIG. 15C), respectively. User interface 2650 may also include information stating that the consumer has eaten at Milton's twice in the past month and inquiring whether the Milton's is the consumer's favorite steak and seafood restaurant.

The consumer may navigate to the me screen shown in user interface 2655 of FIG. 26L. User interface 2655 may include the features described above in connection with user interface 1800 (FIG. 18A). User interface 2655 may display the dinner purchase from Milton's restaurant in the what's new section. If the consumer selects the dinner purchase, the lifestyle application may provide user interface 2660 of FIG. 26M for display to the consumer. User interface 2660 may include a receipt for the purchased dinner, including when the dinner was purchased, a cost of the dinner, a location of Milton's restaurant, etc. Alternatively, the consumer may access the receipt from the scan and pay screen, as shown in user interface 2665 of FIG. 26N.

Figure 27B:
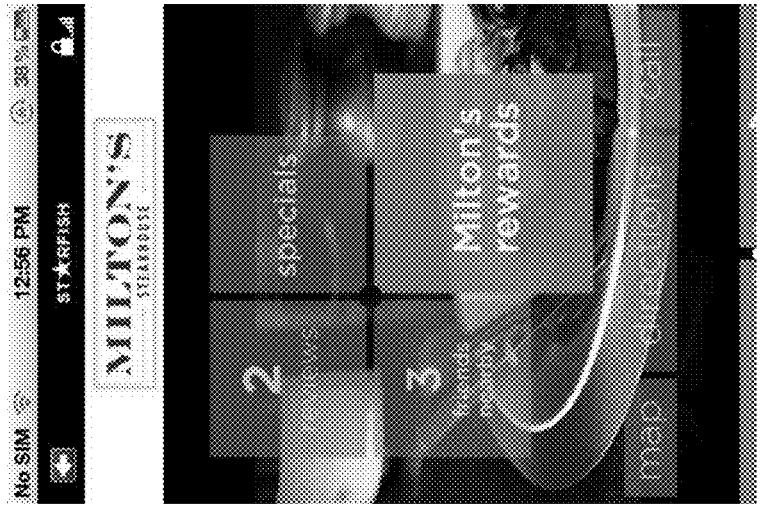
Figure 27A:
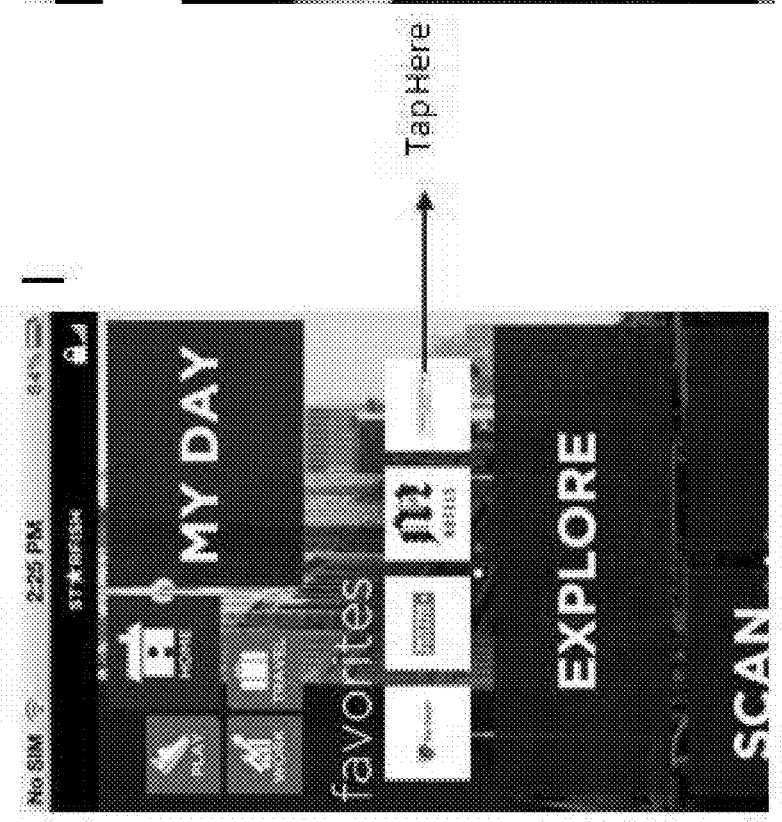

The consumer may utilize the main screen (e.g., described above in FIG. 14A), as shown in user interface 2700 of FIG. 27A, to navigate to Milton's restaurant main screen, as shown in user interface 2710 of FIG. 27B. For example, the consumer may select the Milton's button from the favorites section of the main screen to navigate to user interface 2710. User interface 2710 may include a rewards button for Milton's restaurant. If the consumer selects the reward button, the lifestyle application may provide user interface 2720 of FIG. 27C for display to the consumer. User interface 2720 may include information about an option to join a loyalty program for Milton's restaurant. The consumer may or may not join the loyalty program. If the consumer elects to join the loyalty program, the lifestyle application may display user interface 2730 of FIG. 27D to the consumer. User interface 2730 may indicate that the consumer has successfully joined Milton's rewards program and may provide information regarding the amount of rewards points received by the consumer.

Figures 27C, 27D, 27E:
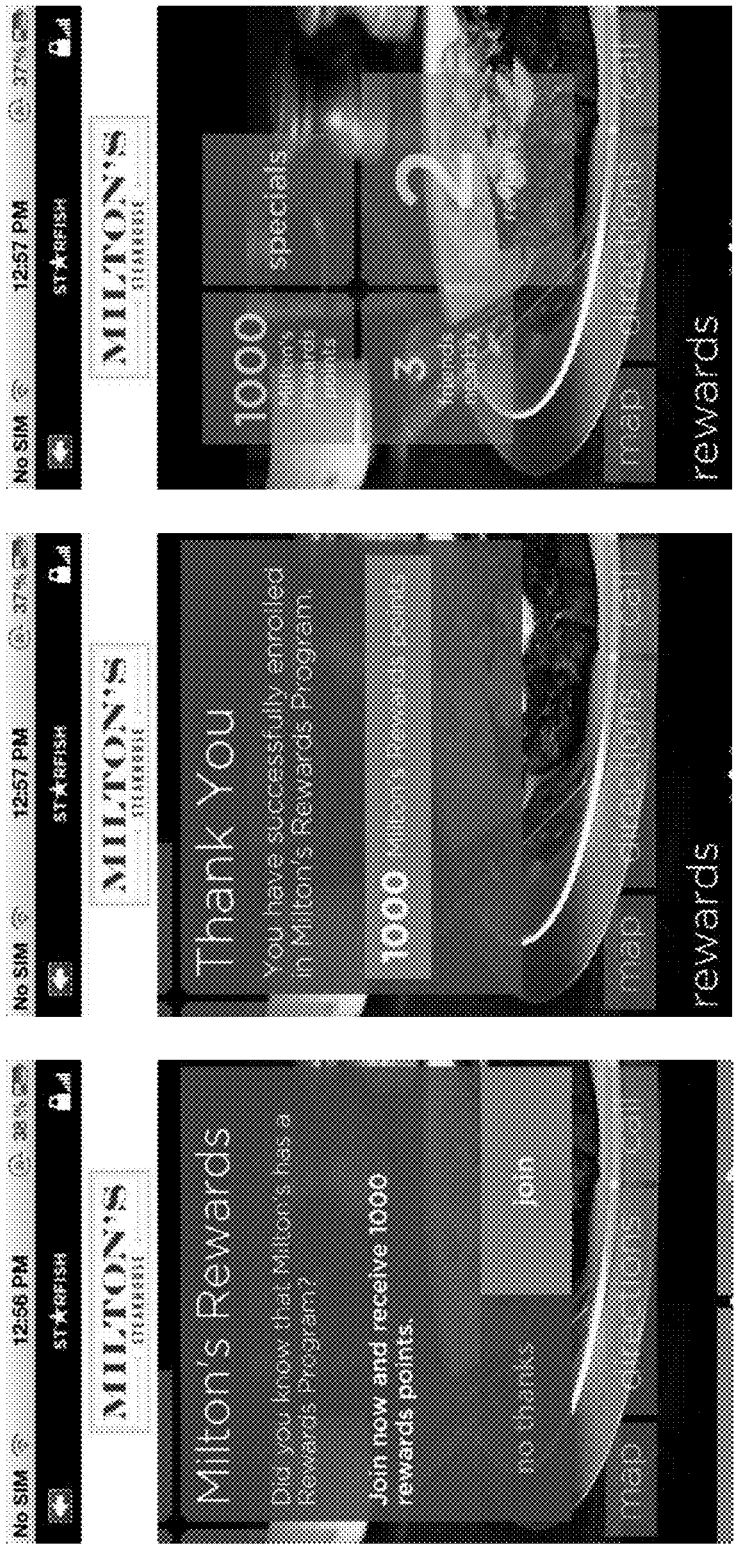

If the consumer selects a "Thank You" button of user interface 2730, the lifestyle application may provide user interface 2740 of FIG. 27E for display to the consumer. User interface 2740 may provide information associated with other offers available from Milton's restaurant. The consumer may access the shop screen from user interface 2740, and the lifestyle application may display user interface 2750 of FIG. 27F and/or user interface 2760 of FIG. 27G to the consumer. User interfaces 2750 and 2760 may include the features described above in connection with user interfaces 1510 (FIG. 15B) and 1520 (FIG. 15C), respectively. User interface 2760 may also include information stating that the consumer has eaten at Milton's twice in the past month and inquiring whether the Milton's is the consumer's favorite steak and seafood restaurant.

Figures 27F, 27G, 27H:
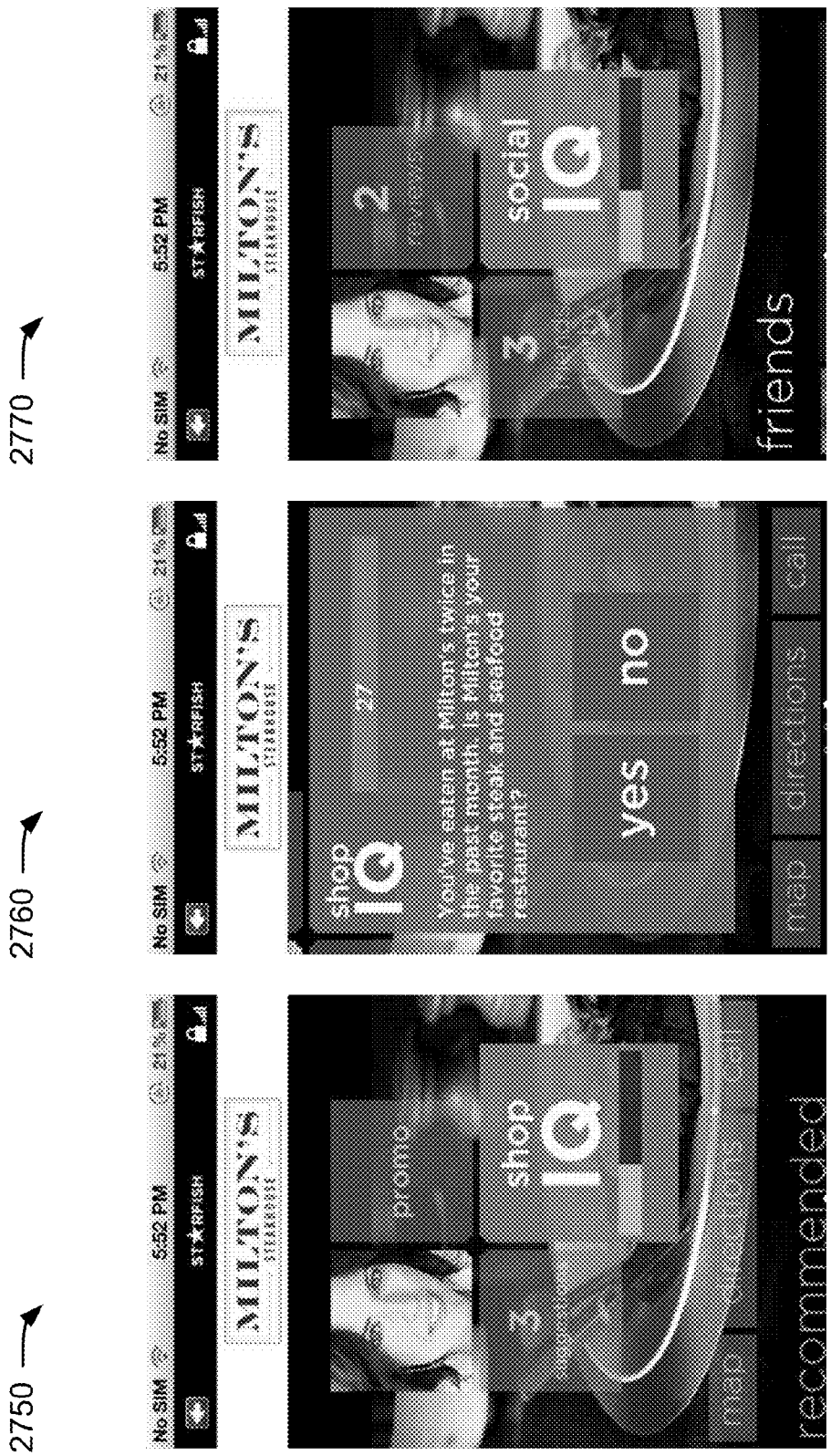
Figure 27I:
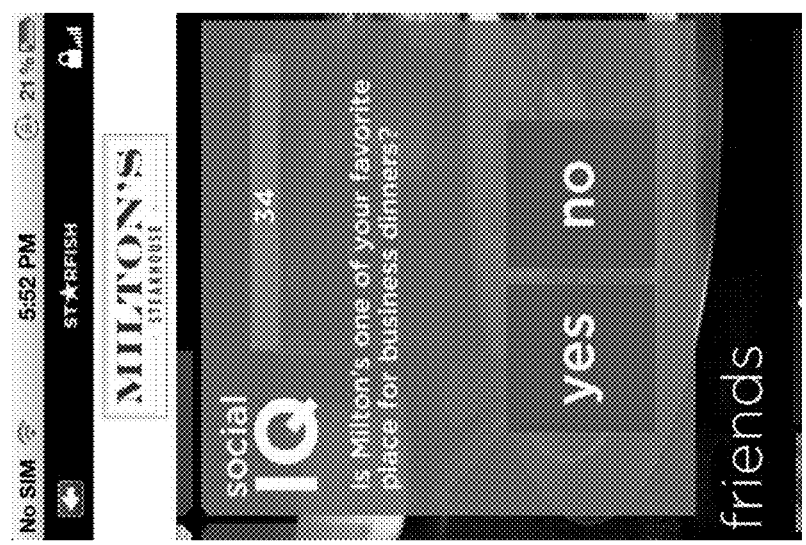

The consumer may access the social screen from user interface 2740, and the lifestyle application may display user interface 2770 of FIG. 27H and/or user interface 2780 of FIG. 27I to the consumer. User interfaces 2770 and 2780 may include the features described above in connection with user interfaces 1530 (FIG. 15D) and 1540 (FIG. 15E), respectively. User interface 2780 may also include information inquiring whether Milton's restaurant is the consumer's favorite place for business dinners.

In one example, user interfaces 2800-2850 of FIGS. 28A-28K may depict information associated with a purchase of a dress from a dress store (e.g., Huckleberry). User interface 2800 of FIG. 28A may display the main screen (e.g., described above in FIG. 14A) to the consumer. The consumer may select the scan and pay button, and the lifestyle application may display user interface 2805 of FIG. 28B to the consumer. User interface 2805 may include the features described above in connection with user interface 1700 (FIG. 17A). The consumer may select the scan an item button from user interface 2805, and may scan (e.g., via user device 210) a barcode provided on a dress for sale at Huckleberry.

Once the barcode is scanned, the lifestyle application may provide user interface 2810 of FIG. 28C for display to the consumer. User interface 2810 may include information associated with the dress, including a description, a price, a buy now button, etc. If the consumer selects the buy now button, the lifestyle application may provide user interface 2815 of FIG. 28D for display to the consumer. User interface 2815 may request for whom the dress is being purchased, and may provide a list of the consumer's favorite contacts. The consumer may select one of the contacts (or may enter information for another contact), and the lifestyle application may provide user interface 2820 of FIG. 28E for display to the consumer. User interface 2820 may provide information associated with the dress, the selected contact, a shipping address, etc. and may add a shipping cost to the final price of the dress. If the consumer selects a pay now button of user interface 2820, the lifestyle application may provide user interface 2825 of FIG. 28F for display to the consumer. User interface 2825 may provide a receipt for the purchase of the dress and may request whether the consumer wants to notify the selected contact that a surprise is on the way.

If the consumer selects a send notification button of user interface 2825, the lifestyle application may provide a notification to a user device 210 of the selected contact, as indicated in user interface 2830 of FIG. 28G. The consumer may navigate to the me screen shown in user interface 2835 of FIG. 28H. User interface 2835 may include the features described above in connection with user interface 1800 (FIG. 18A). User interface 2835 may display the dress purchase from Huckleberry in the what's new section. If the consumer selects the dress purchase, the lifestyle application may provide user interface 2840 of FIG. 28I for display to the consumer. User interface 2840 may include a receipt for the purchased dress, including when the dress was purchased, a cost of the dress, a location of Huckleberry, etc. Alternatively, the consumer may access the receipt from the scan and pay screen, as shown in user interface 2845 of FIG. 28J and user interface 2850 of FIG. 28K.

Alternatively, or additionally, user interfaces 2900-2960 of FIGS. 29A-29G may depict information associated with the purchase of a dress from Huckleberry. User interface 2900 of FIG. 29A may display the main screen (e.g., described above in FIG. 14A) to the consumer. The consumer may select Huckleberry from the favorites section of the main screen, as shown in user interface 2910 of FIG. 29B, and the lifestyle application may display user interface 2920 of FIG. 29C to the consumer. User interface 2920 may include a points button to show points earned at Huckleberry, a map button to provide a map of the area around Huckleberry, a directions button to provide directions to Huckleberry, a call button to call Huckleberry, etc. The consumer may access the social screen from user interface 2920, and the lifestyle application may display user interface 2930 of FIG. 29D and/or user interface 2940 of FIG. 29E to the consumer. User interfaces 2930 and 2940 may include the features described above in connection with user interfaces 1530 (FIG. 15D) and 1540 (FIG. 15E), respectively. User interface 2940 may also include information inquiring whether the consumer read Jenny Baldwin's reviews before making purchases at Huckleberry.

Figure 29B:
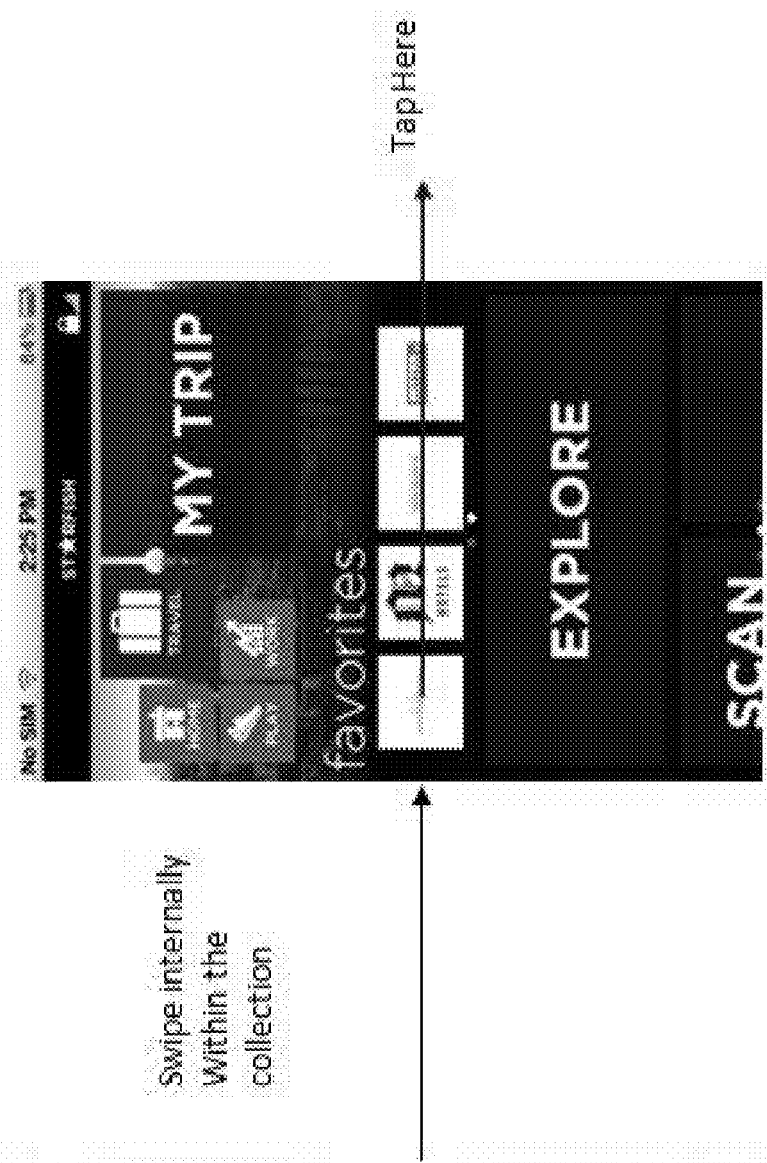
Figure 29A:
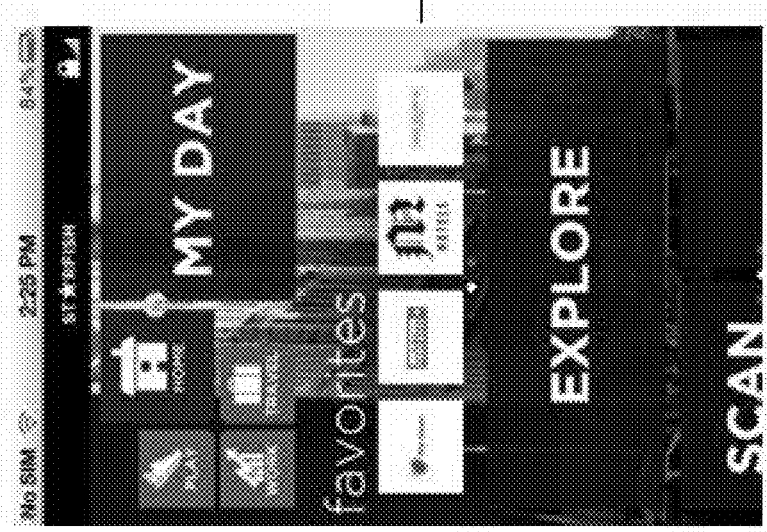
Figure 29E:
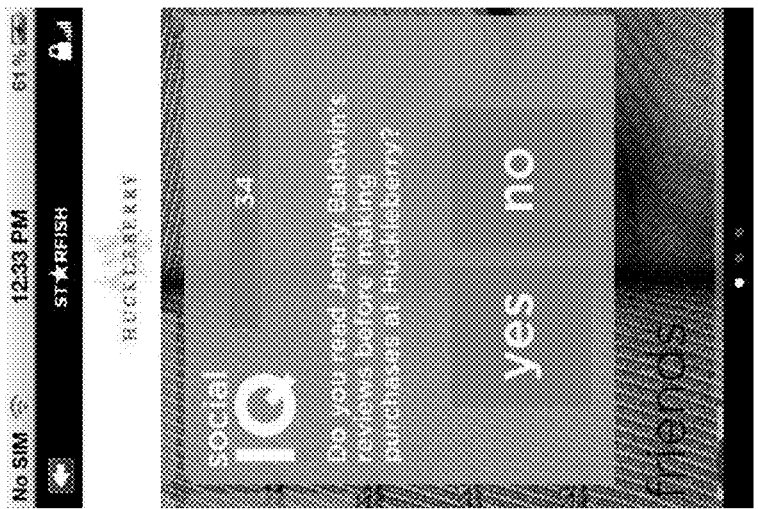
Figure 29D:
Figure 29C:
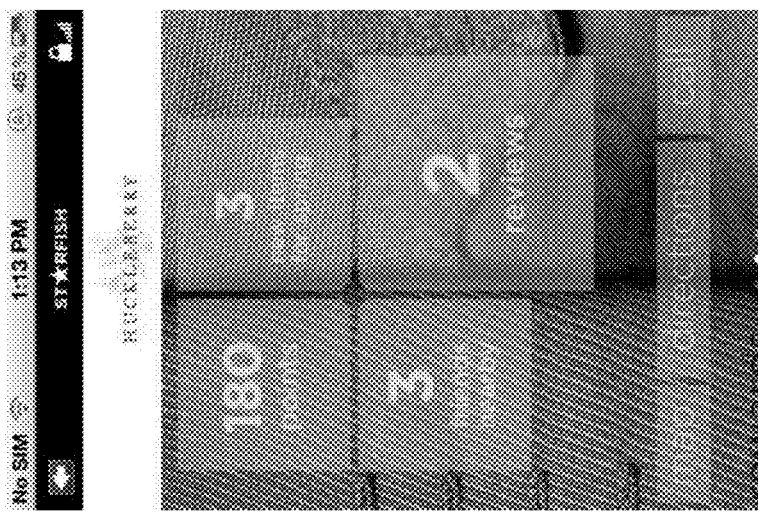
Figure 29F:
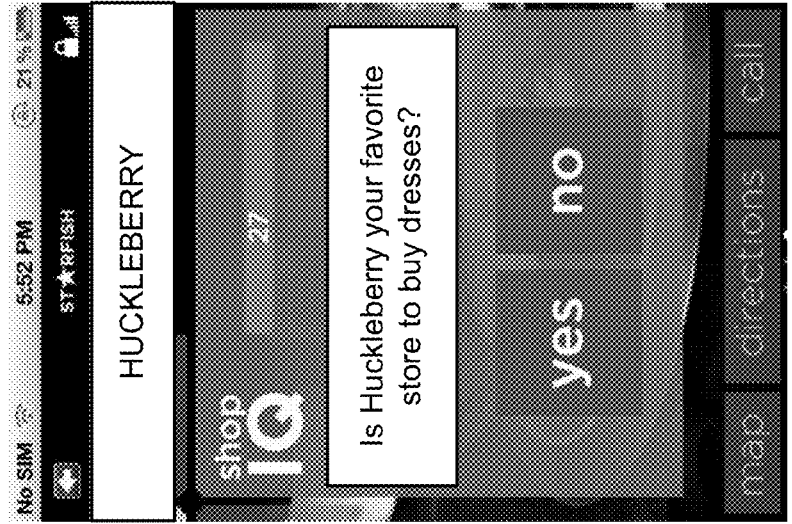
Figure 29G:
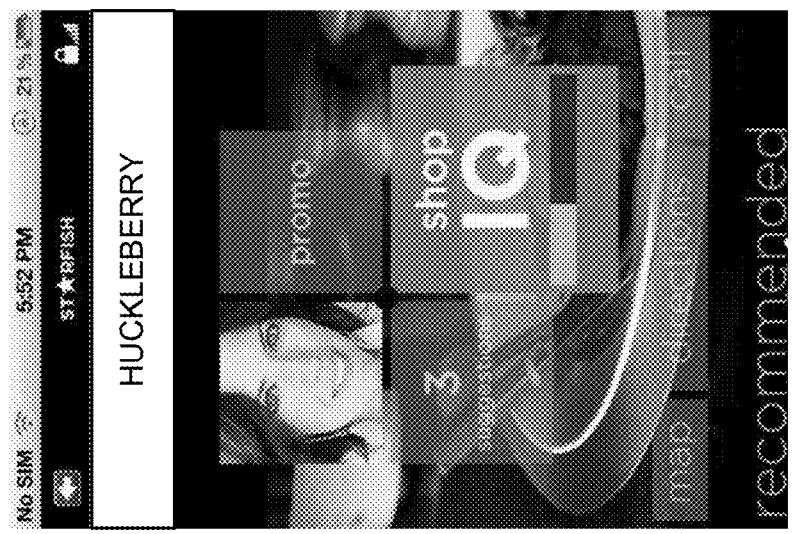

The consumer may access the shop screen from user interface 2920, and the lifestyle application may display user interface 2950 of FIG. 29F and/or user interface 2960 of FIG. 29G to the consumer. User interfaces 2950 and 2960 may include the features described above in connection with user interfaces 1510 (FIG. 15B) and 1520 (FIG. 15C), respectively. User interface 2960 may also include information inquiring whether Huckleberry is the consumer's favorite store to buy dresses.

Although user interfaces 1300-2960 depict a variety of information, in other implementations, user interfaces 1300-2960 may depict less information, different information, differently arranged information, and/or additional information than depicted in FIGS. 13A-29G.

Figure 31:
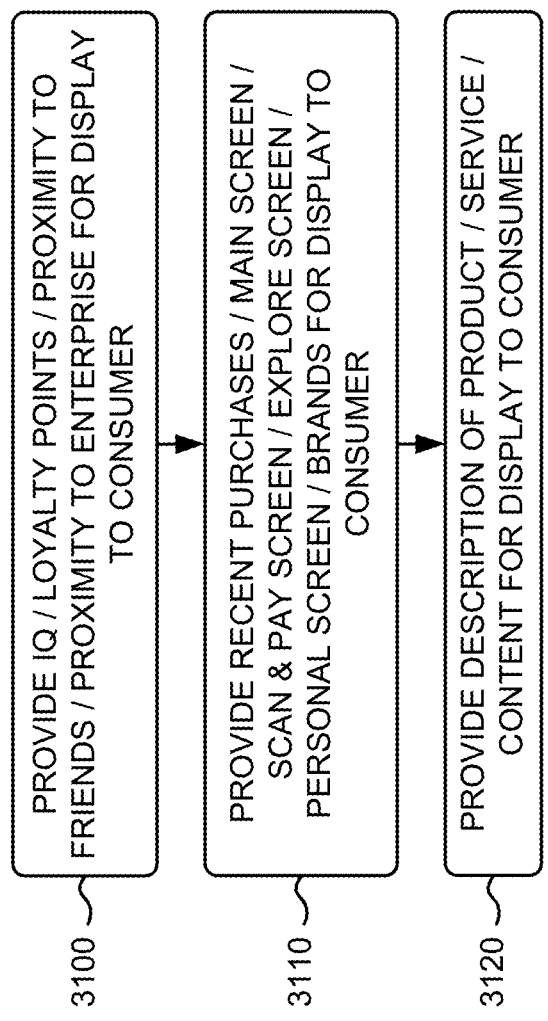
Figure 32:
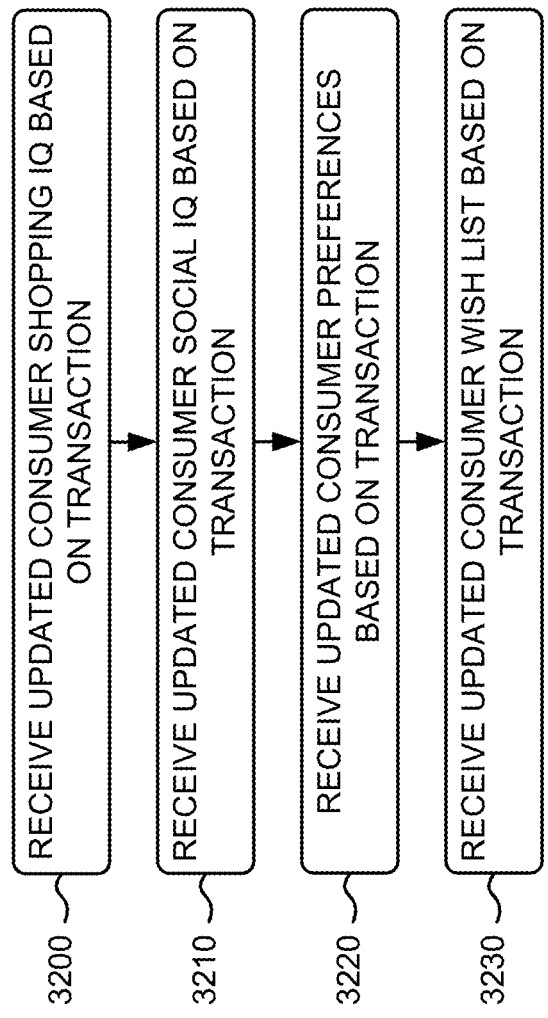

FIGS. 30-32 are flow charts of an example process 3000 for providing a lifestyle application for consumers according to an implementation described herein. In one implementation, process 3000 may be performed by user device 210. Alternatively, or additionally, some or all of process 3000 may be performed by another device or group of devices, including or excluding user device 210.

As shown in FIG. 30, process 3000 may include receiving preference, demographic, identity, relationship, and location information associated with consumer (block 3010), and providing the consumer information to lifestyle application platform device(s) (block 3020). For example, in an implementation described above in connection with FIG. 4, a consumer may provide consumer information 410 to user device 210. Consumer information 410 may include brand preferences, demographic information, identity information, relationship information, etc. associated with the consumer. User device 210 may add information to consumer information 410, such as location information and/or capability information associated with user device 210. User device 210 may provide consumer information 410 to lifestyle application platform 230.

As further shown in FIG. 30, process 3000 may include receiving a consumer profile and a single authentication ID for the consumer from the lifestyle application platform device(s) based on the consumer information (block 3030), and receiving relevant enterprise notifications, reports, and/or offers from the lifestyle application platform device(s) based on the consumer profile and/or the single authentication ID (block 3040). For example, in an implementation described above in connection with FIG. 4, lifestyle application platform 230 may receive consumer information 410, and may create a consumer profile and a single authentication ID for the consumer based on consumer information 410. The single authentication ID may include a password, a thumbprint, a voice command, a retinal scan, etc. associated with the consumer. Lifestyle application platform 230 may provide the consumer profile and the single authentication ID to user device 210, and user device 210 may receive the consumer profile and the single authentication ID. Lifestyle application platform 230 may generate enterprise information 430 (e.g., notifications, reports, offers, etc. for products, services, and/or content provided by the enterprise) relevant to the consumer. Lifestyle application platform 230 may provide the relevant enterprise information 430 to user device 210, and user device 210 may receive relevant enterprise information 430.

Returning to FIG. 30, process 3000 may include providing relevant notifications, reports, and offers for display to the consumer (block 3050), and enabling the consumer to perform a transaction with an enterprise, via the lifestyle application platform device(s), based on the notifications, reports, and offers (block 3060). For example, in an implementation described above in connection with FIGS. 1 and 4, user device 210 may display the relevant enterprise information 430 to the consumer. If the consumer selects a coffee shop (e.g., "the bean") from the favorites section displayed by the lifestyle application, the consumer may quickly and easily perform a transaction (e.g., buy coffee) with the coffee shop via the lifestyle application. The lifestyle application (e.g., via the user device) may provide a transaction request (e.g., to buy coffee) to the lifestyle application platform, and the lifestyle application platform may provide the transaction request to the enterprise device.

As further shown in FIG. 30, process 3000 may include receiving an updated consumer profile and an enterprise product, service, and/or content based on the transaction (block 3070). For example, in an implementation described above in connection with FIG. 1, the enterprise device may perform the transaction (e.g., may sell a cup of coffee to the consumer) based on the transaction request, and may provide an indication of the transaction performance to the lifestyle application platform. The lifestyle application platform may update the consumer profile based on the transaction (e.g., may increase a preference level for the coffee shop), and may provide the indication and/or the updated consumer profile to the user device. The lifestyle application may display the indication and/or the updated consumer profile to the consumer.

Process block 3050 may include the process blocks depicted in FIG. 31. As shown in FIG. 31, process block 3050 may include providing IQ, loyalty points, proximity to friends, and/or proximity to the enterprise for display to the consumer (block 3100), providing recent purchases, a main screen, a scan and pay screen, an explore screen, a personal screen, and brands for display to the consumer (block 3110), and/or providing a description of the product, service, and/or content for display to the consumer (block 3120). For example, in an implementation described above in connection with FIGS. 14A, 14B, 16A, 17B, and 22F, the lifestyle application may include a main screen (or channel), a social screen, and a shop screen. The main screen may include an explore button, a scan and pay button, a me button, a social button, and a shop button. User interface 1410 may provide information associated with consumer's social screen. As shown, the social screen may include an image of the consumer or an image selected by the consumer, a reviews button, a friends nearby button, a social IQ button, a list of the consumer's friends, etc. The near me section of user interface 1610 may provide information associated with different products, services, and/or content from enterprises that are physically located near (e.g., within a predetermined distance) the consumer. User interface 1710 may provide information associated with different products, services, and/or content from enterprises that were recently purchased by the consumer. User interface 2225 may provide a list of coffees available to the consumer, as well the typically-ordered coffee.

Process block 3070 may include the process blocks depicted in FIG. 32. As shown in FIG. 32, process block 3070 may include receiving an updated consumer shopping IQ based on the transaction (block 3200), receiving an updated consumer social IQ based on the transaction (block 3210), receiving updated consumer preferences based on the transaction (block 3220), and/or receiving an updated consumer wish list based on the transaction (block 3230). For example, in an implementation described above in connection with FIGS. 14B, 14D, and 25C, user interface 1410 may provide information associated with consumer's social screen. The social screen may include an image of the consumer or an image selected by the consumer, a reviews button, a friends nearby button, a social intelligence quotient (IQ) button, a list of the consumer's friends, etc. User interface 1430 may provide information associated with consumer's shop screen. The shop screen may include an image of the consumer or an image selected by the consumer, a restaurants button, an events button, a shop IQ button, a list of offers available from various enterprises (e.g., 10% off clothes at a clothing store), etc. User interface 2520 may display the Better Purchase main screen and may include a wish list button, a review button, a top items button, etc.

Systems and/or methods described herein may provide a lifestyle application platform that links identity, mobile, social, location, payment, and commerce services to anticipate a consumer's needs and to proactively recommend appropriate and customized products, services, and/or content to the consumer. The lifestyle application platform may enable the enterprises to deliver the right products, services, and/or content to consumers, may improve ARPU for the enterprises, and may lower costs of consumer acquisition and retention. Consumers, via the lifestyle application platform, may obtain more control over their personal information, may receive less unsolicited spam, and may be provided with simple and safe access (e.g., via a single authentication ID) to their favorite brands of products, services, and/or content.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 30-32, the blocks and/or the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential to the invention unless explicitly described as such. Also, as used herein, the articles "a" and "an" are intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a mobile device, consumer information from a consumer,
        the consumer information including identity information,
            the identity information including one or more of anonymous identity information, pseudonymous identity information, or legal identity information,
            the anonymous identity information including one or more of a credit score associated with the consumer, a purchase history associated with the consumer, location information associated with the consumer, or browsing history associated with the consumer,
            the pseudonymous identity information including one or more of personal data identified by the consumer, preferences associated with the consumer, or personas associated with the consumer, and
            the legal identity information including one or more of a name of the consumer, contact information of the consumer, an Internet Protocol (IP) address of the mobile device, or a unique number issued to the consumer by a government agency;
    providing, by the mobile device and for display, a first option to share the anonymous identity information with an enterprise, a second option to share the pseudonymous identity information with the enterprise, and a third option to share the legal identity information with the enterprise;
    receiving, by the mobile device and from the consumer, a selection of at least one of the first option, the second option, or the third option;
    providing, by the mobile device, the consumer information and the selection to a lifestyle application platform of one or more server devices;
    receiving, by the mobile device and from the lifestyle application platform, a consumer profile for the consumer based on the consumer information;
    receiving, by the mobile device and from the lifestyle application platform, one or more offers, associated with the enterprise and relevant to the consumer, based on the consumer profile and the selection; and
    providing, by the mobile device, information associated with the one or more offers for display to the consumer.

2. The method of claim 1, where receiving the one or more offers comprises:
    receiving a single authentication identification for the consumer based on the consumer information; and
    receiving the one or more offers based on the single authentication identification.

3. The method of claim 1, further comprising:
    enabling the consumer to perform a transaction with the enterprise, via the lifestyle application platform, based on the one or more offers.

4. The method of claim 3, further comprising:
    receiving an updated consumer profile and a product, a service, or content, associated with the enterprise, based on the transaction.

5. The method of claim 4, where the updated consumer profile includes at least one of:
    an updated consumer shopping intelligence quotient (IQ),
    an updated consumer social IQ,
    updated consumer preferences, or
    an updated consumer wish list.

6. The method of claim 1, further comprising:
    receiving one or more notifications, associated with an enterprise and relevant to the consumer, based on the consumer profile,
        the one or more notifications including at least one of:
            a consumer shopping or social intelligence quotient (IQ),
            consumer loyalty points,
            information associated with a proximity of friends to the consumer, or
            information associated with a proximity of the enterprise to the consumer.

7. The method of claim 1, further comprising:
    receiving one or more reports, associated with an enterprise and relevant to the consumer, based on the consumer profile,
        the one or more reports including at least one of:
            information associated with recent purchases by the consumer, or
            information associated with favorite brands of the consumer.

8. A mobile device, comprising:
    a processor to:
        receive consumer information from a consumer,
            the consumer information including one or more of anonymous identity information, pseudonymous identity information, or legal identity information,
            the anonymous identity information including one or more of a credit score associated with the consumer, a purchase history associated with the consumer, location information associated with the consumer, or browsing history associated with the consumer,
            the pseudonymous identity information including one or more of personal data identified by the consumer, preferences associated with the consumer, relationship information associated with the consumer, or personas associated with the consumer, and
            the legal identity information including one or more of a name of the consumer, contact information of the consumer, an Internet Protocol (P) address of the mobile device, or a unique number issued to the consumer by a government agency, provide, for display, a first option to share the anonymous identity information with an enterprise, a second option to share the pseudonymous identity information with the enterprise, and a third option to share the legal identity information with the enterprise, receive, from the consumer, a selection of at least one of the first option, the second option, or the third option, provide the consumer information and the selection to one or more lifestyle application platform server devices, receive, from the one or more lifestyle application platform server devices, a consumer profile for the consumer based on the consumer information, receive, from the one or more lifestyle application platform server devices, notifications, reports, and offers, associated with the enterprise and relevant to the consumer, based on the consumer profile and the selection, and provide the notifications, reports, and offers for display to the consumer.

9. The mobile device of claim 8, where, when receiving the notifications, the reports, and the offers, the processor is to:
receive a single authentication identification for the consumer based on the consumer information, and
receive the notifications, the reports, and the offers based on the single authentication identification.

10. The mobile device of claim 8, where the processor is further to:
enable the consumer to perform a transaction with the enterprise, via the one or more lifestyle application platform server devices, based on the notifications, the reports, and the offers.

11. The mobile device of claim 10, where the processor is further to:
receive an updated consumer profile and a product, a service, or content, associated with the enterprise, based on the transaction.

12. The mobile device of claim 11, where the updated consumer profile includes at least one of:
an updated consumer shopping intelligence quotient (IQ),
an updated consumer social IQ,
updated consumer preferences, or
an updated consumer wish list.

13. The mobile device of claim 8, where the notifications include at least one of:
a consumer shopping or social intelligence quotient (IQ),
consumer loyalty points,
information associated with a proximity of friends to the consumer, or
information associated with a proximity of the enterprise to the consumer.

14. The mobile device of claim 8, where the reports include at least one of:
information associated with recent purchases by the consumer, or
information associated with favorite brands of the consumer.

15. A non-transitory computer-readable medium storing instructions, the instructions comprising:
one or more instructions that, when executed by a processor of a mobile device, cause the processor to:
receive consumer information from a consumer, the consumer information including one or more of anonymous identity information, pseudonymous identity information, or legal identity information, the anonymous identity information including one or more of a credit score associated with the consumer, a purchase history associated with the consumer, location information associated with the consumer, or browsing history associated with the consumer, the pseudonymous identity information including one or more of personal data identified by the consumer, preferences associated with the consumer, or personas associated with the consumer, and the legal identity information including one or more of a name of the consumer, contact information of the consumer, an Internet Protocol (IP) address of the mobile device, or a unique number issued to the consumer by a government agency, provide, for display, a first option to share the anonymous identity information with an enterprise, a second option to share the pseudonymous identity information with the enterprise, and a third option to share the legal identity information with the enterprise, receive, from the consumer, a selection of at least one of the first option, the second option, or the third option, provide the consumer information and the selection to one or more lifestyle application platform server devices, receive, from the one or more lifestyle application platform server devices, a consumer profile for the consumer based on the consumer information, receive, from the one or more lifestyle application platform server devices, notifications and offers, associated with an enterprise and relevant to the consumer, based on the consumer profile, and provide the notifications and offers for display to the consumer.

16. The non-transitory computer-readable medium of claim 15, where the instructions further comprise:
one or more instructions that, when executed by the processor, cause the processor to:
receive a single authentication identification for the consumer based on the consumer information, and
receive the notifications and the offers based on the single authentication identification.

17. The non-transitory computer-readable medium of claim 15, where the instructions further comprise:
one or more instructions that, when executed by the processor, cause the processor to:
enable the consumer to perform a transaction with the enterprise, via the one or more lifestyle application platform server devices, based on the notifications and the offers.

18. The non-transitory computer-readable medium of claim 17, where the instructions further comprise:
one or more instructions that, when executed by the processor, cause the processor to:
receive an updated consumer profile and a product, a service, or content, associated with the enterprise, based on the transaction.

19. The non-transitory computer-readable medium of claim 18, where the updated consumer profile includes at least one of:
an updated consumer shopping intelligence quotient (IQ),
an updated consumer social IQ,
updated consumer preferences, or
an updated consumer wish list.

20. The non-transitory computer-readable medium of claim 15, where the instructions further comprise:
one or more instructions that, when executed by the processor, cause the processor to:
provide, for display to the consumer, an option to meet a salesperson of the enterprise, and
receive a selection of the option to meet the salesperson.

* * * * *